(12) United States Patent
Pennington et al.

(10) Patent No.: US 12,330,174 B2
(45) Date of Patent: *Jun. 17, 2025

(54) VORTICAL CROSS-FLOW FILTRATION SYSTEM

(71) Applicant: CLEANR INC., Cleveland, OH (US)

(72) Inventors: Maxwell T. Pennington, Cincinnati, OH (US); Joseph I. Miller, IV, Atlanta, GA (US); David W. Dillman, Glen Ellyn, IL (US); Marc A. Turenne, Cincinnati, OH (US)

(73) Assignee: CLEANR INC., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/957,121

(22) Filed: Nov. 22, 2024

(65) Prior Publication Data
US 2025/0114802 A1    Apr. 10, 2025

Related U.S. Application Data

(63) Continuation of application No. 18/844,285, filed as application No. PCT/US2022/082570 on Dec. 29, 2022.
(Continued)

(51) Int. Cl.
*B04C 9/00*     (2006.01)
*B01D 21/00*    (2006.01)
(Continued)

(52) U.S. Cl.
CPC ............ *B04C 9/00* (2013.01); *B01D 21/0012* (2013.01); *B01D 21/2483* (2013.01);
(Continued)

(58) Field of Classification Search
CPC ....... B04C 9/00; B04C 3/00; B04C 2003/006; B04C 2009/004; B01D 29/6469; C02F 2103/002; C02F 2301/026
(Continued)

(56) References Cited

U.S. PATENT DOCUMENTS 3,111,082 A    11/1963   Larsson et al.
4,003,837 A     1/1977   Osborne
(Continued)

FOREIGN PATENT DOCUMENTS

CN    101352625 B    12/2011
CN    101979122 B    12/2012
(Continued)

OTHER PUBLICATIONS

Machine-generated English translation of JP6557305, generated on Feb. 25, 2025.*
(Continued)

*Primary Examiner* — Fred Prince
(74) *Attorney, Agent, or Firm* — Finnegan, Henderson, Farabow, Garrett & Dunner, LLP

(57) ABSTRACT

Systems and methods involving filtration are disclosed. A filtration device includes a first opening, a second opening, and a vortical filter, the vortical filter comprising a rib. The rib may be configured to generate vortices to keep the filtered particles in suspension and to provide a flow path extending from the first opening to the second opening. The filtration device may filter particle from the fluid by cross-flow filtration along the flow path across a filter media surrounding at least a portion of the circumference of the vortical filter. The filtration device may be effective at filters greater than 90% of microplastics by mass when post-filtered to 10 microns when measured using the method of either of Example 1 or Example 2. The filtration device may
(Continued)

be effective at filtering particles from the fluid at high flow speeds, such as flow speeds greater than 50 cm/sec or greater than 100 cm/sec.

30 Claims, 49 Drawing Sheets

Related U.S. Application Data

(60) Provisional application No. 63/318,043, filed on Mar. 9, 2022, provisional application No. 63/328,011, filed on Apr. 6, 2022, provisional application No. 63/370,043, filed on Aug. 1, 2022, provisional application No. 63/378,445, filed on Oct. 5, 2022, provisional application No. 63/383,389, filed on Nov. 11, 2022.

(51) Int. Cl.
| | |
|---|---|
| *B01D 21/24* | (2006.01) |
| *B01D 21/26* | (2006.01) |
| *B01D 29/23* | (2006.01) |
| *B01D 29/64* | (2006.01) |
| *B04C 3/00* | (2006.01) |
| *B04C 3/06* | (2006.01) |
| *C02F 1/00* | (2023.01) |
| *C02F 1/38* | (2023.01) |
| *D06F 39/10* | (2006.01) |
| *C02F 101/30* | (2006.01) |
| *C02F 103/00* | (2006.01) |

(52) U.S. Cl.
CPC ........... *B01D 21/265* (2013.01); *B01D 29/23* (2013.01); *B04C 3/00* (2013.01); *B04C 3/06* (2013.01); *C02F 1/001* (2013.01); *C02F 1/385* (2013.01); *D06F 39/10* (2013.01); *B01D 29/6469* (2013.01); *B01D 2201/02* (2013.01); *B04C 2003/006* (2013.01); *B04C 2009/004* (2013.01); *C02F 2101/30* (2013.01); *C02F 2103/002* (2013.01); *C02F 2301/026* (2013.01); *C02F 2307/12* (2013.01)

(58) Field of Classification Search
USPC .............................. 210/512.1, 787, 789, 791
See application file for complete search history.

(56) References Cited

U.S. PATENT DOCUMENTS

| | | | |
|---|---|---|---|
| 5,466,384 | A | 11/1995 | Prevost et al. |
| 7,208,084 | B2 | 4/2007 | Axelrod |
| 7,846,343 | B2 | 12/2010 | Schook |
| 7,998,250 | B2 | 8/2011 | Pondelick et al. |
| 7,998,251 | B2 | 8/2011 | Pondelick et al. |
| 8,201,697 | B2 | 6/2012 | Levitt et al. |
| 8,409,510 | B2 | 4/2013 | McGill et al. |
| 8,622,225 | B2 | 1/2014 | Goninan |
| 8,906,243 | B2 | 12/2014 | Forwald et al. |
| 9,269,976 | B2 | 2/2016 | Carew |
| 9,409,106 | B2 | 8/2016 | Levitt |
| 9,480,951 | B2 | 11/2016 | Sanderson |
| 9,827,518 | B2 | 11/2017 | Piedrahita et al. |
| 9,895,635 | B2 | 2/2018 | Levitt |
| 10,954,152 | B1 | 3/2021 | Hicks et al. |
| 11,058,972 | B2 | 7/2021 | Chau |
| 11,351,492 | B2 | 6/2022 | Hoang et al. |
| 2011/0220586 | A1 | 9/2011 | Levitt |
| 2017/0128859 | A1 | 5/2017 | Levitt et al. |
| 2018/0141054 | A1 | 5/2018 | Fleenor et al. |
| 2021/0101099 | A1* | 4/2021 | Wang ...................... B01D 8/00 |
| 2021/0349065 | A1 | 11/2021 | Masoudi et al. |
| 2022/0403719 | A1 | 12/2022 | Zhang et al. |

FOREIGN PATENT DOCUMENTS

| | | | | |
|---|---|---|---|---|
| CN | 106984086 | A | | 7/2017 |
| CN | 206391727 | U | | 8/2017 |
| CN | 105712513 | B | | 10/2018 |
| CN | 105561651 | B | | 7/2019 |
| CN | 110565783 | A | | 12/2019 |
| CN | 110374767 | B | * | 8/2020 |
| CN | 112604323 | A | | 4/2021 |
| CN | 213466972 | U | * | 6/2021 |
| CN | 216537191 | U | | 5/2022 |
| CN | 216653741 | U | | 6/2022 |
| CN | 216825076 | U | | 6/2022 |
| CN | 114534316 | B | | 10/2022 |
| CN | 110785382 | B | | 12/2022 |
| CN | 217961523 | U | | 12/2022 |
| DE | 3926082 | A1 | * | 2/1991 |
| DE | 10244292 | B4 | | 6/2008 |
| DE | 202021001402 | U1 | | 5/2021 |
| EP | 1782870 | A1 | | 10/2005 |
| EP | 2314446 | A2 | * | 4/2011 ............. B01D 29/11 |
| FR | 2746032 | A1 | * | 9/1997 ........... B01D 33/067 |
| FR | 3016805 | A1 | * | 7/2015 ............... B04C 5/14 |
| JP | 4581712 | B2 | | 11/2010 |
| JP | 4891875 | B2 | | 3/2012 |
| JP | 5815417 | B2 | | 11/2015 |
| JP | 6383127 | B1 | | 8/2018 |
| JP | 2019098256 | A | | 6/2019 |
| JP | 6557305 | B2 | | 8/2019 |
| TW | 201707764 | A | | 3/2017 |
| TW | M61 4777 | U | | 7/2021 |
| WO | 94/08088 | A1 | | 4/1994 |
| WO | WO-9714489 | A1 | * | 4/1997 ......... B01D 17/0217 |
| WO | WO 2021/176391 | A1 | | 9/2021 |
| WO | WO 02/32542 | A2 | | 4/2022 |
| WO | WO 2022/263250 | A2 | | 12/2022 |

OTHER PUBLICATIONS

Machine-generated English translation of FR 3016805, generated on Feb. 25, 2025.*
Machine-generated English translation of TW 201707764, generated on Feb. 25, 2025.*
Machine-generated English translation of CN 110374767, generated on Feb. 25, 2025.*
Machine-generated English translation of CN 213466972, generated on Feb. 25, 2025.*
Machine-generated English translation of DE 3926082, generated on Apr. 9, 2025.*
Machine-generated English translation of FR 2746032, generated on Apr. 9, 2025.*
PCT International Search Report and Written Opinion issued in related PCT International Application No. PCT/US2022/082570; mailed Mar. 29, 2023 (13 pages).
Adam Schroeder et al., Development of helical, fish-inspired cross-step filter for collecting harmful algae, 2019 Bioinspir. Biomim. 14 056008, Jul. 29, 2019 (19 pages).
Bioeconomy News, "Fish gills as inspiration for microplastic filter" (Oct. 19, 2021) https://biooekonomie.de/en/news/tigh-gills-inspiration-microplastic-filter.
Donaldson, Cyclone Dust Collectors Models 12, 16, 20, 24, 30, 36, and 44 (4 pages).
Hamann, "Clean Water is the Basis of Life," https://www.kaercher.com/us/inside-karcher/newsroom/kaercher-stories/clean-water-is-the-basis-of-life.html (4 pages).
Kortekamp et al., "How fish gills for washing machines help against microplastics," Waz Funke Medien https://www waz.de/lokales/article402523598/wie-fischkiemen-fuer-waschmaschinen-gegen-mikroplastik-helfen.html (7 pages).
Liu et al., "Oil-water pre-separation with a novel axial hydrocyclone," (2017) https://doi.:10.1016/j.ciche.2017.06.021 (16 pages).

(56) References Cited

OTHER PUBLICATIONS

Masselter et al., Improvement of a microfiber filter for domestic washing machines, IOP Publishing, Bioinspiration and Biomimetics, Author Submitted Manuscript—BB-103143.R2, (11 pages).

Napper et al., "The efficiency of devices intended to reduce microfibre release during clothes washing," Science of the Total Environment 738 (2020) 140412 https://doi.org/10.1016/j.scitoteny.2020.140412 (8 pages).

Bioeconomy News, "Fish gills as inspiration for microplastic filter" (Oct. 19, 2021) https://biooekonomie.de/en/news/figh-gills-inspiration-microplastic-filter.

Brooks et al., "Physical modeling of vortical cross-step flow in the American paddlefish, Polyodon spathula," PLoS ONE 13(3):e0193874 (Mar. 21, 2018) https://doi.org/10.1371/journal.pone.0193874 (25 pages).

Costa et al., Microplastic Filters (Washing Machines) Bill, as introduced, Ordered by the House of Commons to be printed Nov. 30, 2021 (6 pages).

Chen et al., "Improvement of Hemodynamic performance using novel helical flow vena cava filter design," Scientific Reports 7:40724 DOI:10.1038/srep40724 (Jan. 23, 2017) www.nature.com/scientificreports (9 pages).

Divi et al., "Manta rays feed using ricochet separation, a novel nonclogging filtration mechanism," Science Advances Research Article, 2018;4:eaat9533 (Sep. 26, 2018) (7 pages).

Donaldson,Cyclone Dust Collectors Models 12, 16, 20, 24, 30, 36, and 44 (4 pages), Date Unknown.

Hamann, "Clean Water is the Basis of Life," https://www.kaercher.com/us/inside-karcher/newsroom/kaercher-stories/clean-water-is-the-basis-of-life.html (4 pages), Date Unknown.

Kortekamp et al., "How fish gills for washing machines help against microplastics," Waz Funke Medien https://www.waz.de/lokales/article402523598/wie-fischkiemen-fuer-waschmaschinen-gegen-mikroplastik-helfen.html (7 pages), Date Unknown.

Liu et al., "Oil-water pre-separation with a novel axial hydrocyclone," (2017) https://doi.:10.1016/j.cjche.2017.06.021 (16 pages).

"Manta-rays' food-capturing mechanism may hold key to better filtration systems" (Sep. 16, 2018) https://phys.org/news/2018-09-manta-rays-food-capturing-mechanism-key.html (4 pages).

Masselter et al., Improvement of a microfiber filter for domestic washing machines, IOP Publishing, Bioinspiration and Biomimetics, Author Submitted Manuscript—BB-103143.R2, (11 pages) Date Unknown.

McDonough et al., "The development of helical vortex pairs in oscillatory flows—A numerical and experimental study," Chemical Engineering & Processing: Process Intensification 143 (Jul. 6, 2019) 107588 (13 pages).

Napper et al., "The efficiency of devices intended to reduce microfibre release during clothes washing," Science of the Total Environment 738 (2020) 140412 https://doi.org/10.1016/j.scitotenv.2020.140412 (8 pages).

Official Journal of the French Republic JPNo. 35 Feb. 11, 2020 relating to the fight against waste and the circular economy (107 pages).

Patra et al., "Role of vortex finder depth on pressure drop and performance efficiency in a ribbed hydrocyclone," South African Journal of Chemical Engineering 2018, pp. 103-109 https://doi.org/10.1016.j.sajce.2018.04.001 (7 pages).

Sanderson et al., "Crossflow filtration in suspension-feeding fishes," Letters to Nature, vol. 412, Jul. 26, 2001, Macmillan Magazines Ltd., pp. 439-441 (3 pages).

Sanderson et al., "Fish mouths as engineering structures for vortical cross-step filtration," Nature Communications, DOI: 10.1038 /ncomms11092 (Mar. 29, 2016) (9 pages).

Tiffin et al., Reliable quantification of microplastic release from the domestic laundry of textile fabrics, The Journal of the Textile Institute 2021, vol. 113, No. 4, 558-566 https://doi.org/10.1080/00405000.2021.1892305 (13 pages).

* cited by examiner

VORTICAL CROSS-FLOW FILTRATION SYSTEM

CROSS-REFERENCE TO RELATED APPLICATIONS

This application is a continuation of U.S. Application of Ser. No. 18/844,285, filed Sep. 5, 2024, which is a national stage filing of international application PCT/US2022/082570, filed Dec. 29, 2022, is related which claims a right of priority to U.S. Provisional Application No. 63/318,043 filed on Mar. 9, 2022, U.S. Provisional Application No. 63/328,011 filed on Apr. 6, 2022, U.S. Provisional Application No.

BACKGROUND

Technical Field

Embodiments discussed herein generally relate to systems and methods for filtering a fluid using a vortical filter. Some embodiments may include filter systems and methods having a tapered-helical coil and filter media. Some embodiments of the tapered-helical coil may be configured to generate vortices to maintain solids to be filtered in suspension while promoting the flow of the solids along a flow path toward a collection region.

Description of Related Art

Filtration is generally a process that includes a separation of one substance from another. Mechanical filtration separates a substance, such as suspended solids or molecules, from another substance, such as a fluid (e.g., liquid or gas). Chemical filtration separates one substance from another by chemical means, such as chemical bonding or precipitation. Mechanical filtering of solids (e.g., particles) from fluid can include passing the fluid containing the solids through or otherwise interacting with a filter media, such as a mesh or membrane, which collects the solids being filtered out while allowing the filtered fluid to pass through. In dead-end filtration, the flow of the fluid to be filtered is generally perpendicular to the filter media, whereas in cross-flow filtration, the flow of the fluid to be filtered is substantially parallel to the filter media. Over time, the filter media in both of these filtration methods tends to clog with filtered solids, reducing the effectiveness of the filter, increasing the pressure drop across the filter media, and requiring more energy for filtering. Eventually filtration will cease to be effective, especially in dead-end filtration because the filtered solids block the flow of the fluid.

Vortical cross-flow filtration is a method involving aspects of both dead-end and cross-flow filtration, such as that described in Sanderson et al., "Fish mouths as engineering structures for vortical cross-step filtration," Nature Communications (2016) and Brooks et al., "Physical modeling of vortical cross-step flow in the American paddlefish, *Polyodon spathula*," PLOS One (2018). However, current vortical cross-flow filtration devices still face significant performance limitations, including residue build-up, lack of a cleaning method of the filter media and device, lack of residue collection method, inability to effectively filter solids and microsolids at high flow rates or high flow speeds of the fluid, and inability to consistently and robustly capture a broad range of particles, especially small particles. Thus, there remains a need for improvements in systems and methods using vortical cross-flow filtration.

SUMMARY

Embodiments of the present disclosure may include technological improvements to one or more technical problems in prior filtration systems. Various embodiments described herein may provide systems and methods for improved, more efficient, or more effective filtering of materials, such as solids, from fluids. In some embodiments, a vortical filter provides for improved vortical cross-flow filtration. In one or more of the following embodiments, the vortical filter described herein has a tapered-helical configuration. According to some embodiments, the vortical filter may have a tapered configuration, such as a tapered-helical configuration. The vortical filter may comprise a conical shaped filter. In some embodiments, the vortical filter comprises a tapered coil that has both a helical configuration and a conical shape. In some embodiments, the vortical filter comprises a tapered-helical coil.

According to an aspect of this disclosure, according to some embodiments, a filtration device may include a first opening and a second opening; and a vortical filter for receiving a fluid extending away from the first opening towards the second opening, the vortical filter being configured to generate vortices in the received fluid entering the vortical filter via the first opening and being configured such that filtered fluid exits the side of the vortical filter through a filter media surrounding at least a portion of the circumference of the vortical filter between the first opening and the second opening, wherein filtered particles substantially exit the vortical filter at the second opening. In some embodiments, the vortical filter comprises a tapered-helical coil.

According to some embodiments, the vortical filter comprises at least one rib extending continuously from the first opening to the second opening. According to some embodiments, the at least one rib forms a flow path configured to guide filtered particles suspended in the vortices along a flow path to the second opening. According to some embodiments, the flow path is substantially continuous from the first opening to the second opening. According to some embodiments, the flow path is configured so as to not inhibit the flow of filtered materials, including particles, along the flow path towards the second opening. According to some embodiments, the at least one rib spirals from the first opening to the second opening with a decreasing radius. According to some embodiments, the rib includes at least one ridge substantially adjacent to the filter media. According to some embodiments, the rib includes a plurality of ridges substantially adjacent to the filter media. According to some embodiments, the one or more ridges is configured to maintain vortices in the fluid. According to some embodiments, the one or more ridges is configured to facilitate travel of filtered materials, such as particles, along the flow path towards the second opening. According to some embodiments, the first opening has a cross-sectional area greater than the cross-sectional area of the second opening. According to some embodiments, the vortical filter is substantially cone-shaped. According to some embodiments, the filter media comprises a porous material configured to block solids suspended in the fluid from passing through the filter media.

According to some embodiments, the filtration device further comprises a collection unit arranged at the second opening, the collection unit configured to collect solids filtered from the fluid. According to some embodiments, the collection unit comprises a removeable collection unit configured to be fastened to the filtration device via a fastening mechanism. According to some embodiments, the collection unit comprises a dead-end filter comprising a collection unit filter media configured to trap materials, including solids, filtered from the fluid; and a collection unit outlet configured to allow the fluid to flow therethrough. According to some embodiments, the collection unit is a second-stage filtration device.

According to some embodiments, the filtration device is configured to collect at least 70% of the filtered particles (e.g., microplastics) filtered from the fluid at the collection unit. According to some embodiments, the filtration device is configured to collect at least 75% of the filtered particles (e.g., microplastics) filtered from the fluid at the collection unit. According to some embodiments, the filtration device is configured to collect at least 80% of the filtered particles (e.g., microplastics) filtered from the fluid at the collection unit. According to some embodiments, the filtration device is configured to collect at least 85% of the filtered particles (e.g., microplastics) filtered from the fluid at the collection unit. According to some embodiments, the filtration device is configured to collect at least 90% of the filtered particles (e.g., microplastics) filtered from the fluid at the collection unit. According to some embodiments, the filtration device is configured to collect at least 91% of the filtered particles (e.g., microplastics) filtered from the fluid at the collection unit. According to some embodiments, the filtration device is configured to collect at least 92% of the filtered particles (e.g., microplastics) filtered from the fluid at the collection unit. According to some embodiments, the filtration device is configured to collect at least 93% of the filtered particles (e.g., microplastics) filtered from the fluid at the collection unit. According to some embodiments, the filtration device is configured to collect at least 94% of the filtered particles (e.g., microplastics) filtered from the fluid at the collection unit. According to some embodiments, the filtration device is configured to collect at least 95% of the filtered particles (e.g., microplastics) filtered from the fluid at the collection unit. According to some embodiments, the filtration device is configured to collect at least 96% of the filtered particles (e.g., microplastics) filtered from the fluid at the collection unit. According to some embodiments, the filtration device is configured to collect at least 97% of the filtered particles (e.g., microplastics) filtered from the fluid at the collection unit. According to some embodiments, the filtration device is configured to collect at least 98% of the filtered particles (e.g., microplastics) filtered from the fluid at the collection unit.

According to some embodiments, the filtration device is configured such that at least 70% of the filtered particles (e.g., microplastics) exit the vortical filter at the second opening. According to some embodiments, the filtration device is configured such that at least 75% of the filtered particles (e.g., microplastics) exit the vortical filter at the second opening. According to some embodiments, the filtration device is configured such that at least 80% of the filtered particles (e.g., microplastics) exit the vortical filter at the second opening. According to some embodiments, the filtration device is configured such that at least 85% of the filtered particles (e.g., microplastics) exit the vortical filter at the second opening. According to some embodiments, the filtration device is configured such that at least 90% of the filtered particles (e.g., microplastics) exit the vortical filter at the second opening. According to some embodiments, the filtration device is configured such that at least 91% of the filtered particles (e.g., microplastics) exit the vortical filter at the second opening. According to some embodiments, the filtration device is configured such that at least 92% of the filtered particles (e.g., microplastics) exit the vortical filter at the second opening. According to some embodiments, the filtration device is configured such that at least 93% of the filtered particles (e.g., microplastics) exit the vortical filter at the second opening. According to some embodiments, the filtration device is configured such that at least 94% of the filtered particles (e.g., microplastics) exit the vortical filter at the second opening. According to some embodiments, the filtration device is configured such that at least 95% of the filtered particles (e.g., microplastics) exit the vortical filter at the second opening. According to some embodiments, the filtration device is configured such that at least 96% of the filtered particles (e.g., microplastics) exit the vortical filter at the second opening. According to some embodiments, the filtration device is configured such that at least 97% of the filtered particles (e.g., microplastics) exit the vortical filter at the second opening. According to some embodiments, the filtration device is configured such that at least 98% of the filtered particles (e.g., microplastics) exit the vortical filter at the second opening.

According to some embodiments, the vortical filter has a raker reduction ratio $\beta/\alpha$ in a range between about 0.1 and 10.0 including the end points. According to some embodiments, the vortical filter has a raker reduction ratio $\beta/\alpha$ in a range between about 1.0 and 10.0 including the end points. According to some embodiments, the vortical filter has a raker reduction ratio $\beta/\alpha$ in a range between about 1.0 and 6.0 including the end points. According to some embodiments, the vortical filter has a raker reduction ratio $\beta/\alpha$ in a range between about 2.0 and 5.0 including the end points. According to some embodiments, the vortical filter has a raker reduction ratio $\beta/\alpha$ in a range between about 3.0 and 4.0 including the end points.

According to some embodiments, the vortical filter is configured such that the at least one rib having a rib width, the at least one rib having a rib height, the tapered having a slot height between adjacent revolutions of the at least one rib, the vortical filter having a helix height, the vortical filter having a helix pitch, and the slot height, rib width, rib height, helix height, and helix pitch being configured to create a rib overlap configured to generate vortices along a particle flow path to guide particles-to-be-filtered from the fluid along the rib toward the second opening.

According to some embodiments, the vortical filter is configured to provide a cross-flow filtration area across the filter media. According to some embodiments, the vortical filter has a variable pitch.

According to some embodiments, the fluid is a liquid. According to some embodiments, the fluid is a gas. According to some embodiments, the fluid comprises water, such as a washing machine discharge fluid or a biological fluid, such as blood.

According to some embodiments, the filtration device further comprises a housing, wherein the filter media is integrated into the housing.

According to some embodiments, the filtration device further comprises a housing configured to contain the vortical filter, wherein the filter media is fastened between the housing and the vortical filter.

According to some embodiments, the filtration device further comprises a gasket configured to seal the vortical filter against the filter media.

According to some embodiments, the filtration device further comprises an enclosure including an inlet opening configured to guide the fluid to the first opening, and an outlet opening configured to guide filtered fluid out of the enclosure; and a particle collection member configured to collect particles filtered from the fluid, the particle collection member being removable from the enclosure. According to some embodiments, the particle collection member is configured to be removed from the enclosure in a manner such that fluid remains in the enclosure when the particle collection member is removed.

According to some embodiments, the filtration device further comprises a scraping mechanism configured to clean the vortical filter and the filter media.

According to some embodiments, the filtration device is configured to filter discharge fluid from a washing machine. According to some embodiments, the filtration device is configured to filter microplastics from said discharge fluid. According to some embodiments, the filtration device is configured to filter at least 75% of the microplastics from the discharge fluid after the washing machine completes four or more loads of laundry. According to some embodiments, the filtration device is configured to filter at least 80%, 85%, 90%, 91%, 92%, 93%, 94%, 95%, 96%, 97%, 98%, 99%, 99.1, %, 99.2, 99.3%, 99.4%, or 99.5% of the microplastics from the discharge fluid after the washing machine completes four or more loads of laundry.

According to some embodiments, the filtration device may be configured to maintain a flow rate through the filtration device of 5.0 gal/min or greater after at least one wash load cycle without being cleaned. According to some embodiments, the filtration device may be configured to maintain a flow rate through the filtration device of 5.0 gal/min or greater after at least two wash load cycles without being cleaned. According to some embodiments, the filtration device may be configured to maintain a flow rate through the filtration device of 5.0 gal/min or greater after at least three wash load cycles without being cleaned. According to some embodiments, the filtration device may be configured to maintain a flow rate through the filtration device of 4.0 gal/min or greater after at least two, three, four, five, or six wash load cycles without being cleaned. According to some embodiments, the filtration device may be configured to maintain a flow rate through the filtration device of 3.0 gal/min or greater after at least two, three, four, five, six, seven, eight, or nine wash load cycles without being cleaned. According to some embodiments, the filtration device may be configured provide a flow rate through the filtration device through at least four, five, six, seven, eight, nine, or ten wash load cycles without being cleaned. According to some embodiments, the filtration device may be configured provide a flow rate through the filtration device through more than ten wash load cycles without being cleaned.

According to some embodiments, the filtration device may be configured to maintain a flow rate through the filtration device of 3.0 gal/min or greater after four minutes of use filtering particles from the fluid. According to some embodiments, the filtration device may be configured to maintain a flow rate through the filtration device of 3.0 gal/min or greater after five, six, seven, eight, nine, or ten minutes of use filtering particles from the fluid. According to some embodiments, the filtration device may be configured to maintain a flow rate through the filtration device of 2.0 gal/min or greater after five, six, seven, eight, nine, ten, eleven, twelve, thirteen, fourteen, or fifteen minutes of use filtering particles from the fluid.

According to some embodiments, the filtration device may be configured such that the flow rate through the filtration device increases over time during a wash load cycle.

According to some embodiments, the filtration device may be configured to maintain a flow speed through the filtration device of 50 cm/s or greater after at least one wash load cycle without being cleaned. According to some embodiments, the filtration device may be configured to maintain a flow speed through the filtration device of 50 cm/s or greater after at least two wash load cycles without being cleaned. According to some embodiments, the filtration device may be configured to maintain a flow speed through the filtration device of 50 cm/s or greater after at least three wash load cycles without being cleaned. According to some embodiments, the filtration device may be configured to maintain a flow speed through the filtration device of 50 cm/s or greater after at least four, five, or six wash load cycles without being cleaned. According to some embodiments, the filtration device may be configured to maintain a flow speed through the filtration device of 40 cm/s or greater after at least two, three, four, five, six, seven, eight, or nine wash load cycles without being cleaned. According to some embodiments, the filtration device may be configured to maintain a flow speed through the filtration device of 30 cm/s or greater after at least two, three, four, five, six, seven, eight, nine, or 10 wash load cycles without being cleaned. According to some embodiments, the filtration device may be configured to maintain a flow speed through the filtration device of 20 cm/s or greater after at least two, three, four, five, six, seven, eight, nine, ten, or eleven wash load cycles without being cleaned. According to some embodiments, the filtration device may be configured provide a flow through the filtration device without a flow failure through at least four, five, six, seven, eight, nine, ten, eleven, twelve, or thirteen wash load cycles without being cleaned. According to some embodiments, the filtration device may be configured provide a flow through the filtration device without a flow failure through more than ten wash load cycles without being cleaned.

According to some embodiments, the filtration device may be configured to maintain fluid flow through the filter filtration device through three, four, five, six, seven, eight, nine, ten, eleven, twelve, or thirteen wash load cycles without a pressure failure. According to some embodiments, the filtration device may be configured provide a flow through the filtration device without a pressure failure through more than ten wash load cycles without being cleaned.

According to some embodiments, the filtration device may be configured such that the pressure buildup on the inlet side of the filtration device is less than 3.4 psi through at least three, four, five, six, seven, eight, nine, or ten wash load cycles without being cleaned.

According to some embodiments, the filtration device may be configured such that the pressure buildup on the inlet side of the filtration device decreases over time during a wash load cycle.

According to another aspect of this disclosure, according to some embodiments, a method for filtering solids from a fluid may comprise flowing a fluid through a filtration device comprising a vortical filter from a first opening to a second opening along the vortical filter, the vortical filter comprising at least one rib; generating vortices in the fluid along the at least one rib flowing in a particle flow path along the at least one rib from the first opening to the second opening; and filtering particles from the fluid by flowing the fluid through a filter media surrounding at least a portion of the circumference of the vortical filter. According to some embodiments, the vortical filter may have a tapered configuration, such as a tapered-helical configuration. The vortical filter may comprise a conical shaped filter. In some embodiments, the vortical filter comprises a tapered coil that has both a helical configuration and a conical shape. In some embodiments, the vortical filter comprises a tapered-helical coil.

According to some embodiments, the particle flow path guides the filtered particles along the rib towards the second opening. According to some embodiments, the particle flow path is substantially continuous between the first opening and the second opening. According to some embodiments, the particle flow path is configured so as to not inhibit the flow of particles along the particle flow path towards the second opening. According to some embodiments, the at least one rib spirals from the first opening to the second opening with a decreasing radius. According to some embodiments, the first opening has a cross-sectional area greater than the cross-sectional area of the second opening. According to some embodiments, the vortical filter is substantially cone-shaped.

According to some embodiments, the filter media comprises a porous material configured to block solids suspended in the fluid from passing through the filter media.

According to some embodiments, the method further comprises collecting the filtered particles in a collection unit arranged at the second opening. According to some embodiments, the collection unit comprises a removeable collection unit configured to be fastened to the second opening via a fastening mechanism. According to some embodiments, the collection unit is further configured to allow the filtered fluid to flow therethrough. According to some embodiments, the collection unit comprises a dead-end filter comprising a further filter media configured to trap solids filtered from the fluid. According to some embodiments, the collection unit comprises a second-stage filtration device.

According to some embodiments, the filtered material comprises biological materials found in an aqueous fluid, solid materials, such as particles, or combinations thereof. According to some embodiments, the filtered particles comprise microplastics. According to some embodiments, the filtered particles comprise microfibers. According to some embodiments, the filtered particles comprise microsolids.

According to some embodiments, the collection unit collects at least 70% of solids (e.g., microplastics) filtered from the fluid. According to some embodiments, the collection unit collects at least 75% of solids (e.g., microplastics) filtered from the fluid. According to some embodiments, the collection unit collects at least 80% of solids (e.g., microplastics) filtered from the fluid. According to some embodiments, the collection unit collects at least 85% of solids (e.g., microplastics) filtered from the fluid. According to some embodiments, the collection unit collects at least 90% of solids (e.g., microplastics) filtered from the fluid. According to some embodiments, the collection unit collects at least 91% of solids (e.g., microplastics) filtered from the fluid. According to some embodiments, the collection unit collects at least 92% of solids (e.g., microplastics) filtered from the fluid. According to some embodiments, the collection unit collects at least 93% of solids (e.g., microplastics) filtered from the fluid. According to some embodiments, the collection unit collects at least 94% of solids (e.g., microplastics) filtered from the fluid. According to some embodiments, the collection unit collects at least 95% of solids (e.g., microplastics) filtered from the fluid. According to some embodiments, the collection unit collects at least 96% of solids (e.g., microplastics) filtered from the fluid. According to some embodiments, the collection unit collects at least 97% of solids (e.g., microplastics) filtered from the fluid. According to some embodiments, the collection unit collects at least 98% of solids (e.g., microplastics) filtered from the fluid.

According to some embodiments, the vortical filter has a raker reduction ratio $\beta/\alpha$ in a range between about 0.1 and 10.0 including the end points. According to some embodiments, the vortical filter has a raker reduction ratio $\beta/\alpha$ in a range between about 1.0 and 10.0 including the end points. According to some embodiments, the vortical filter has a raker reduction ratio $\beta/\alpha$ in a range between about 1.0 and 6.0 including the end points. According to some embodiments, the vortical filter has a raker reduction ratio $\beta/\alpha$ in a range between about 2.0 and 5.0 including the end points. According to some embodiments, the vortical filter has a raker reduction ratio $\beta/\alpha$ in a range between about 3.0 and 4.0 including the end points.

According to some embodiments, the filtering particles from the fluid by flowing the fluid through the filter media surrounding at least a portion of the circumference of the vortical filter comprises providing a cross-flow filtration area across the filter media.

According to some embodiments, the vortical filter has a variable pitch.

According to some embodiments, the fluid is a liquid. According to some embodiments, the fluid is a gas. According to some embodiments, the fluid comprises a washing machine discharge fluid.

According to some embodiments, the filter media is fastened to the vortical filter by a housing. According to some embodiments, the vortical filter comprises a gasket configured to seal the vortical filter against the filter media.

According to some embodiments, the method further comprises, enclosing the filtration device in an enclosure comprising an inlet opening configured to guide the fluid to the first opening and an outlet opening configured to guide filtered fluid out of the enclosure; and collecting the filtered particles in a particle collection unit. According to some embodiments, the particle collection unit is configured to be removed from the enclosure in a manner such that fluid remains in the enclosure when the particle collection unit is removed.

According to some embodiments, the method further comprises cleaning the vortical filter and the filter media using a scraping mechanism.

According to some embodiments, the method further comprises providing the fluid at the first opening at a flow speed greater than 50 cm/sec. According to some embodiments, the method further comprises providing the fluid at the first opening at a flow speed greater than 70 cm/sec. According to some embodiments, the method further comprises providing the fluid at the first opening at a flow speed greater than 90 cm/sec. According to some embodiments, the method further comprises providing the fluid at the first opening at a flow speed greater than 120 cm/sec. According to some embodiments, the method further comprises providing the fluid at the first opening at a flow speed greater than 140 cm/sec.

According to some embodiments, the solids or filtered particles comprise microplastics. According to some embodiments, the filtering filters greater than 80% of the microplastics by mass when post-filtered to 10 microns when measured using the method of Example 1 or Example 4. According to some embodiments, the filtering filters greater than 85% of the microplastics by mass when post-filtered to 10 microns when measured using the method of Example 1 or Example 4. According to some embodiments, the filtering filters greater than 90% of the microplastics by mass when post-filtered to 10 microns when measured using the method of Example 1 or Example 4. According to some embodiments, the filtering filters greater than 91% of the microplastics by mass when post-filtered to 10 microns when measured using the method of Example 1. According to some embodiments, the filtering filters greater than 92%, 93%, 94%, 95%, 96%, 97%, or 98% of the microplastics by mass when post-filtered to 10 microns when measured using the method of Example 1 or Example 4.

According to some embodiments, the filtering filters greater than 85% of the microplastics by mass when post-filtered to 10 microns when measured using the method of Example 2. According to some embodiments, the filtering filters greater than 90% of the microplastics by mass when post-filtered to 10 microns when measured using the method of Example 2. According to some embodiments, the filtering filters greater than 91% of the microplastics by mass when post-filtered to 10 microns when measured using the method of Example 2. According to some embodiments, the filtering filters greater than 92%, 93%, 94%, 95%, 96%, 97%, or 98% of the microplastics by mass when post-filtered to 10 microns when measured using the method of Example 2. According to some embodiments, the filtering filters greater than 99.0%, 99.1%, 99.2%, 99.3%, 99.4%, 99.5%, 99.6%, 99.7%, 99.8%, or 99.9% of the microplastics by mass when post-filtered to 10 microns when measured using the method of Example 2.

According to some embodiments, the filtering filters greater than 80% of the microplastics by count when measured using the method of Example 4. According to some embodiments, the filtering filters greater than 85% of the microplastics by count when measured using the method of Example 4. According to some embodiments, the filtering filters greater than 90% of the microplastics by count when measured using the method of Example 4. According to some embodiments, the filtering filters greater than 91% of the microplastics by count when measured using the method of Example 4. According to some embodiments, the filtering filters greater than 92%, 93%, 94%, 95%, 96%, 97%, or 98% of the microplastics by count when measured using the method of Example 4.

According to some embodiments, the filtration device may maintain a flow rate through the filtration device of 5.0 gal/min or greater after at least one wash load cycle without being cleaned. According to some embodiments, the filtration device may maintain a flow rate through the filtration device of 5.0 gal/min or greater after at least two wash load cycles without being cleaned. According to some embodiments, the filtration device may maintain a flow rate through the filtration device of 5.0 gal/min or greater after at least three wash load cycles without being cleaned. According to some embodiments, the filtration device maintain a flow rate through the filtration device of 4.0 gal/min or greater after at least two, three, four, five, or six wash load cycles without being cleaned. According to some embodiments, the filtration device may maintain a flow rate through the filtration device of 3.0 gal/min or greater after at least two, three, four, five, six, seven, eight, or nine wash load cycles without being cleaned. According to some embodiments, the filtration device may provide a flow rate through the filtration device through at least four, five, six, seven, eight, nine, or ten wash load cycles without being cleaned. According to some embodiments, the filtration device may provide a flow rate through the filtration device through more than ten wash load cycles without being cleaned.

According to some embodiments, the filtration device may maintain a flow rate through the filtration device of 3.0 gal/min or greater after four minutes of use filtering particles from the fluid. According to some embodiments, the filtration device may maintain a flow rate through the filtration device of 3.0 gal/min or greater after five, six, seven, eight, nine, or ten minutes of use filtering particles from the fluid. According to some embodiments, the filtration device may maintain a flow rate through the filtration device of 2.0 gal/min or greater after five, six, seven, eight, nine, ten, eleven, twelve, thirteen, fourteen, or fifteen minutes of use filtering particles from the fluid.

According to some embodiments, the filtration device may provide a flow rate through the filtration device increases over time during a wash load cycle.

According to some embodiments, the filtration device may maintain a flow speed through the filtration device of 50 cm/s or greater after at least one wash load cycle without being cleaned. According to some embodiments, the filtration device may maintain a flow speed through the filtration device of 50 cm/s or greater after at least two wash load cycles without being cleaned. According to some embodiments, the filtration device may maintain a flow speed through the filtration device of 50 cm/s or greater after at least three wash load cycles without being cleaned. According to some embodiments, the filtration device may maintain a flow speed through the filtration device of 50 cm/s or greater after at least four, five, or six wash load cycles without being cleaned. According to some embodiments, the filtration device may maintain a flow speed through the filtration device of 40 cm/s or greater after at least two, three, four, five, six, seven, eight, or nine wash load cycles without being cleaned. According to some embodiments, the filtration device may maintain a flow speed through the filtration device of 30 cm/s or greater after at least two, three, four, five, six, seven, eight, nine, or 10 wash load cycles without being cleaned. According to some embodiments, the filtration device may maintain a flow speed through the filtration device of 20 cm/s or greater after at least two, three, four, five, six, seven, eight, nine, ten, or eleven wash load cycles without being cleaned. According to some embodiments, the filtration device may provide a flow through the filtration device without a flow failure through at least four, five, six, seven, eight, nine, ten, eleven, twelve, or thirteen wash load cycles without being cleaned. According to some embodiments, the filtration device may provide a flow through the filtration device without a flow failure through more than ten wash load cycles without being cleaned.

According to some embodiments, the filtration device may maintain fluid flow through the filter filtration device through three, four, five, six, seven, eight, nine, ten, eleven, twelve, or thirteen wash load cycles without a pressure failure. According to some embodiments, the filtration device may provide a flow through the filtration device without a pressure failure through more than ten wash load cycles without being cleaned.

According to some embodiments, the filtration device may have a pressure buildup on the inlet side of the filtration device that is less than 3.4 psi through at least three, four, five, six, seven, eight, nine, or ten wash load cycles without being cleaned.

According to some embodiments, the filtration device may have a pressure buildup on the inlet side of the filtration device that decreases over time during a wash load cycle.

According to another aspect of this disclosure, according to some embodiments, a method for filtering particles from a liquid, may comprise providing the liquid at a first opening of a filtration device comprising a vortical filter; generating vortices in the vortical filter via a rib, the rib having a decreasing interior cross-section through which the fluid flows; providing a flow path along the rib for directing particles suspended in the vortices towards a second opening of the filtration device; and filtering a filtered fluid through a filter media adjacent to the flow path. According to some embodiments, the vortical filter may have a tapered configuration, such as a tapered-helical configuration. The vortical filter may comprise a conical shaped filter. In some embodiments, the vortical filter comprises a tapered coil that has both a helical configuration and a conical shape. In some embodiments, the vortical filter comprises a tapered-helical coil.

According to some embodiments, the flow path is substantially continuous between the first opening and the second opening. According to some embodiments, the flow path is configured so as to not inhibit the flow of particles along the flow path towards the second opening. According to some embodiments, the rib spirals from the first opening to the second opening with a decreasing radius. According to some embodiments, the first opening has a cross-sectional area greater than the cross-sectional area of the second opening. According to some embodiments, the vortical filter comprises a tapered coil that is substantially cone-shaped. According to some embodiments, the filter media comprises a porous material configured to block solids suspended in the fluid from passing through the filter media.

According to some embodiments, the method further comprises collecting the filtered particles in a collection unit arranged at the second opening. According to some embodiments, the collection unit comprises a removeable collection unit configured to be fastened to the second opening via a fastening mechanism. According to some embodiments, the collection unit is further configured to allow the filtered fluid to flow therethrough. According to some embodiments, the collection unit comprises a dead-end filter comprising a further filter media configured to trap solids filtered from the fluid. According to some embodiments, the collection unit comprises a second-stage filtration device.

According to some embodiments, the filtered particles comprise microplastics. According to some embodiments, the filtered particles comprise microfibers. According to some embodiments, the filtered particles comprise microsolids.

According to some embodiments, the collection unit collects at least 70% of solids (e.g., microplastics) filtered from the fluid. According to some embodiments, the collection unit collects at least 75% of solids (e.g., microplastics) filtered from the fluid. According to some embodiments, the collection unit collects at least 80% of solids (e.g., microplastics) filtered from the fluid. According to some embodiments, the collection unit collects at least 85% of solids (e.g., microplastics) filtered from the fluid. According to some embodiments, the collection unit collects at least 90% of solids (e.g., microplastics) filtered from the fluid. According to some embodiments, the collection unit collects at least 91% of solids (e.g., microplastics) filtered from the fluid. According to some embodiments, the collection unit collects at least 92% of solids (e.g., microplastics) filtered from the fluid. According to some embodiments, the collection unit collects at least 93% of solids (e.g., microplastics) filtered from the fluid. According to some embodiments, the collection unit collects at least 94% of solids (e.g., microplastics) filtered from the fluid. According to some embodiments, the collection unit collects at least 95% of solids (e.g., microplastics) filtered from the fluid. According to some embodiments, the collection unit collects at least 96% of solids (e.g., microplastics) filtered from the fluid. According to some embodiments, the collection unit collects at least 97% of solids (e.g., microplastics) filtered from the fluid. According to some embodiments, the collection unit collects at least 98% of solids (e.g., microplastics) filtered from the fluid.

According to some embodiments, the vortical filter has a raker reduction ratio $\beta/\alpha$ in a range between about 0.1 and 10.0 including the end points. According to some embodiments, the vortical filter has a raker reduction ratio $\beta/\alpha$ in a range between about 1.0 and 10.0 including the end points. According to some embodiments, the vortical filter has a raker reduction ratio $\beta/\alpha$ in a range between about 1.0 and 6.0 including the end points. According to some embodiments, the vortical filter has a raker reduction ratio $\beta/\alpha$ in a range between about 2.0 and 5.0 including the end points. According to some embodiments, the vortical filter has a raker reduction ratio $\beta/\alpha$ in a range between about 3.0 and 4.0 including the end points.

According to some embodiments, the filtering particles from the fluid by flowing the fluid through the filter media surrounding at least a portion of the circumference of the vortical filter comprises providing a cross-flow filtration area across the filter media.

According to some embodiments, the vortical filter has a variable pitch.

According to some embodiments, the fluid is a liquid. According to some embodiments, the fluid is a gas. According to some embodiments, the fluid comprises a washing machine discharge fluid.

According to some embodiments, the filter media is fastened to the vortical filter by a housing. According to some embodiments, the vortical filter comprises a gasket configured to seal the vortical filter against the filter media.

According to some embodiments, the method further comprises enclosing the filtration device in an enclosure comprising an inlet opening configured to guide the fluid to the first opening and an outlet opening configured to guide filtered fluid out of the enclosure; and collecting the filtered particles in a particle collection unit. According to some embodiments, the particle collection unit is configured to be removed from the enclosure in a manner such that fluid remains in the enclosure when the particle collection unit is removed.

According to some embodiments, the method further comprises cleaning the vortical filter and the filter media using a scraping mechanism.

According to some embodiments, the method further comprises providing the fluid at the first opening at a flow speed greater than 50 cm/sec. According to some embodiments, the method further comprises providing the fluid at the first opening at a flow speed greater than 70 cm/sec. According to some embodiments, the method further comprises providing the fluid at the first opening at a flow speed greater than 90 cm/sec. According to some embodiments, the method further comprises providing the fluid at the first opening at a flow speed greater than 120 cm/sec. According to some embodiments, the method further comprises providing the fluid at the first opening at a flow speed greater than 140 cm/sec.

According to some embodiments, the solids or filtered particles comprise microplastics. According to some embodiments, the filtering filters greater than 80% of the microplastics by mass when post-filtered to 10 microns when measured using the method of Example 1 or Example 4. According to some embodiments, the filtering filters greater than 85% of the microplastics by mass when post-filtered to 10 microns when measured using the method of Example 1 or Example 4. According to some embodiments, the filtering filters greater than 90% of the microplastics by mass when post-filtered to 10 microns when measured using the method of Example 1 or Example 4. According to some embodiments, the filtering filters greater than 91% of the microplastics by mass when post-filtered to 10 microns when measured using the method of Example 1 or Example 4. According to some embodiments, the filtering filters greater than 92%, 93%, 94%, 95%, 96%, 97%, or 98% of the microplastics by mass when post-filtered to 10 microns when measured using the method of Example 1 or Example 4.

According to some embodiments, the filtering filters greater than 85% of the microplastics by mass when post-filtered to 10 microns when measured using the method of Example 2. According to some embodiments, the filtering filters greater than 90% of the microplastics by mass when post-filtered to 10 microns when measured using the method of Example 2. According to some embodiments, the filtering filters greater than 91% of the microplastics by mass when post-filtered to 10 microns when measured using the method of Example 2. According to some embodiments, the filtering filters greater than 92%, 93%, 94%, 95%, 96%, 97%, or 98% of the microplastics by mass when post-filtered to 10 microns when measured using the method of Example 2. According to some embodiments, the filtering filters greater than 99.0%, 99.1%, 99.2%, 99.3%, 99.4%, 99.5%, 99.6%, 99.7%, 99.8%, or 99.9% of the microplastics by mass when post-filtered to 10 microns when measured using the method of Example 2.

According to some embodiments, the filtering filters greater than 80% of the microplastics by count when measured using the method of Example 4. According to some embodiments, the filtering filters greater than 85% of the microplastics by count when measured using the method of Example 4. According to some embodiments, the filtering filters greater than 90% of the microplastics by count when measured using the method of Example 4. According to some embodiments, the filtering filters greater than 91% of the microplastics by count when measured using the method of Example 4. According to some embodiments, the filtering filters greater than 92%, 93%, 94%, 95%, 96%, 97%, or 98% of the microplastics by count when measured using the method of Example 4.

According to another aspect of this disclosure, according to some embodiments, a filtration device may include a vortical filter comprising a first opening, a second opening, a rib, and a cross-flow filtration region between the first opening and the second opening; the tapered helical coil having an interior raker reduction ratio $\beta/\alpha$ in a range between 0.1 and 10 including the end points; wherein the vortical filter is configured to generate vortices in a fluid entering the vortical filter via the first opening and being configured such that the filtered fluid exits through a filter media of the cross-flow filtration region, and wherein the vortical filter is configured such that filtered particles substantially exit the vortical filter at the second opening.

According to some embodiments, the rib extends continuously from the first opening to the second opening. According to some embodiments, the rib forms a flow path configured to guide filtered particles suspended in the vortices along a flow path to the second opening. According to some embodiments, the flow path is substantially continuous from the first opening to the second opening. According to some embodiments, the flow path is configured so as to not inhibit the flow of particles along the flow path towards the second opening. According to some embodiments, the rib spirals from the first opening to the second opening with a decreasing radius. According to some embodiments, the first opening has a cross-sectional area greater than the cross-sectional area of the second opening. According to some embodiments, the vortical filter comprises a tapered coil that is substantially cone-shaped. According to some embodiments, the vortical filter media comprises a porous material configured to block solids suspended in the fluid from passing through the filter media.

According to some embodiments, the filtration device further comprises a collection unit arranged at the second opening, the collection unit configured to collect solids filtered from the fluid. According to some embodiments, the collection unit comprises a removeable collection unit configured to be fastened to the filtration device via a fastening mechanism. According to some embodiments, the collection unit comprises a dead-end filter comprising a further filter media configured to trap solids filtered from the fluid; and a collection unit outlet configured to allow the fluid to flow therethrough. According to some embodiments, the collection unit is a second-stage filtration device.

According to some embodiments, the collection unit is configured to collect at least 70% of solids (e.g., microplastics) filtered from the fluid. According to some embodiments, the collection unit is configured to collect at least 75% of solids (e.g., microplastics) filtered from the fluid. According to some embodiments, the collection unit is configured to collect at least 80% of solids (e.g., microplastics) filtered from the fluid. According to some embodiments, the collection unit is configured to collect at least 85% of solids (e.g., microplastics) filtered from the fluid. According to some embodiments, the collection unit is configured to collect at least 90% of solids (e.g., microplastics) filtered from the fluid. According to some embodiments, the collection unit is configured to collect at least 91% of solids (e.g., microplastics) filtered from the fluid. According to some embodiments, the collection unit is configured to collect at least 92% of solids (e.g., microplastics) filtered from the fluid. According to some embodiments, the collection unit is configured to collect at least 93% of solids (e.g., microplastics) filtered from the fluid. According to some embodiments, the collection unit is configured to collect at least 94% of solids (e.g., microplastics) filtered from the fluid. According to some embodiments, the collection unit is configured to collect at least 95% of solids (e.g., microplastics) filtered from the fluid. According to some embodiments, the collection unit is configured to collect at least 96% of solids (e.g., microplastics) filtered from the fluid. According to some embodiments, the collection unit is configured to collect at least 97% of solids (e.g., microplastics) filtered from the fluid. According to some embodiments, the collection unit is configured to collect at least 98% of solids (e.g., microplastics) filtered from the fluid.

According to some embodiments, the vortical filter has a raker reduction ratio $\beta/\alpha$ in a range between about 1.0 and 10.0 including the end points. According to some embodiments, the vortical filter has a raker reduction ratio $\beta/\alpha$ in a range between about 1.0 and 6.0 including the end points. According to some embodiments, the vortical filter has a raker reduction ratio/in a range between about 2.0 and 5.0 including the end points. According to some embodiments, the vortical filter has a raker reduction ratio $\beta/\alpha$ in a range between about 3.0 and 4.0 including the end points.

According to some embodiments, the vortical filter is configured such that the rib has a rib width, the rib has a rib height, the vortical filter having a slot height between adjacent revolutions of the rib, the vortical filter has a helix height, the vortical filter has a helix pitch, and the slot height, rib width, rib height, helix height, and helix pitch being configured to create a rib overlap configured to generate the vortices to guide particles-to-be-filtered from the fluid along the rib toward the second opening.

According to some embodiments, the rib includes at least one ridge substantially adjacent to the filter media. According to some embodiments, the rib includes a plurality of ridges substantially adjacent to the filter media. According to some embodiments, the one or more ridges is configured to maintain vortices in the fluid. According to some embodiments, the one or more ridges is configured to facilitate travel of filtered particles along the flow path towards the second opening.

According to some embodiments, the vortical filter is configured to provide a cross-flow filtration area across the filter media.

According to some embodiments, the vortical filter has a variable pitch.

According to some embodiments, the fluid is a liquid. According to some embodiments, the fluid is a gas. According to some embodiments, the fluid comprises a washing machine discharge fluid.

According to some embodiments, the filtration device further comprises a housing, wherein the filter media is integrated into the housing. According to some embodiments, the filtration device further comprises a housing configured to contain the vortical filter, wherein the filter media is fastened between the housing and the vortical filter. According to some embodiments, the filtration device further comprises a gasket configured to seal the vortical filter against the filter media.

According to some embodiments, the filtration device further comprises an enclosure including an inlet opening configured to guide the fluid to the first opening, and an outlet opening configured to guide filtered fluid out of the enclosure; and a particle collection member configured to collect particles filtered from the fluid, the particle collection member being removable from the enclosure. According to some embodiments, the particle collection member is configured to be removed from the enclosure in a manner such that fluid remains in the enclosure when the particle collection member is removed.

According to some embodiments, the filtration device further comprises a scraping mechanism configured to clean the vortical filter and the filter media.

According to some embodiments, the filtration device is configured to filter discharge fluid from a washing machine. According to some embodiments, the filtration device is configured to filter microplastics from said discharge fluid. According to some embodiments, the filtration device is configured to filter at least 75% of the microplastics from the discharge fluid after the washing machine completes 4 or more loads of laundry. According to some embodiments, the filtration device is configured to filter at least 80%, 85%, 86%, 87%, 88%, 89%, 90%, 91%, 92%, 93%, 94%, or 95% of the microplastics from the discharge fluid after the washing machine completes 4 or more loads of laundry.

According to another aspect of this disclosure, according to some embodiments, a method for filtering particles from a fluid may include providing a vortical filter comprising a first opening, a second opening, a rib, and a cross-flow filtration region between the first opening and the second opening; providing a fluid at the first opening at a flow speed greater than 50 cm/sec, the fluid comprising particles to be filtered from the fluid; generating vortices in the fluid in a particle filtration path in a direction from the first opening to the second opening in the cross-flow filtration region along the rib; filtering the particles from the fluid along the particle filtration path by flowing the fluid through a filter media surrounding at least a portion of the circumference of the vortical filter; and removing the filtered particles from the vortical filter at the second opening. According to some embodiments, the vortical filter may have a tapered configuration, such as a tapered-helical configuration. The vortical filter may comprise a conical shaped filter. In some embodiments, the vortical filter comprises a tapered coil that has both a helical configuration and a conical shape. In some embodiments, the vortical filter comprises a tapered-helical coil.

According to some embodiments, the filtration path guides the filtered particles along the rib towards the second opening. According to some embodiments, the particle filtration path is substantially continuous between the first opening and the second opening. According to some embodiments, the particle filtration path is configured so as to not inhibit the flow of particles along the particle filtration path towards the second opening. According to some embodiments, the rib spirals from the first opening to the second opening with a decreasing radius. According to some embodiments, the first opening has a cross-sectional area greater than the cross-sectional area of the second opening. According to some embodiments, the vortical filter comprises a tapered coil is substantially cone-shaped. According to some embodiments, the filter media comprises a porous material configured to block solids suspended in the fluid from passing through the filter media.

According to some embodiments, the method further comprises collecting the filtered particles in a collection unit arranged at the second opening. According to some embodiments, the collection unit comprises a removeable collection unit configured to be fastened to the second opening via a fastening mechanism. According to some embodiments, the collection unit is further configured to allow the filtered fluid to flow therethrough. According to some embodiments, the collection unit comprises a dead-end filter comprising a further filter media configured to trap solids filtered from the fluid. According to some embodiments, the collection unit comprises a second-stage filtration device.

According to some embodiments, the filtered particles comprise microplastics. According to some embodiments, the filtered particles comprise microfibers. According to some embodiments, the filtered particles comprise microsolids.

According to some embodiments, the vortical filter has a raker reduction ratio $\beta/\alpha$ in a range between about 0.1 and 10.0 including the end points. According to some embodiments, the vortical filter has a raker reduction ratio $\beta/\alpha$ in a range between about 1.0 and 10.0 including the end points. According to some embodiments, the vortical filter has a raker reduction ratio $\beta/\alpha$ in a range between about 1.0 and 6.0 including the end points. According to some embodiments, the vortical filter has a raker reduction ratio $\beta/\alpha$ in a range between about 2.0 and 5.0 including the end points. According to some embodiments, the vortical filter has a raker reduction ratio $\beta/\alpha$ in a range between about 3.0 and 4.0 including the end points.

According to some embodiments, the filtering particles from the fluid by flowing the fluid through the filter media surrounding at least a portion of the circumference of the vortical filter comprises providing a cross-flow filtration area across the filter media.

According to some embodiments, the vortical filter has a variable pitch.

According to some embodiments, the fluid is a liquid. According to some embodiments, the fluid is a gas. According to some embodiments, the fluid comprises a washing machine discharge fluid.

According to some embodiments, the filter media is fastened to the vortical filter by a housing. According to some embodiments, the vortical filter comprises a gasket configured to seal the vortical filter against the filter media. According to some embodiments, the method further comprises enclosing the filtration device in an enclosure comprising an inlet opening configured to guide the fluid to the first opening and an outlet opening configured to guide filtered fluid out of the enclosure; and collecting the filtered particles in a particle collection unit. According to some embodiments, the particle collection unit is configured to be removed from the enclosure in a manner such that fluid remains in the enclosure when the particle collection unit is removed.

According to some embodiments, the method further comprises cleaning the vortical filter and the filter media using a scraping mechanism.

According to some embodiments, the method further comprises providing the fluid at the first opening at a flow speed greater than 70 cm/sec. According to some embodiments, the method further comprises providing the fluid at the first opening at a flow speed greater than 90 cm/sec. According to some embodiments, the method further comprises providing the fluid at the first opening at a flow speed greater than 120 cm/sec. According to some embodiments, the method further comprises providing the fluid at the first opening at a flow speed greater than 140 cm/sec.

According to some embodiments, the solids or filtered particles comprise microplastics. According to some embodiments, the filtering filters greater than 80% of the microplastics by mass when post-filtered to 10 microns when measured using the method of Example 1 or Example 4. According to some embodiments, the filtering filters greater than 85% of the microplastics by mass when post-filtered to 10 microns when measured using the method of Example 1 or Example 4. According to some embodiments, the filtering filters greater than 90% of the microplastics by mass when post-filtered to 10 microns when measured using the method of Example 1 or Example 4. According to some embodiments, the filtering filters greater than 91% of the microplastics by mass when post-filtered to 10 microns when measured using the method of Example 1 or Example 4. According to some embodiments, the filtering filters greater than 92%, 93%, 94%, 95%, 96%, 97%, or 98% of the microplastics by mass when post-filtered to 10 microns when measured using the method of Example 1 or Example 4.

According to some embodiments, the filtering filters greater than 85% of the microplastics by mass when post-filtered to 10 microns when measured using the method of Example 2. According to some embodiments, the filtering filters greater than 90% of the microplastics by mass when post-filtered to 10 microns when measured using the method of Example 2. According to some embodiments, the filtering filters greater than 91% of the microplastics by mass when post-filtered to 10 microns when measured using the method of Example 2. According to some embodiments, the filtering filters greater than 92%, 93%, 94%, 95%, 96%, 97%, or 98% of the microplastics by mass when post-filtered to 10 microns when measured using the method of Example 2. According to some embodiments, the filtering filters greater than 99.0%, 99.1%, 99.2%, 99.3%, 99.4%, 99.5%, 99.6%, 99.7%, 99.8%, or 99.9% of the microplastics by mass when post-filtered to 10 microns when measured using the method of Example 2.

According to some embodiments, the filtering filters greater than 80% of the microplastics by count when measured using the method of Example 4. According to some embodiments, the filtering filters greater than 85% of the microplastics by count when measured using the method of Example 4. According to some embodiments, the filtering filters greater than 90% of the microplastics by count when measured using the method of Example 4. According to some embodiments, the filtering filters greater than 91% of the microplastics by count when measured using the method of Example 4. According to some embodiments, the filtering filters greater than 92%, 93%, 94%, 95%, 96%, 97%, or 98% of the microplastics by count when measured using the method of Example 4.

According to another aspect of this disclosure, according to some embodiments, a method for filtering microplastics from a washing machine discharge fluid, may include providing the washing machine discharge fluid at a first opening of a vortical filter of a filtration device, the tapered helical coil comprising a rib, the rib having a decreasing interior radius between the first opening and a second opening of the vortical filter; generating vortices in the washing machine discharge fluid along the rib along a particle filtration path in a direction from the first opening to the second opening; filtering microplastics from the washing machine discharge fluid along the particle filtration path by flowing the washing machine discharge fluid through a filter media surrounding at least a portion of the circumference of the vortical filter; and removing the filtered microplastics from the vortical filter at the second opening, wherein the filtering the microplastics filters greater than 80% of the microplastics by mass when post-filtered to 10 microns when measured using the method of Example 1, Example 2, or Example 4. According to some embodiments, the vortical filter may have a tapered configuration, such as a tapered-helical configuration. The vortical filter may comprise a conical shaped filter. In some embodiments, the vortical filter comprises a tapered coil that has both a helical configuration and a conical shape. In some embodiments, the vortical filter comprises a tapered-helical coil.

According to some embodiments, the filtering filters greater than 85% of the microplastics by mass when post-filtered to 10 microns when measured using the method of Example 1 or Example 4. According to some embodiments, the filtering filters greater than 90% of the microplastics by mass when post-filtered to 10 microns when measured using the method of Example 1 or Example 4. According to some embodiments, the filtering filters greater than 91% of the microplastics by mass when post-filtered to 10 microns when measured using the method of Example 1 or Example 4. According to some embodiments, the filtering filters greater than 92%, 93%, 94%, 95%, 96%, 97%, or 98% of the microplastics by mass when post-filtered to 10 microns when measured using the method of Example 1 or Example 4.

According to some embodiments, the filtering filters greater than 85% of the microplastics by mass when post-filtered to 10 microns when measured using the method of Example 2. According to some embodiments, the filtering filters greater than 90% of the microplastics by mass when post-filtered to 10 microns when measured using the method of Example 2. According to some embodiments, the filtering filters greater than 91% of the microplastics by mass when post-filtered to 10 microns when measured using the method of Example 2. According to some embodiments, the filtering filters greater than 92%, 93%, 94%, 95%, 96%, 97%, or 98% of the microplastics by mass when post-filtered to 10 microns when measured using the method of Example 2. According to some embodiments, the filtering filters greater than 99.0%, 99.1%, 99.2%, 99.3%, 99.4%, 99.5%, 99.6%, 99.7%, 99.8%, or 99.9% of the microplastics by mass when post-filtered to 10 microns when measured using the method of Example 2.

According to some embodiments, the filtering filters greater than 80% of the microplastics by count when measured using the method of Example 4. According to some embodiments, the filtering filters greater than 85% of the microplastics by count when measured using the method of Example 4. According to some embodiments, the filtering filters greater than 90% of the microplastics by count when measured using the method of Example 4. According to some embodiments, the filtering filters greater than 91% of the microplastics by count when measured using the method of Example 4. According to some embodiments, the filtering filters greater than 92%, 93%, 94%, 95%, 96%, 97%, or 98% of the microplastics by count when measured using the method of Example 4.

According to some embodiments, the particle filtration path is substantially continuous between the first opening and the second opening. According to some embodiments, the particle filtration path is configured so as to not inhibit the flow of microplastics along the particle filtration path towards the second opening. According to some embodiments, the rib spirals from the first opening to the second opening with a decreasing radius. According to some embodiments, the first opening has a cross-sectional area greater than the cross-sectional area of the second opening. According to some embodiments, the vortical filter comprises a tapered coil that is substantially cone-shaped. According to some embodiments, the filter media comprises a porous material configured to block solids suspended in the fluid from passing through the filter media.

According to some embodiments, the method further comprises collecting the filtered microplastics in a collection unit arranged at the second opening.

According to some embodiments, the collection unit comprises a removeable collection unit configured to be fastened to the second opening via a fastening mechanism. According to some embodiments, the collection unit is further configured to allow the filtered washing machine discharge fluid to flow therethrough. According to some embodiments, the collection unit comprises a dead-end filter comprising a further filter media configured to trap solids filtered from the washing machine discharge fluid. According to some embodiments, the collection unit comprises a second-stage filtration device.

According to some embodiments, the filtered microplastics comprise microfibers.

According to some embodiments, the vortical filter has a raker reduction ratio $\beta/\alpha$ in a range between about 0.1 and 10.0 including the end points. According to some embodiments, the vortical filter has a raker reduction ratio $\beta/\alpha$ in a range between about 1.0 and 10.0 including the end points. According to some embodiments, the vortical filter has a raker reduction ratio $\beta/\alpha$ in a range between about 1.0 and 6.0 including the end points. According to some embodiments, the vortical filter has a raker reduction ratio $\beta/\alpha$ in a range between about 2.0 and 5.0 including the end points. According to some embodiments, the vortical filter has a raker reduction ratio $\beta/\alpha$ in a range between about 3.0 and 4.0 including the end points.

According to some embodiments, the filtering the microplastics from the washing machine discharge fluid by flowing the washing machine discharge fluid through the filter media surrounding at least a portion of the circumference of the vortical filter comprises providing a cross-flow filtration area across the filter media.

According to some embodiments, the vortical filter has a variable pitch.

According to some embodiments, the filter media is fastened to the vortical filter by a housing. According to some embodiments, the vortical filter comprises a gasket configured to seal the vortical filter against the filter media.

According to some embodiments, the method further comprises enclosing the filtration device in an enclosure comprising an inlet opening configured to guide the washing machine discharge fluid to the first opening and an outlet opening configured to guide filtered washing machine discharge fluid out of the enclosure; and collecting the filtered microplastics in a particle collection unit. According to some embodiments, the particle collection unit is configured to be removed from the enclosure in a manner such that washing machine discharge fluid remains in the enclosure when the particle collection unit is removed.

According to some embodiments, the method further comprises cleaning the vortical filter and the filter media using a scraping mechanism.

According to some embodiments, the method further comprises providing the washing machine discharge fluid at the first opening at a flow speed greater than 50 cm/sec. According to some embodiments, the method further comprises providing the washing machine discharge fluid at the first opening at a flow speed greater than 70 cm/sec. According to some embodiments, the method further comprises providing the washing machine discharge fluid at the first opening at a flow speed greater than 90 cm/sec. According to some embodiments, the method further comprises providing the washing machine discharge fluid at the first opening at a flow speed greater than 120 cm/sec. According to some embodiments, the method further comprises providing the washing machine discharge fluid at the first opening at a flow speed greater than 140 cm/sec.

According to another aspect of this disclosure, according to some embodiments, a controller may include a processor; and a storage communicatively coupled to the processor, wherein the processor is configured to execute programmed instructions stored in the storage to determine a parameter of fluid flow through a filter and operate a scraping mechanism of the filter based on the parameter.

It is to be understood that both the foregoing general description and the following detailed description are exemplary and explanatory only and are not restrictive of the subject matter that may be claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
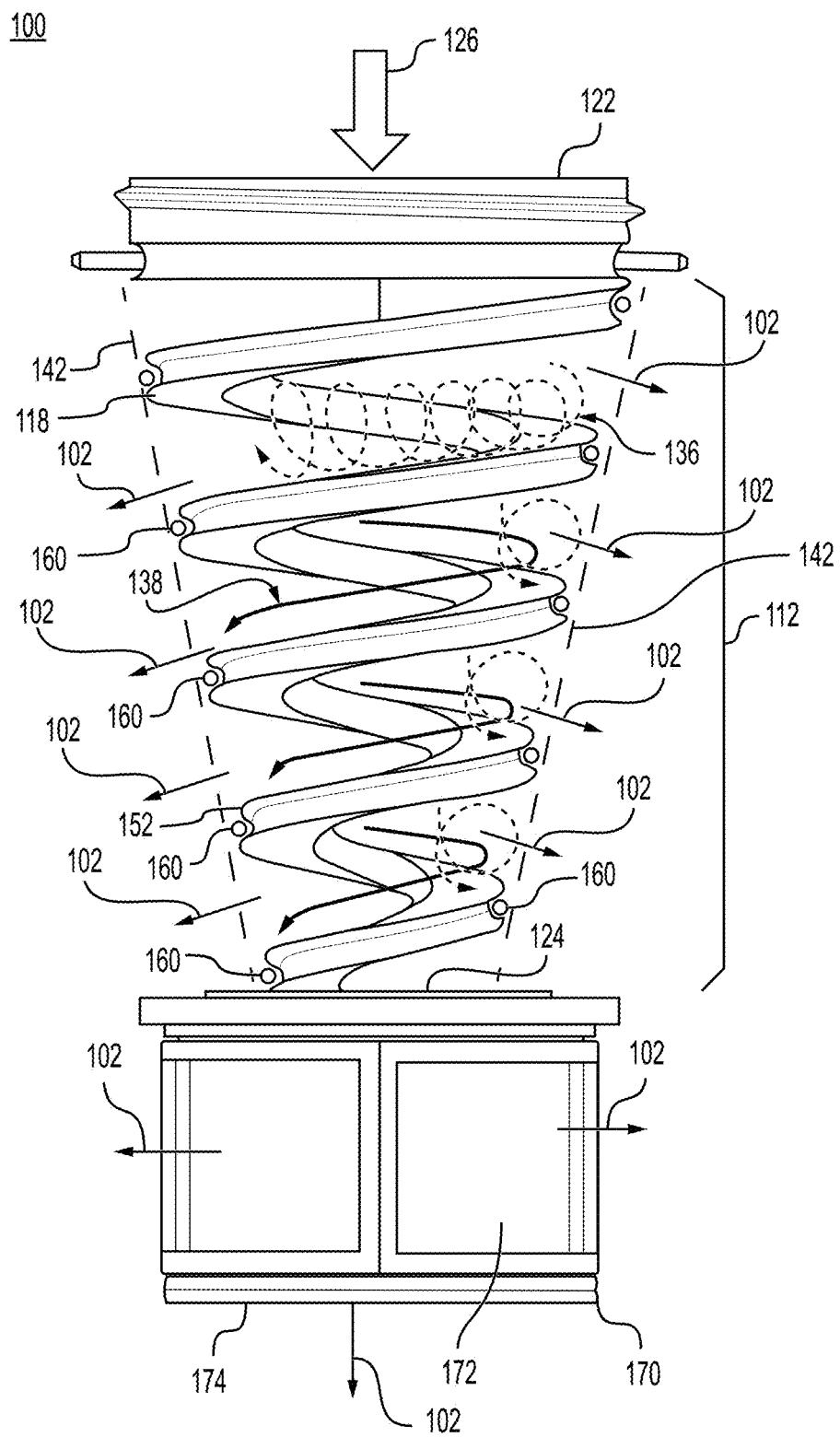
FIG. 1 shows an exemplary filtration device, consistent with some embodiments of this disclosure.

Reference will now be made in detail to exemplary embodiments, examples of which are illustrated in the accompanying drawings. Where convenient, the same reference numbers may be used throughout the drawings to refer to the same or like parts. The implementations set forth in the following description are exemplary embodiments and do not represent all implementations consistent with the present disclosure. While some examples and features of disclosed principles are described herein, modifications, adaptations, and other implementations are possible without departing from the spirit and scope of the disclosure. It is intended that the following detailed description be considered as merely examples of systems, apparatuses, and methods consistent with aspects of this disclosure.

Some embodiments may provide improvements to prior filtration systems and methods, such as improved filtration performance, higher collection efficiency of suspended solids, easier ability to maintain the filter, improved cleanliness of filter media, improved accessibility for user intervention (e.g., emptying a collection unit), improved packaging, reduced pressure drop across filter media, high efficiency filtration of small particles (e.g., microparticles and microplastics), efficient filtration at high flow rates or high flow speeds, and reduced tendency for clogging, contamination, fouling, etc. For example, some embodiments may achieve a filter able to collect a relatively large amount of solids over a broad range of filtered solid sizes in a collection unit, while the filter media remains relatively clean after extended use. In some embodiments, the filter achieves high filtration efficiency at high flow rates and high flow speeds. In some embodiments, a filter may filter solids or microsolids from a fluid, such as air or water. In some embodiments, a filter may filter microplastics from water, such as, for example, from wastewater, drinking water, or laundry water.

The problem of particulate waste is growing. In particular, it is becoming increasingly recognized that microsolid waste, such as microplastics, is a significant problem and is becoming a health hazard. "Microplastics," for example, are generally considered to be any synthetic particles having regular or irregular shapes with a size less than 5 millimeters. Microplastics may come from both primary and secondary sources. Primary sources include textile abrasion (e.g., synthetic fibers in clothing that break down in washing machines and are discharged into the environment via laundry wastewater) and tire abrasion (e.g., tire wear from normal driving causing rubber to be constantly worn down and left on road surfaces that is washed away into the environment). Secondary sources include the breakdown of larger pieces of plastic (e.g., plastic bottles) breaking down into smaller pieces. Microplastics then make their way into the water supply for human consumption. Although some embodiments of the present description may be described in terms of microplastics to aid in explanation, the present disclosure is not limited to filtering microplastics, but can be used to filter other solids, particles, microsolids, microparticles, microfibers, particulate matter, or other filterable substances from a fluid.

Studies have shown that the average person may consume about five grams of microplastic, which is equivalent in weight to a plastic credit card, per week. It is believed that about 35% of this plastic comes from textile abrasion, which is considered to be the single largest point source of microplastics released into the environment. Human ingestion of microplastics is associated with and linked to autism, early puberty, malignancies, such as colon and breast cancer, and heart problems.

Besides the risks to human health, microplastic and other plastic waste impacts the environment and climate, as well. Microplastics and other plastic particles may interfere with the natural biological pumping action of the world's oceans, which is one of the earth's largest carbon sinks (sequestering over 40% of the carbon emitted since World War II). The continued build-up of microplastics in the environment may interfere with this and others of the earth's natural processes, such as radiative forcing. For example, microplastics in the atmosphere may contribute to the greenhouse effect by reflecting or absorbing heat released from the earth's surface, rather than allowing it to escape.

Filtering of microplastics suspended in flowing fluid (e.g., water or air) has been challenging due to the size of the particles and the flow rate of fluid, especially at high flow rates or high flow speeds. Prior filtration methods, for example dead-end and conventional cross-flow filter systems using filter media, are not effective at high flow rates, high flow speeds, or at high concentrations of microplastics. Moreover, such filters are difficult to clean and cannot effectively select for smaller sizes of microplastics or other particles. In many applications, such as, for example, laundry machines, the fluid discharge has a high flow rate and high flow speed to discharge a relatively large amount of fluid in a short time, resulting in both high-velocity and high-pressure discharge. Dead-end filtration is not effective in such situations because flow restriction caused by the filter media and the build-up of filtered residue at the filter media create a pressure drop across the filter media and back pressure, resulting in low flow through the filter, and eventual blockage, which can lead to catastrophic failure of the discharge line. Such failure may, result in pump failure, inability to drain water from the washing machine, and leaks from the washing machine. At sufficiently high flow rates, fine filter medias can impede the filtration flow causing back pressure through the system which may blow out hoses or pipes, leading to leaks, catastrophic hose or pipe failure, or damage to various components of the system. Conventional cross-flow filtration methods are also ineffective because residue collects on the filter media, the filters are not easily cleaned, and they are relatively low efficiency such that much of the microplastic content is still discharged. Prior cross-flow filtration filters are also ineffective at high flow rates and high flow speeds because they cannot efficiently filter particles from the fluid.

An exemplary filter of this disclosure may address such problems involved in filtering microplastics from a flowing fluid without producing an excessive pressure drop and filter clogging, thus improving filtration performance. The exemplary filters are also more effective at filtering particles, such as microplastics, at high flow rates and high flow speeds, such as flow speeds greater than 50 cm/sec. The filter may include a filtration region where suspended solids (e.g., particles) are separated from fluid, such as by cross-flow filtrations between adjacent revolutions of the tapered-coil. While the following description refers to the vortical filer as comprising a tapered coil, and one further having a helical configuration, this is an embodiment of the disclosure. The invention should not be limited to the helical or tapered-helical configuration. However, with respect to this configuration, the flow of particles may include a vortical flow between adjacent revolutions of a tapered-helical coil. The filter may be configured to advance the flow of particles along a flow path between adjacent revolutions of the tapered-helical coil toward a collection region where the particles can be captured and disposed of.

FIG. 1 shows an exemplary filtration device of this disclosure having a tapered-helical coil that generally decreases in diameter along a fluid flow direction 126. As shown in FIG. 1, a filtration device 100 has a first opening 122, such as a fluid inlet where an inlet fluid flow 126 enters. Filtration device 100 includes a tapered-helical coil 112 that extends away from first opening 122 towards a second opening 124. The second opening 124 may be opposite the first opening 122. As shown in FIG. 1, in some embodiments, second opening 124 may open into a residue collection unit 170. Tapered-helical coil 112 includes a rib 118. As the fluid to be filtered passes from first opening 122 to second opening 124, rib 118 in the shape of tapered-helical coil 112 generates vortices 136 in the fluid. Vortices 136 promote movement of particles to be filtered (e.g., the filter residue) along particle flow path 138 (e.g., toward second opening 124), while filtered fluid (e.g., filtrate) flow 102 is able to exit through filter media 142, such as by cross-flow filtration across filter media 142. To facilitate understanding of FIG. 1, filter media 142 is shown only in cross-section, although it is understood to surround rib 118. Filter media 142 may be integrated directly with rib 118, or may be attached or coupled to rib 118 as part of a housing 114 (not shown). Exemplary housing 114 is described below with reference to FIG. 7. In some embodiments, tapered-helical coil 112 may include groove 152 and gasketing rod 160, which are described in further detail below with reference to FIG. 6. Rib 118 of tapered-helical coil 112 may form a flow guide for particle flow path 138 and fluid flowing through filtration device 100. In some embodiments, rib 118 may comprise a continuous flow guide (e.g., unbroken from start to finish) along the fluid flow direction from first opening 122 to second opening 124. In some embodiments, particle flow path 138 may be substantially unobstructed to facilitate the flow of filtered particles toward second opening 124 along rib 118. In some embodiments, residue collection unit 170 (e.g., for collecting filtered particles) may be provided at second opening 124 of tapered-helical coil 112. Filter media 142 (e.g., a mesh or membrane) may be provided around tapered-helical coil 112 (e.g., partially or completely surrounding lateral sides of the revolutions of ribs 118), such as shown in FIG. 1, to allow the filtrate to be separated from the residue, such as by cross-flow filtration along particle flow path 138. Residue collection unit 170 includes a filter media 172 of its own, which may be the same or different from filter media 142 and housing 174.

In operation, fluid and suspended particles enter an inlet of the tapered-helical coil, such as from the larger diameter end, such as shown in FIG. 1. The fluid flow pushes the particles and fluid radially outward toward the sides of the coil to create vortices 136. As shown in FIG. 1, filter media 142 surrounding tapered-helical coil 112 prevents particles from exiting the filter. Meanwhile, filtered fluid flow 102 exits through filter media 142 between revolutions of rib 118, such as by cross-flow filtration. The geometry of tapered-helical coil 112 causes particles to travel with vortices 136 along the coil along a particle flow path 138 along rib 118 toward the outlet as fluid flows through the filter. In addition, particles may accumulate in residue collection unit 170 where they are contained by filter media 172 while filtered flow 102 also exits through a collection unit outlet 174 and via sides of residue collection unit 170. Collection unit outlet 174 may also be covered by filter media 172.

Vortices 136 generated by tapered helical coil 112 cause particles to be constantly mixed back into the fluid flow, either along particle path 138 or back into the center of coil 112. These vortices also contribute to cross-flow filtration across filter media 142. Because vortices 136 cause the particles to remain in suspension rather than becoming caked on filter media 142 or collecting on rib 118, the formation of vortices 136 and particle flow path 138 towards second opening 124 prevent buildup of filtered particles along filter media 142, thereby maintaining filter efficiency over continued use. Filter media 142 can be configured to appropriately filter (e.g., using a particular pore size) particles of a certain size. Filter media 142 can also be configured based on desired collection parameters. For example, the filter described herein may be configured to capture approximately 90% or more by mass of microparticles when post filtered to 10 micrometers in size when measured using either the method of Example 1, Example 2, or Example 4.

Furthermore, the motion of particles induced by vortices 136 may cause the particles to collide with one another, resulting in flocculation to create larger particles which are easier to filter out, whereas smaller particles might be able to pass through the filter media. Flocculation induced by the vortices may provide better efficiency in a filter, allowing it to capture particles even though its filter media may have a pore size larger than the particles being captured. Also, due to vortices, particles are pushed toward second opening 124 of the filter while the tapered-helical coil 112 and filter media 142 remain relatively clean. The particles can be collected in collection unit 170 arranged at second opening 124, which may be at the narrow end of the coil. In some embodiments, collection unit 170 may, in some embodiments, act similarly to a dead-end filter except that fluid flow may be reduced at collection unit 170 compared to conventional dead-end filters because the primary filtration occurs through filter media 142 along tapered-helical coil 112, such as by cross-flow filtration. Also, because filtrate fluid can exit via filter media 142, a pressure drop across filter media 142 and collection unit 170 can be reduced or eliminated. In some embodiments, collection unit 170 may include a removable cup so that particle residue (e.g., a filter "cake") can be easily discarded from the filter. In some embodiments, collection unit 170 may act similarly to a cross-flow filter, or some other type of filter. In some embodiments, the collection unit includes a second stage of filtration that allows additional removal of particles. For example, rather than a dead-end filter, the second stage filtration may provide further filtration or discharge of the filtered particles using a continuous flow of another fluid so that there is no need to periodically stop and clean the filter or collection unit.

Figure 2:
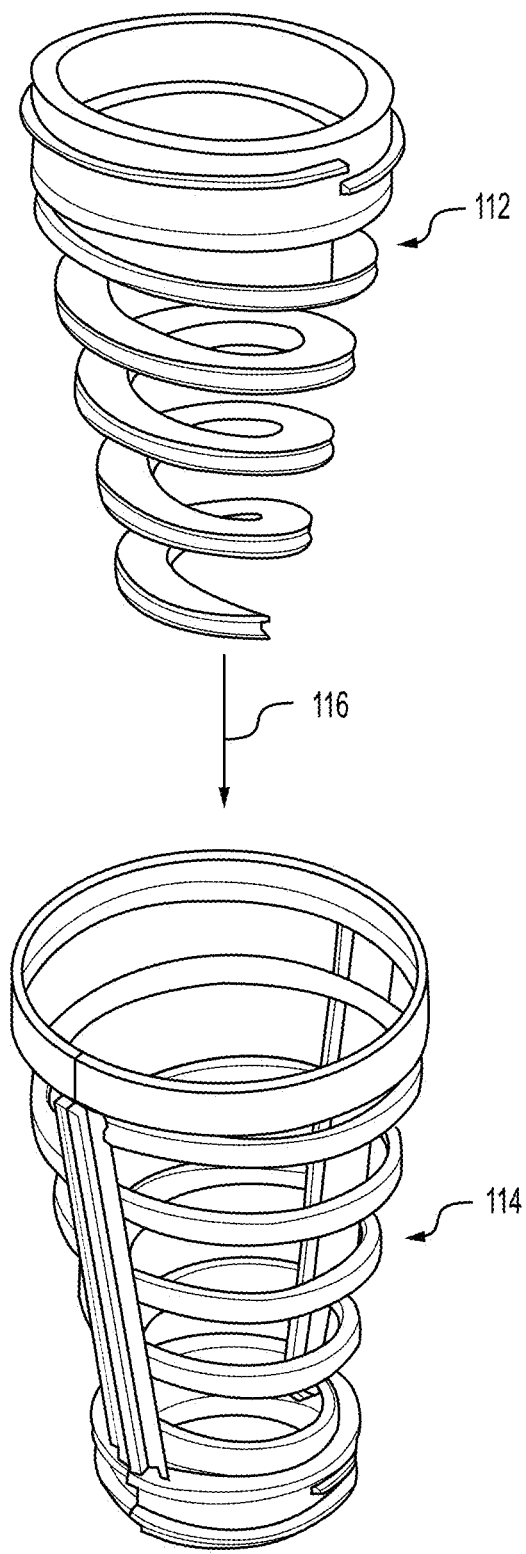
FIG. 2 shows an exemplary exploded perspective view of an exemplary filtration device, consistent with some embodiments of this disclosure.

FIG. 2 also shows components of an exemplary filtration device consistent with embodiments of the disclosure. A filtration device is shown having two parts: a tapered-helical coil 112 and a housing 114. In some embodiments, housing 114 may include filter media 142 (not shown). In some embodiments, there may be further parts, including one or more parts shown in FIG. 1, such as a residue collection unit. As shown in FIG. 2, tapered-helical coil 112 may be inserted into housing 114 as shown by arrow 116. For example, tapered-helical coil 112 and housing 114 may be sized and shaped such that tapered-helical coil 112 can be disposed inside housing 114, which may comprise filter media 142 (not shown), to facilitate assembly of a filtration device.

FIGS. 3A-3D show exemplary tapered-helical coils 112 in more detail. Tapered-helical coil 112 can be a unitary (e.g., monolithic) or multi-piece component having a spirally oriented rib 118. Tapered-helical coil 112 may be configured to generate vortices along rib 118. Rib 118 may coil into a funnel-shaped vortex that revolves about central axis 120 between adjacent revolutions of rib 118. In operation, fluid flow enters at first opening 122, as indicated by arrow 126. First opening 122 may be formed at a first end of tapered-helical coil 112. The first opening of tapered-helical coil 112 may be the relatively wider of two ends of tapered-helical coil 112. The opening may refer to the cross-sectional flow area open for fluid flow through tapered-helical coil 112 in the direction indicated by arrow 126. As fluid passes through tapered-helical coil 112, filtrate fluid can exit from lateral sides (e.g., spaces between revolutions of rib 118) of tapered-helical coil 112. Fluid can also exit through second opening 124. Tapered-helical coil 112 may, when surrounded by the housing 114 or other filter media 142, form a flow guide that influences fluid flowing through the filter. Tapered-helical coil 112 may generate vortices, such as vortexes, eddies, or any fluid flow mechanism that entrains, concentrates, or transports particles suspended therein, generally along a spiral, looping, or winding path along rib 118 towards second opening 124.

A filtration region may be configured around the exterior of the tapered helical coil between revolutions of rib 118 between first opening 122 and second opening 124. The formation of vortices may encourage particle movement toward second opening 124, such as along rib 118, as described with reference to FIG. 1. In some embodiments, second opening 124 may open into a collection region where particles are collected or a waste discharge flow, while the filtration region remains relatively particle-free.

Tapered-helical coil 112 may form a continuous flow guide along rib 118. For example, rib 118 may include a relatively unbroken rib from first opening 122 to second opening 124. In some embodiments, rib 118 may form a functionally continuous flow guide between adjacent revolutions of rib 118 such that any discontinuities along the flow path along rib 118 do not significantly obstruct the fluid or particle flow in direction 138. Rib 118 may be uninterrupted. Rib 118 may be formed from a contiguous, single piece of material with no gaps, providing a flow path from fluid inlet 122 to narrow end 124 along the helical path of tapered-helical flow guide 112. The flow path includes vortices 136 generated by fluid flow impinging on rib 118 via concentrically smaller radial rotations of rib 118 about axis 120 of tapered-helical coil 112.

A single rib 118 may have certain advantages for the design of tapered-helical coil 112. For example, a single rib 118 may provide for better vortex generation because the helical shape of the rib may provide for a sharper angle of incidence because the rib face may be more perpendicular the input flow direction 126. The raker reduction ratio $\beta/\alpha$ may also contribute to vortex formation. A single rib 118 may, in some embodiments, complete between 2 and 6 revolutions between first opening 122 and second opening 124. For example, the rib may complete 2.0, 2.25, 2.33, 2.5, 2.66, 2.75, 3.0, 3.25, 3.33, 3.5, 3.66, 3.75, 4.0, 4.25, 4.33, 4.5, 4.66, 4.75, 5.0, 5.25, 5.33, 5.5, 5.66, 5.75, or 6.0 revolutions between first opening 122 and second opening 124. Providing for more revolutions, such as by a single rib, combined with the raker reduction ratio may facilitate improved vortex generation and filtering of the fluid, as well as facilitate the movement of filtered particles towards second opening 124 for collection.

Although certain embodiments are shown having a single rib 118, tapered-helical coil 112 may include a plurality of ribs 118. For example, tapered-helical coil 112 may include two ribs 118, where each rib creates a tapered coil shape opposite the opposing rib. The use of multiple ribs may be advantageous in some applications because it allows for tapered-helical coil 112 to maintain a lesser spacing between adjacent ribs while permitting steeper pitches to the coil. In this way, the raker reduction ratio β/α of the rib's projection into the coil (described below) or other parameters can be more readily controlled in certain embodiments. The use of multiple ribs also allows for alternating ribs to have differing dimensions, providing further control of the design of tapered-helical coil 112. In some embodiments, tapered-helical coil 112 may include two, three, four, or five ribs. In some embodiments, the multiple ribs may be evenly spaced around the circumference of tapered-helical coil 112. In other embodiments, the multiple ribs may be unevenly spaced around the circumference of tapered-helical coil 112. In some embodiments, each of the multiple ribs may have the same or similar cross-sectional shapes. In other embodiments, one or more of the multiple ribs may vary in cross-sectional shape, thereby permitting varying raker reduction ratios β/α (described below) within tapered-helical coil 112.

In addition to or alternative to rib 118, tapered-helical coil 112 may, in some embodiments, include structure such as a vane, blade, plate, panel, slat, fin, strip, obstruction, or any solid member configured to cause a perturbance in fluid flowing past it. Rib 118 may act like a baffle to cause perturbation in flowing fluid over it, which may generate or contribute to forming vortices in tapered-helical coil 112. Rib 118 may spiral from first opening 122 to second opening 124 with a decreasing radius. The radius may be measured from axis 120 outward in a direction orthogonal to axis 120. A shape of rib 118 may be a spiral, twist, curve, corkscrew, decreasing radius turn, logarithmic spiral, or Archimedean spiral. In some embodiments, the rib may comprise a d-type rib, such as a backwards-facing d-type rib.

Various parameters of tapered-helical coil 112 may be adjusted based on filtering parameters or performance. For example, tapered-helical coil 112 may be sized and shaped with varying numbers of revolutions of rib 118. Further parameters may include rib dimensions such as rib width, rib height, rib cross-sectional shape, rib angle (e.g., inclination of rib front or rear surfaces relative to axis 120 (FIG. 15)), and helix dimensions such as helix pitch, helix height, helix inclination, helix eccentricity, helix angle (e.g., a degree of tapering of tapered-helical coil from first opening 122 to second opening 124), and others. In some embodiments, tapered-helical coil 112 may be made as a unitary component, such as by injection molding, machining, extrusion, and other manufacturing techniques. Tapered-helical coil 112 can also be assembled from component parts that are each manufactured separately.

Figure 3A:
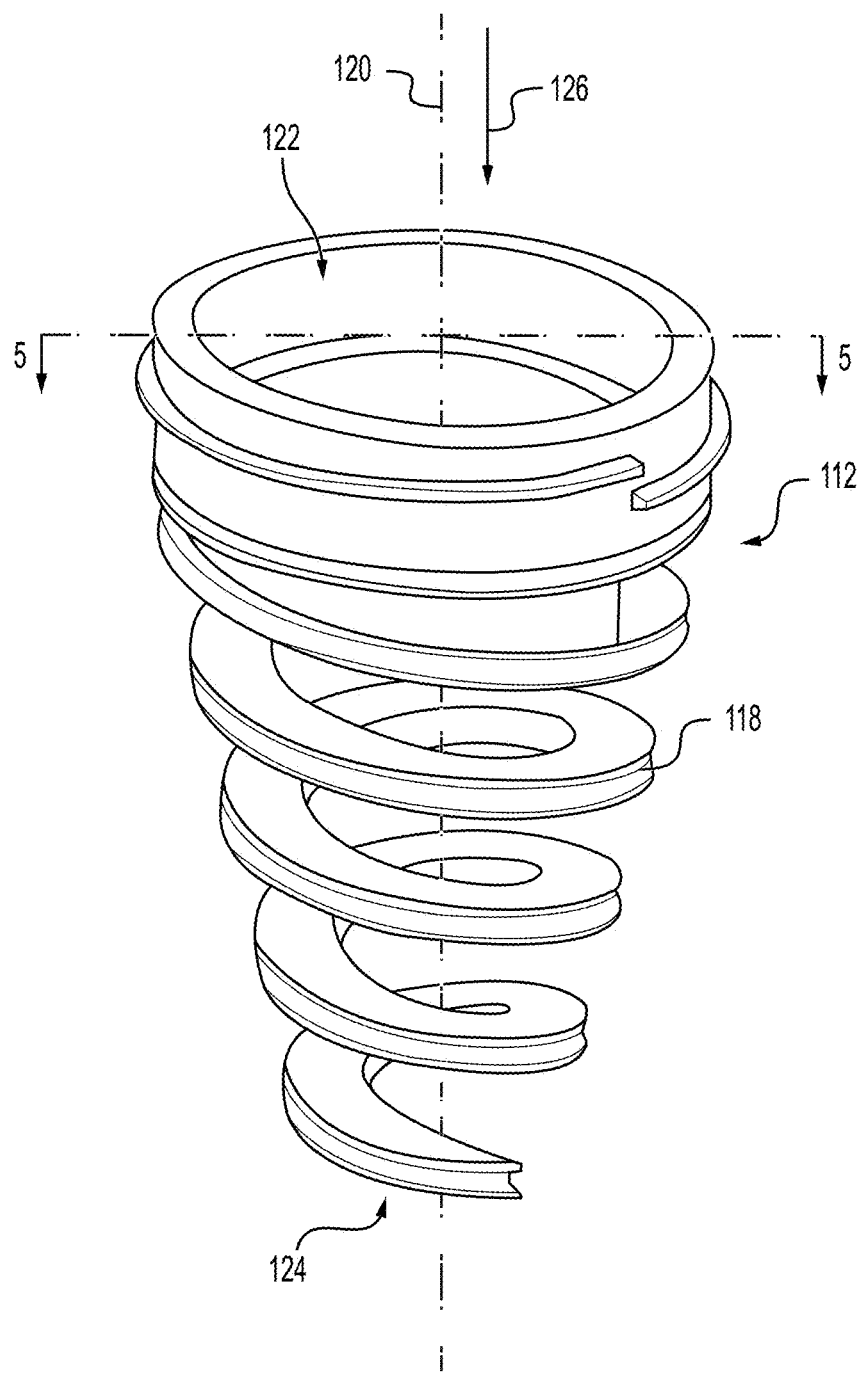
FIGS. 3A-3D show exemplary tapered-helical coils, consistent with some embodiments of this disclosure.
Figure 3B:
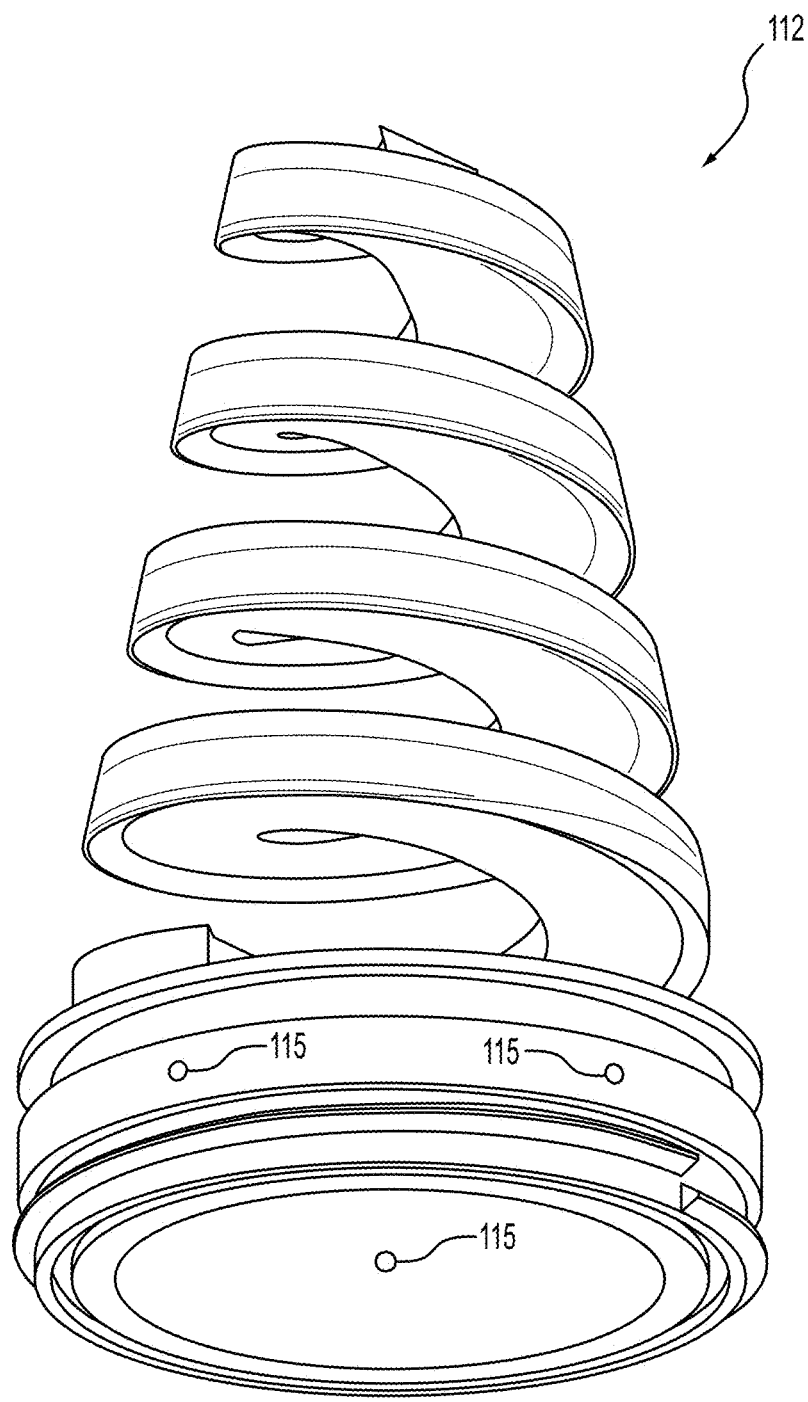
Figure 3C:
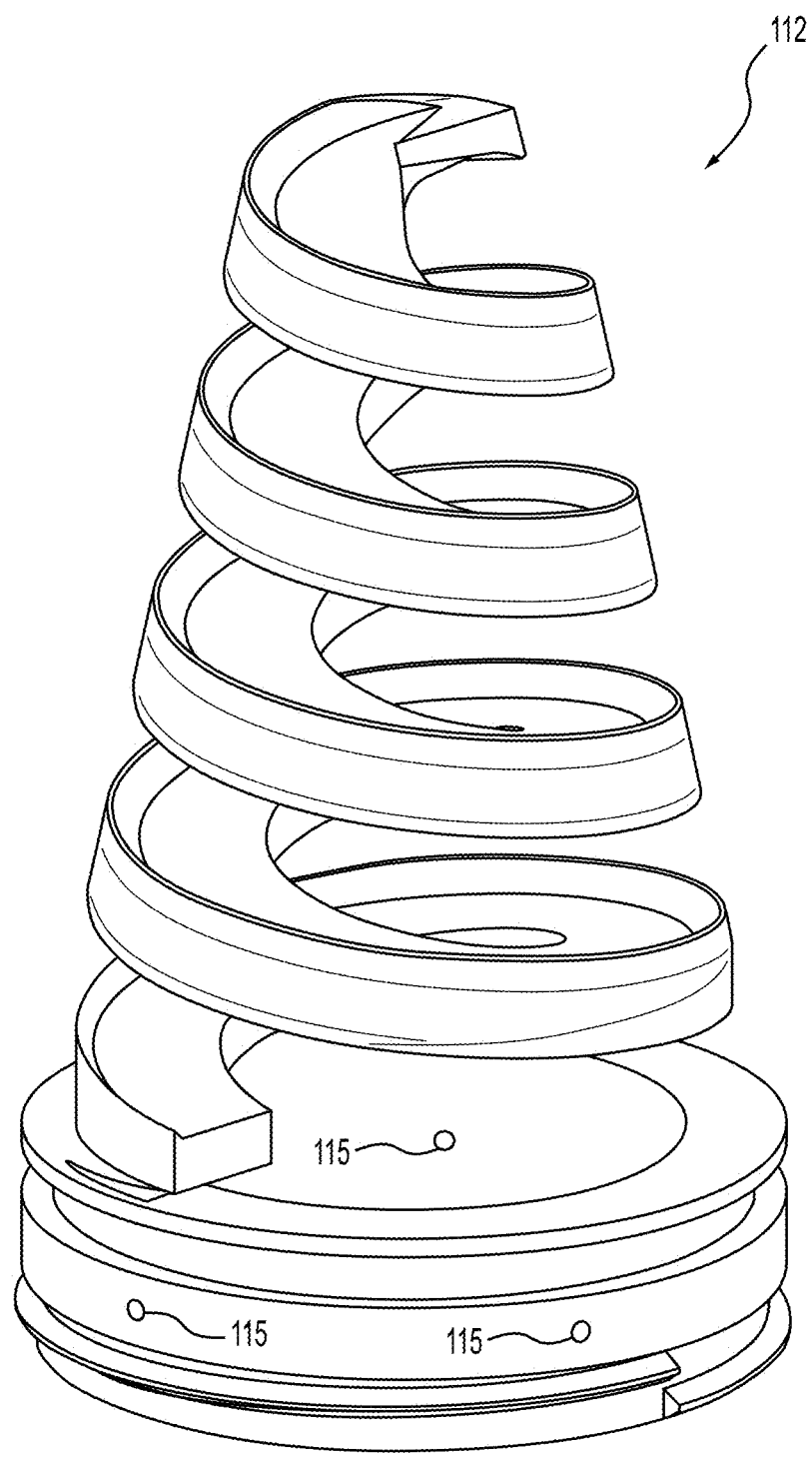
Figure 3D:
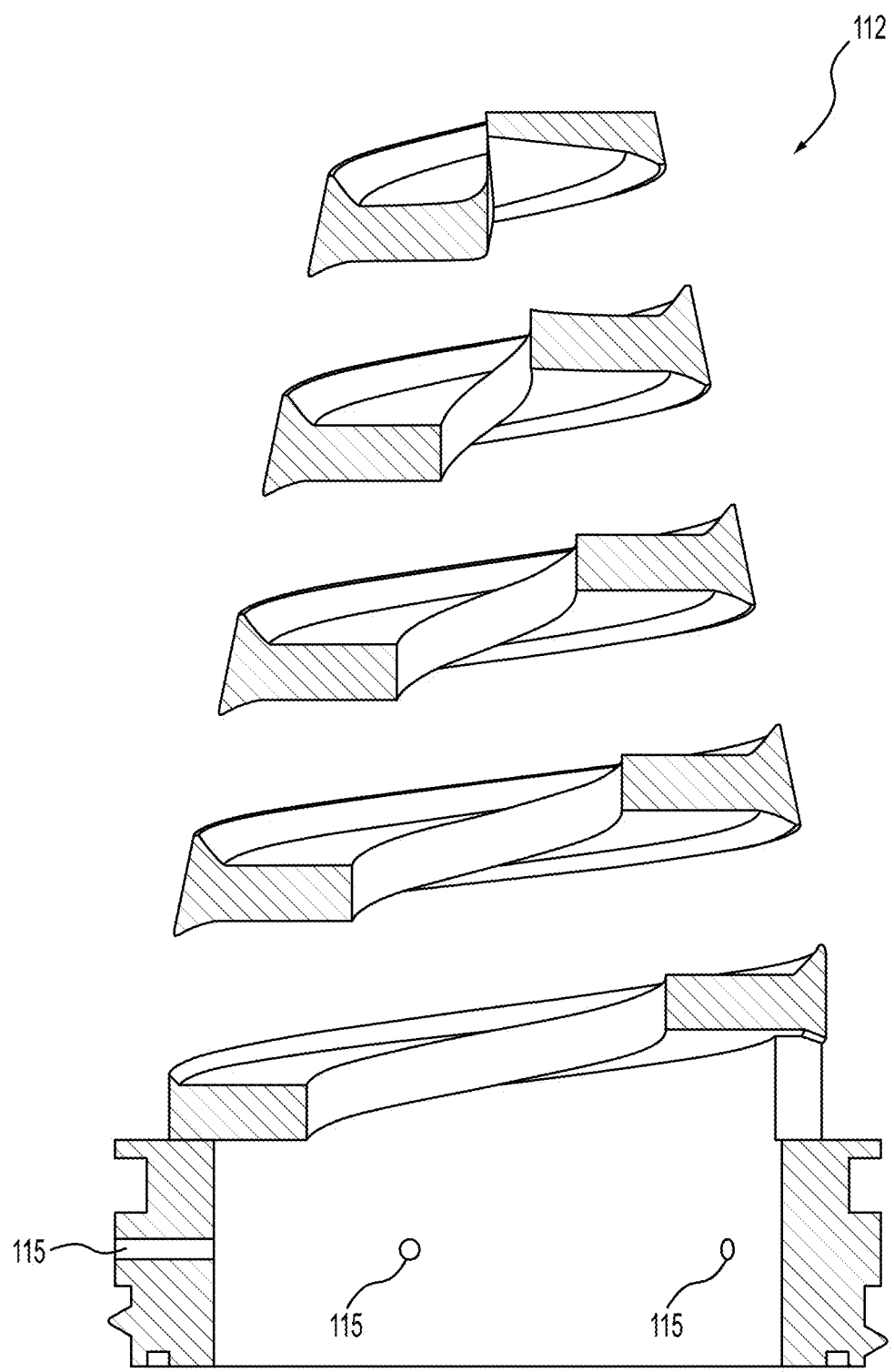

In some embodiments, the tapered-helical coil 112 may include one or more pressure regulating mechanism. In some embodiments, as shown in FIGS. 3B-3D, the tapered-helical coil 112 the pressure regulating mechanism includes a plurality of pressure regulating holes 115. The pressure regulating holes 115 extend from the inner diameter of tapered-helical coil 112 to the outer diameter of tapered-helical coil 112 and act to relieve back-pressure within the coil, for example, over continued use as collected particles impede the flow of filtered fluid through the filer. Pressure regulating holes 115 may mitigate back pressure within a filtration system by diverting pressure away from the inlet, for example, by diverting back pressure radially outwards at first opening 122, thereby preserving the lifespan of system components, such as pumps or hoses, that may be susceptible to backpressure upstream of the filtration device. The embodiment of FIGS. 3B-3D includes five pressure regulating holes 115 radially spaced around the circumference of the first opening 122. In other embodiments, the number of pressure regulating holes 115 may vary. For example, the number of pressure regulating holes 115 may vary based on the diameter of the holes. For example, each pressure regulating hole may have a diameter in a range, including the end points, between 0.03 and 0.50 in., such as between 0.03 and 0.40 in., between 0.03 and 0.30 in., between 0.03 and 0.20 in., between 0.03 and 0.10 in., between 0.03 and 0.09 in., between 0.03 and 0.08 in., between 0.03 and 0.07 in., between 0.03 and 0.05 in., between 0.10 and 0.50 in., between 0.20 and 0.50 in., between 0.30 and 0.50 in., between 0.40 and 0.50 in., between 0.10 and 0.40 in., between 0.10 and 0.30 in., between 0.10 and 0.20 in., between 0.03 and 0.20 in., between 0.03 and 0.15 in., between 0.03 and 0.13 in., between 0.03 and 0.12 in., between 0.03 and 0.11 in., between 0.03 and 0.10 in., between 0.03 and 0.09 in., between 0.03 and 0.06 in., between 0.03 and 0.05 in., between 0.04 and 0.09 in., between 0.04 and 0.07 in., between 0.04 and 0.06 in., between 0.05 and 0.10 in., between 0.05 and 0.70 in., between 0.06 and 0.10 in., 0.06 and 0.08 in, or between 0.08 and 0.10 in. In one embodiment, the pressure regulating holes 115 may have a diameter of 0.07 in. In other embodiments, the pressure regulating holes 115 may have a diameter of 0.05 in., 0.06 in., 0.08 in., or 0.09 in. In other embodiments, the number of pressure regulating holes 115 located on the tapered-helical coil 112 may range from 1 to 50, such as from 5 to 30, from 5 to 15, from 5 to 10, from 3 to 7, from 7 to 12, from 10 to 20, or from 10 to 15. In other embodiments, the number of pressure regulating holes 115 may be 1, 2, 3, 4, 5, 6, 7, 8, 9, 10, 11, 12, 13, 14, or 15.

One or more of the pressure regulating holes may include a pressure release mechanism. In some embodiments, the pressure release mechanism may include a pressure relief valve (not shown) that is configured to open when the pressure within the tapered-helical coil 112 reaches a defined threshold. The pressure relief valves may operate as pressure check valves. In some embodiments, the pressure relief valve may include an umbrella valve. The pressure relief valve may be configured to default to a closed position, thereby preventing fluid from exiting the interior portion of tapered-helical coil 112 through pressure relief holes 115. The pressure relief valve may be configured to open at a predefined pressure threshold thereby allowing fluid to exit the interior portion of tapered-helical coil 112 through pressure relief holes 115, which prevents back-pressure upstream of tapered-helical coil 112, thereby preventing damage to other system components, preventing flow faults or pressure faults, and extending the number of uses of the filtration device between cleanings. For example, when used as a filtration device for a washing machine, the filtration device may be able to filter discharge fluid from 2 to 20 loads before requiring cleaning, for example, between 5 to 15 loads, from 5 to 10 loads, from 10 to 20 loads, from 15 to 20 loads, from 3 to 10 loads, from 3 to 7 loads, from 4 to 10 loads, from 4 to 8 loads, from 5 to 8 loads, from 7 to 12 loads, from 9 to 13 loads, from 11 to 13 loads, from 13 to 17 loads, or from 16 to 20 loads. In some embodiments, the filtration device, for example, including the pressure relief mechanism, may be able to filter discharge fluid from 2, 3, 4, 5, 6, 7, 8, 9, 10, 11, 12, 13, 14, 15, 16, 17, 18, 19, or 20 loads before requiring cleaning. Cleaning may be required because, for example, the collected filtered particles from the loads since the last cleaning have impeded the flow throughput to a sufficient level to prevent sufficient filtration.

According to some embodiments, the pressure relief valve may open when the back pressure within the filtration system, such as at the pressure relief valves, reaches a pressure ranging from 1 to 10 psi. In some embodiments, the pressure relief valve may open when the back pressure within the filtration system, such as at the pressure relief valves, reaches a pressure ranging from 2 to 5 psi, from 2 to 4 psi, from 2 to 3 psi, from 3 to 4 psi, from 4 to 6 psi, from 5 to 7 psi, from 6 to 8 psi, or from 7 to 9 psi. According to some embodiments, the pressure relief valve may open when the back pressure within the filtration system, such as at the pressure relief valves, reaches a pressure of 2.5 psi, 2.6 psi, 2.7 psi, 2.8 psi, 2.9 psi, 3.0 psi, 3.1 psi, 3.2 psi, 3.3 psi, 3.4 psi, 3.5 psi, 3.6 psi, 3.7 psi, 3.8 psi, or 3.9 psi, 4.0 psi, 4.1 psi, 4.2 psi, 4.3 psi, 4.4 psi, 4.5 psi, 4.6 psi, 4.7 psi, 4.8 psi, 4.9 psi, or 5.0 psi.

Figure 4A:
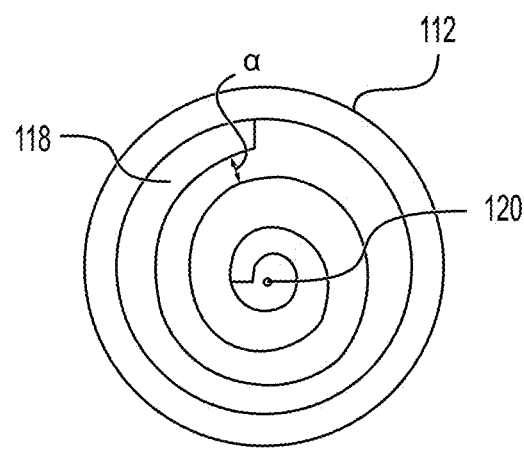
FIGS. 4A-4C show top views of exemplary tapered-helical coils, consistent with some embodiments of this disclosure.
Figure 4B:
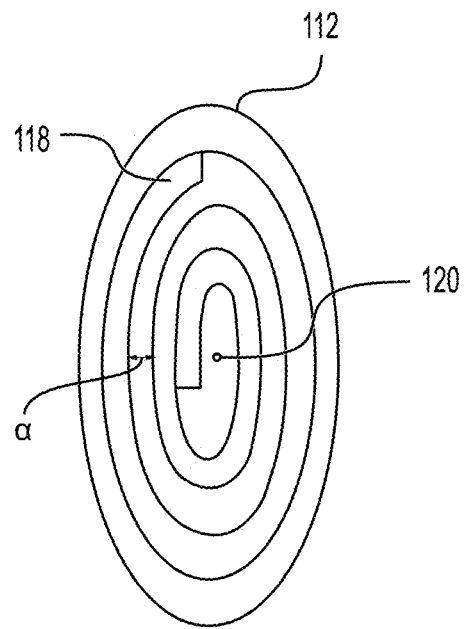
Figure 4C:
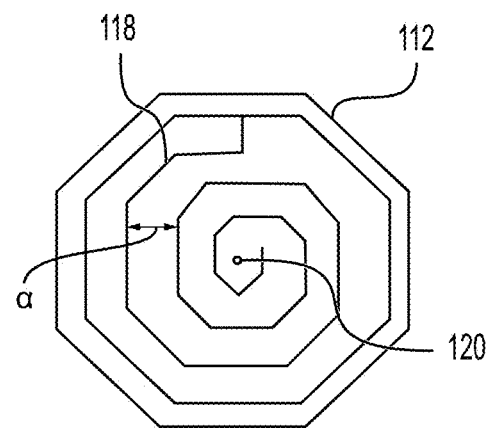

FIGS. 4A-4C show examples of helix eccentricity, consistent with some embodiments of this disclosure. FIGS. 4A-4B are top cross-sectional views of exemplary tapered-helical coil 112, for example, viewed from first opening 122 in the direction of fluid flow parallel to arrow 126. As shown in FIG. 4A, tapered-helical coil 112 may have a generally circular cross section along axis 120, where rib 118 spirals around axis 120 in a decreasing radius along axis 120 towards second opening 124 having a rib overlap a of each revolution. Thus, the size of the cross-section may be smaller the closer to reaching second opening 124. In some embodiments, the cross-section of tapered-helical coil 112 may have other geometries at any given point along axis 120. Rather than having circular cross sections, in some embodiments, tapered-helical coil 112 may be configured to have a degree of eccentricity. As shown in FIG. 4B, in some embodiments, tapered-helical coil 112 may be eccentric and may roughly have the shape of an ellipse. In some embodiments, the cross-sectional shape of tapered-helical coil 112 may deviate from a circular shape in other ways, for example, octagonal, as shown in FIG. 4C. In some embodiments, cross-sections of tapered-helical coil 112 may be circular, elliptical, triangular, square, pentagonal, hexagonal, octagonal, or other geometric cross-section. Tapered-helical coil 112 may spiral clockwise or counterclockwise in various embodiments when viewed along axis 120 from first opening 122.

Figure 5A:
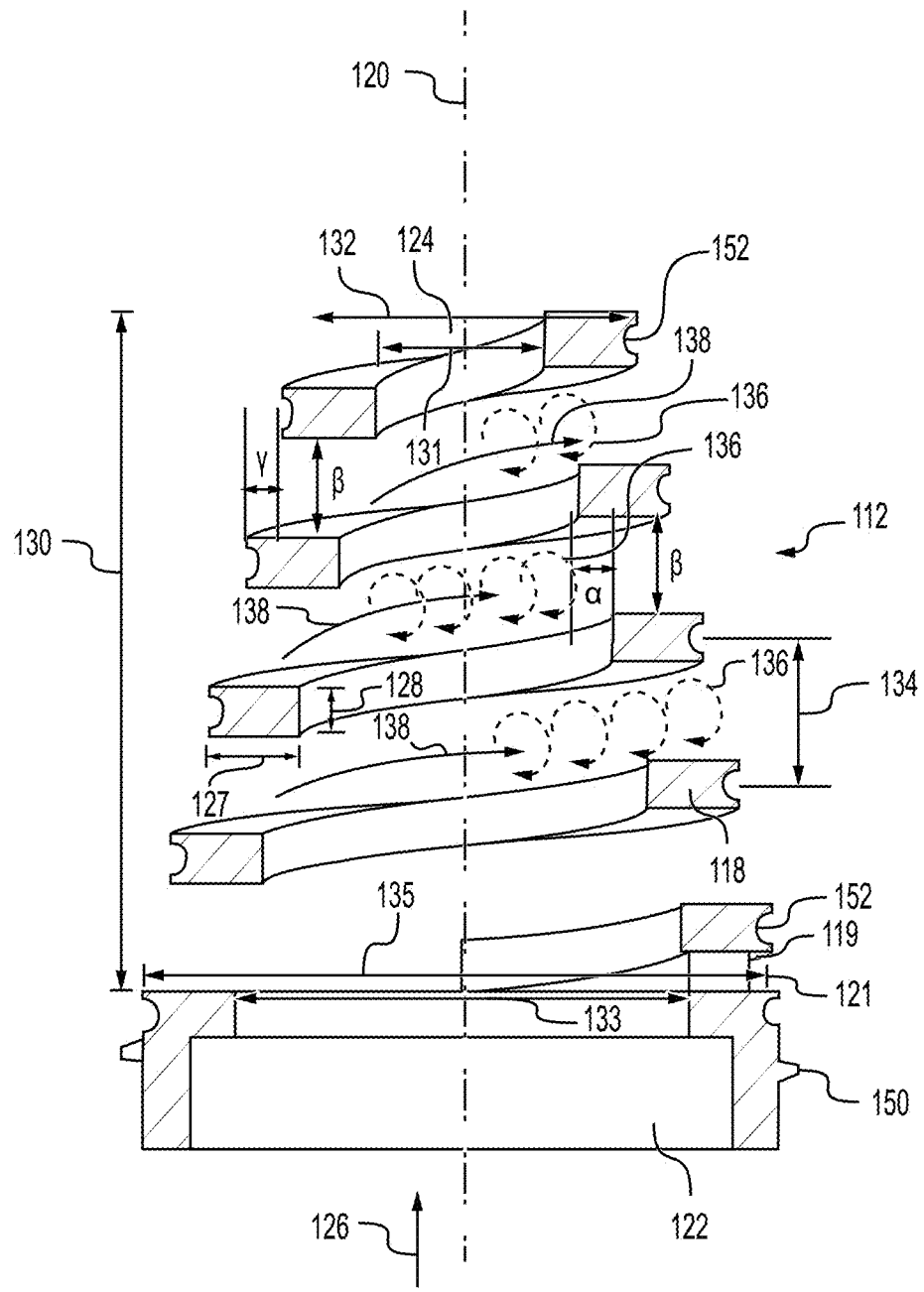
FIG. 5A shows a partial cross-sectional inverted view of section 5-5 of FIG. 3.

FIG. 5A is a vertical cross-sectional view of tapered-helical coil 112 taken along the section cut 5-5 shown in FIG. 3. As shown in FIG. 5A, rib 118 can be configured to have a uniform rib width 127, which may refer to a dimension having a distance measured from an inside edge of rib 118 to an outside edge of rib 118. Also, rib 118 may have a uniform rib height 128, which may refer to a dimension measured from a lower surface of rib 118 facing first opening 122 to an upper, opposite surface of rib 118 (e.g., the surface facing second opening 124). Although rib 118 is shown having a generally rectangular cross-section in FIG. 5A, some embodiments may include non-rectangular cross-sections, such as other quadrilateral cross-sections, such as, for example, square, trapezoidal, or rhomboid. In other embodiments one or more surfaces of the cross-section of rib 118 may be curved to facilitate the formation of vortices or to act as a flow guide for particle flow path 138 along rib 118 towards second opening 124.

Tapered-helical coil 112 may include a support structure 119. Support structure 119 may provide structural support for rib 118. Support structure 119 may include a material that fills a space between rib 118 and a bearing surface 121 of first opening 122. Support structure 119 may provide additional area for rib 118 to attach to bearing surface 121 and may maintain strength and alignment of rib 118, such as during manufacturing or to prevent the coil section of tapered-helical coil 112 from becoming misaligned or breaking off from strains induced during operation. Support structure 119 may be provided for a predetermined angular length, for example, for about 0.25 revolutions (90 degrees) about axis 120, or any other amount sufficient to provide an appropriate amount of support or stability. In some embodiments, a range for angular span of support structure 119 may be from about 1 degree to 270 degrees, such, for example, 30 degrees, 45 degrees, 60 degrees, 75 degrees, 90 degrees, 105 degrees, 120 degrees, 135 degrees, 150 degrees, 165 degrees, 180 degrees, 195 degrees, 210 degrees, 225 degrees, 240 degrees, 255 degrees, or 270 degrees. In some embodiments, support structure 119 may be solid. In some embodiments, support structure 119 may include openings to allow fluid flow to pass through it. A second support structure (not shown) may also be provided at second opening 124 in addition or alternatively to support structure 119.

As also shown in FIG. 5A, tapered-helical coil 112 may have a helix height 130, which may refer to a dimension measured from a first end of rib 118 located closest to first opening 122 (e.g., a proximal end of tapered-helical coil 112) to the other end of rib 118 (e.g., a distal end of tapered-helical coil 112, which may be at second opening 124).

Tapered-helical coil 112 may have a first helix outer diameter 135, which may refer to the diameter of the outer circumference of the helical shape of the coil at first opening 122. Tapered-helical coil 112 may have a second helix outer diameter 132, which may refer to the diameter of the outer circumference of the helical shape of the coil at second opening 124. Tapered-helical coil 112 may also have a first helix inner diameter 133, which may refer to the diameter of the inner circumference of the helical shape of the coil at first opening 122. Tapered-helical coil 112 may also have a second helix inner diameter 131, which may refer to the diameter of the inner circumference of the helical shape of the coil at second opening 124. Tapered-helical coil 112 may have a generally conical shape such that second helix inner diameter 131 is less than first helix inner diameter 133. Similarly, second helix outer diameter 132 may be is less than first helix outer diameter 135.

Although it is preferred that first helix outer diameter 135 is larger than second outer helix diameter 132, it is contemplated that these diameters may be the same in some embodiments, provided that first helix inner diameter 133 is larger than second inner helix diameter 131. Such a configuration may be beneficial in particularly small diameter applications, such as blood filtration, or where rib 118 is angled or otherwise shaped to further promote fluid flow along particle flow path 138 to prevent the buildup of residue on rib 118.

Tapered-helical coil 112 may have a helix pitch 134 that is a dimension measured parallel to axis 120 between midpoints of two adjacent revolutions of rib 118, similar to the pitch of screw threads. In some embodiments, helix pitch 134 may be variable. In some embodiments, helix pitch 134 may be uniform.

Figure 17:
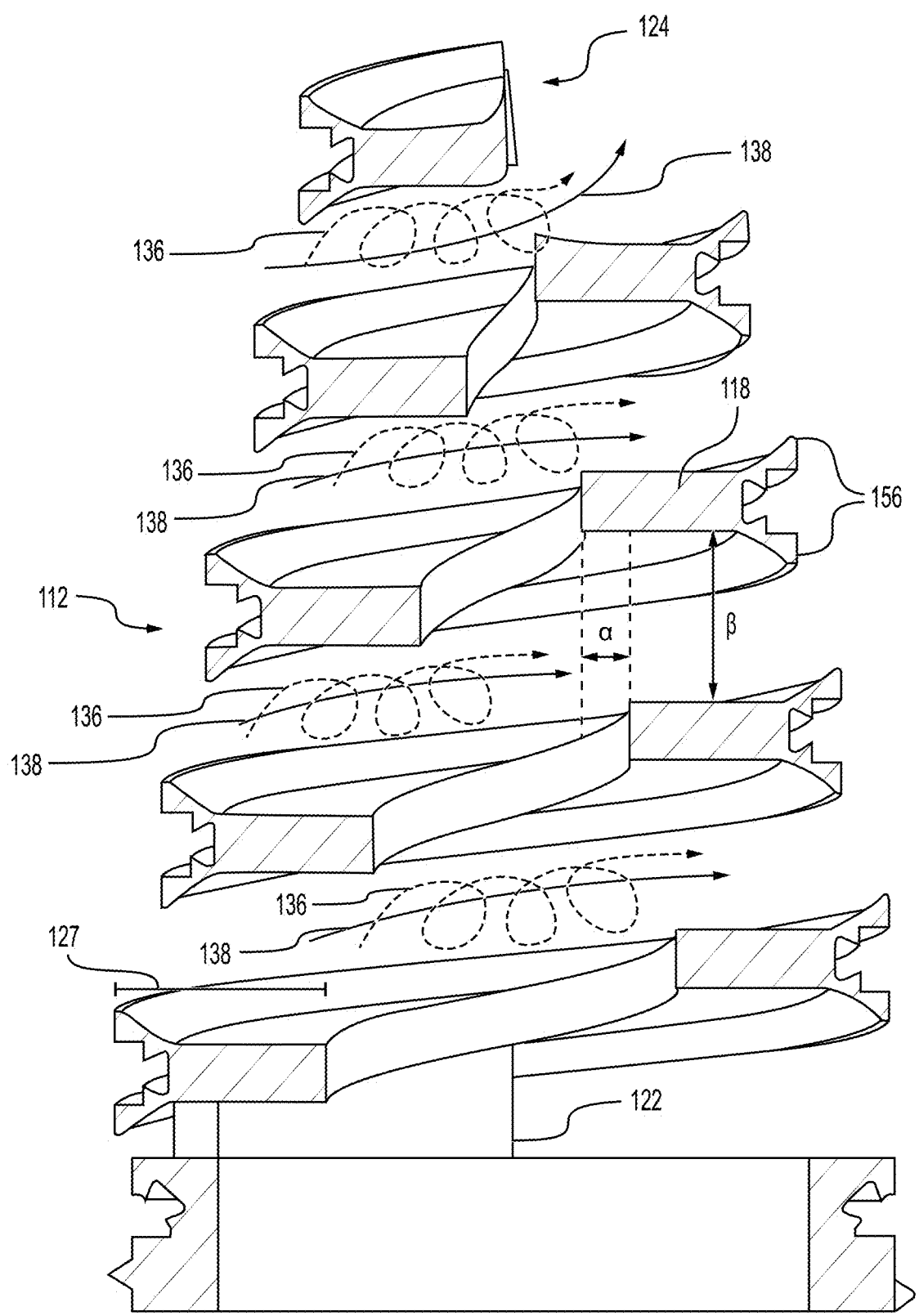
FIG. 17 shows an exemplary partial cross-section of an exemplary tapered-helical coil.

Certain tapered-helical coils 112 may be described by a raker reduction ratio ($\beta/\alpha$) determined by the ratio of the slot height ($\beta$) between surfaces of adjacent revolutions of ribs 118 divided by the rib overlap ($\alpha$) between inner surfaces of adjacent revolutions of rib 118 into the central opening of tapered-helical coil 112. Slot height $\beta$ is measured between adjacent surfaces of rib 118, such as shown in FIG. 5A. In embodiments where tapered-helical coil 112 contains more than one rib 118, slot height $\beta$ is measured between the surfaces of adjacent ribs 118. Slot height β in FIGS. 5A and 17 are shown for generally parallel surfaces, such that the measurement is taken between the parallel surfaces. However, if the adjacent surfaces are non-parallel over the length of the slot, then slot height β is measured as the average slot height between adjacent surfaces for the period that the surfaces overlap. Rib overlap a indicates the distance that progressively narrower revolutions of rib 118 protrude into the opening formed by the previous revolution of rib 118. For example, when viewed in FIG. 5A and the view of FIG. 4A, rib overlap a may be observed as the decrease in the inner radius (measured from axis 120 to the inner edge of rib 118) of each revolution of rib 118. Like slot height 3, in embodiments where tapered-helical coil 112 contains more than one rib 118, rib overlap a is measured between the inner surfaces of adjacent ribs 118. Rib overlap a in FIG. 5A is shown for parallel inner surfaces, however, if adjacent inner surfaces are non-parallel, then rib overlap a is measured from the midpoints of adjacent inner edges.

In some embodiments, tapered-helical coil 112 may have a raker reduction ratio β/α between about 3.0 to 4.0, accounting for tolerances of manufacturing. In some embodiments, the raker reduction ratio β/α may be configured based on the type of fluid to be filtered, the type and size of particle to be filtered, the flow parameters of the fluid to be filtered, and the scale of the operation, including whether the filtered particles are to be collected or passed into a continuous discharge flow. In some embodiments, the raker reduction ratio β/α may be less than 3.0, or may be greater than 4.0. In some embodiments, tapered-helical coil 112 may have a raker reduction ratio β/α in a range between about 0.1 and 10, such as, for example, between 0.1 and 0.5, between 0.25 and 0.75, between about 0.5 and 1.0, between about 0.75 and 1.25, between about 1.0 and about 10.0, between about 1.0 and 6.0, between about 2.0 and 5.0, between about 2.5 and 4.5, between about 3.0 and 4.0, between about 1.0 and 3.0, between about 2.0 and 3.0, between about 3.0 and 7.0, between about 4.0 and 6.0, between about 5.0 and 10, between about 5.0 and 6.0, between about 6.0 and 7.0, between about 7.0 and 8.0, between about 8.0 and 9.0, between about 9.0 and 10, between about 6.0 and 8.0, between about 7.0 and 9.0, or between about 6.5 and 8.5. All ranges recited in this disclosure, whether recited as "between" or otherwise, are understood to be inclusive of the end points of the range. Thus, "between X and Y" is understood to be inclusive of the values X and Y, in addition to the values therebetween.

In some embodiments, for example when filtering microplastics, a raker reduction ratio β/α value of between 3.0 to 4.0 may be more effective at causing fluid to be redirected in vortices 136 as the fluid impinges on rib 118 at locations having progressively narrowing helix inner diameter (e.g., rib overlap a.

In some embodiments, the raker reduction ratio β/α may be uniform along the length of tapered-helical coil 112. In other embodiments, the raker reduction ratio β/α may vary along the length of tapered-helical coil 112.

Tapered helical coil may also have an outer raker reduction ratio β/γ, where γ is the rib extension and indicates the exterior counterpart to rib overlap a for outer adjacent surfaces revolutions of rib 118, as shown in FIG. 5A. The value of outer raker reduction ratio β/γ may be similar to that described for the raker reduction ratio β/α above. In some embodiments, such as for uniform cross-sections of rib 118 and uniform helix pitches, the outer raker reduction ratio β/γ may be the same as the raker reduction ratio β/α. In other embodiments, the raker reduction ratio β/α may be different from outer raker reduction ratio β/γ, such as when rib 118 has a non-uniform cross-section along the length of tapered-helical coil 112 or where multiple ribs 118 have different properties for adjacent ribs.

In some embodiments, it is believed that tapered-helical coil 112 aids in particle filtration by redirecting fluid flow when fluid enters tapered-helical coil 112 in the direction of arrow 126. Tapered-helical coil 112 causes fluid to be redirected in fluid vortices 136 as the fluid impinges on surfaces at progressively narrower revolutions of rib 118 to create vortices 136. As the fluid flow impinges rib 118, redirected fluid in vortices 136 serves to keep particles in suspension and promotes overall movement of particles toward second opening 124. Vortices 136 may facilitate travel of suspended particles generally in a helical flow path, as may be indicated by particle flow path 138, along rib 118. Vortices 136 may serve to sweep away or keep suspended particles that may otherwise become lodged on or against rib 118 or filter media 142, thereby returning the particles to suspension and promoting collection or discharge of the particles at second opening 124. Particles exiting tapered-helical coil 112 at second opening 124 may be collected for disposal while filtered fluid exits coil 112 through filter media 142. Particles may include any solid or other object desired to be removed from a fluid. Size of particles may be dependent on filtering application, such as microparticle filtration or ocean waste cleanup. Particles may include suspended solids, microparticles, biological cells, cell products, vesicles, exosomes, microplastics, solid waste, plastic bottles, plastic bags, or any other target object to be removed from fluid.

Rib geometry may affect particle filtration performance and may be tailored to particular applications, such as particular fluids, particle sizes, or available space or manufacturing constraints. It is believed that using a tapered-helical rib configuration may better facilitate particle filtration by beneficially redirecting fluid flow when fluid enters tapered-helical coil 112 in the direction of arrow 126 into vortices 136 to keep particles in suspension, while allowing the filtrate fluid to pass through filter media 142. Rib 118 may be "backward-facing" in that it may have an increasingly smaller inner radius in the central fluid flow area in the plane orthogonal to axis 120 as it completes each revolution in a helical manner due to the progressive narrowing of tapered-helical coil 112, as shown in, for example, FIGS. 1, 4A, and 5A. The effective diameter of central fluid flow area in the plane orthogonal to axis 120 may correspondingly decrease with each revolution of rib 118.

Figure 5B:
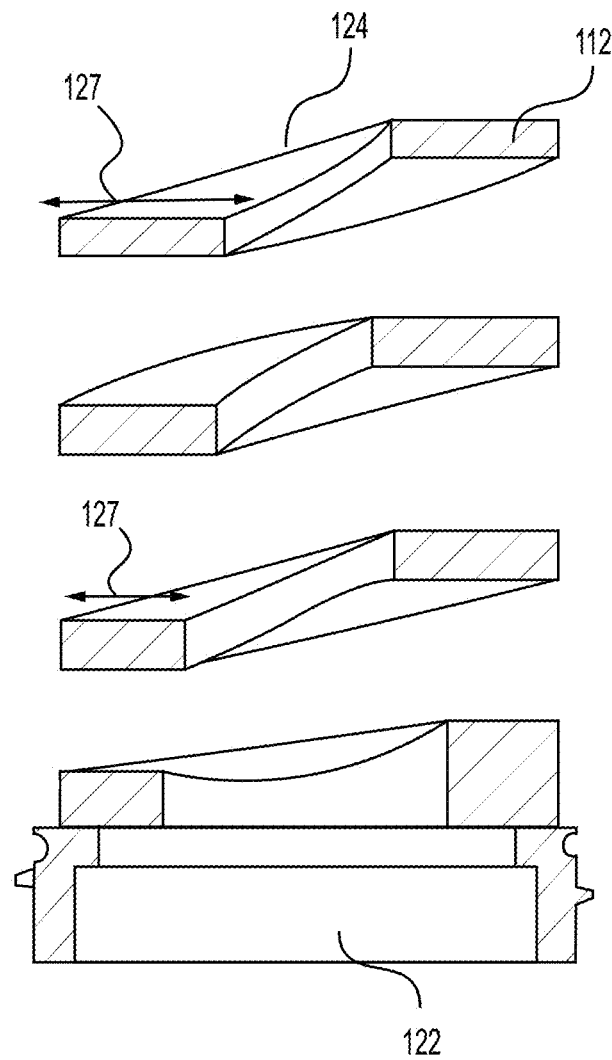
FIGS. 5B-5F show exemplary partial cross-sections of exemplary tapered-helical coils.

Rib 118 may have varying dimensions and permutations according to various design parameters. For example, in some embodiments, as shown in FIG. 5B, tapered-helical coil 112 may taper only with respect to an inner edge of rib 118 while the outer surface of tapered-helical coil 112 may be substantially cylindrical, or, in some embodiments, may have a diverging shape. Spaces between adjacent revolutions of rib 118 may allow filtered fluid to exit via filter media 142 through the sides of tapered-helical coil 112. Meanwhile, vortices 136 generated by rib 118 promote the movement of filtered particles toward second opening 124. In the example of FIG. 5B, rib width 127 increases from first opening 122 to second opening 124. In the example of FIG. 5B, helix outer diameter may remain constant, while helix inner diameter gradually decreases along axis 120 from first opening 122 toward second opening 124.

It may, in some embodiments, be advantageous to configure tapered-helical coil 112 to have certain or varying values of the raker reduction ratio β/α corresponding to certain conditions, for example, flow rate, particle concentration, fluid viscosity, or other characteristics of the fluid or particles. In some embodiments, because fluid can exit freely via lateral sides of tapered-helical coil 112 (e.g., through spaces between revolutions of rib 118), flow rate in the direction of arrow 126 may change along axis 120 toward second opening 124. It may be advantageous to use a different value of the raker reduction ratio $\beta/\alpha$ in different regions of tapered-helical coil 112 to maintain or promote flow rates, in particular as the concentration of filtered particles per volume of fluid may increase towards second opening 124 as compared to first opening 122. In some embodiments, the raker reduction ratio $\beta/\alpha$ may range from a first ratio to a second ratio along axis 120. Values for the first and second ratios may be various combinations of the raker reduction ratio $\beta/\alpha$ described above, both in increasing ratio and decreasing ratio between first opening 122 and second opening 124, although ratios in the ranges between 1.0 and 6.0, between 2.0 and 5.0, between 2.5 and 4.5, and between 3.0 and 4.0, may be preferred for some applications.

Figure 5C:
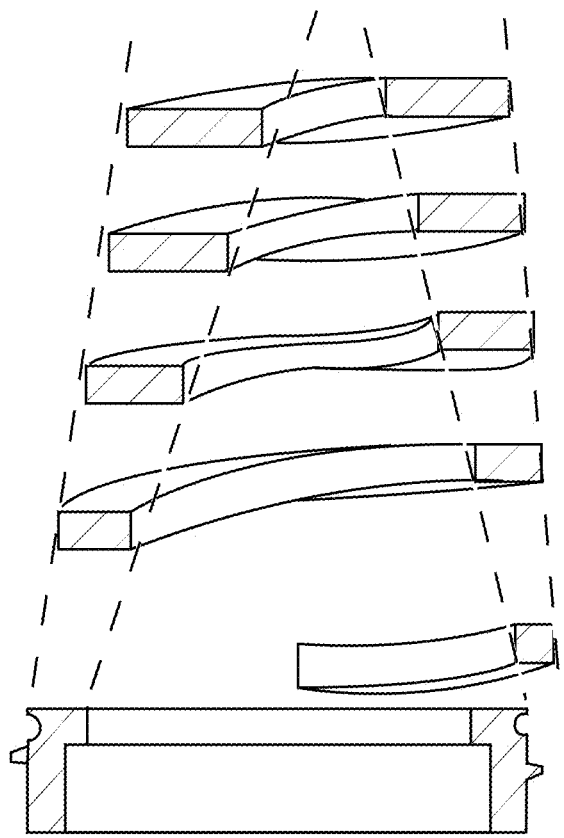
Figure 5D:
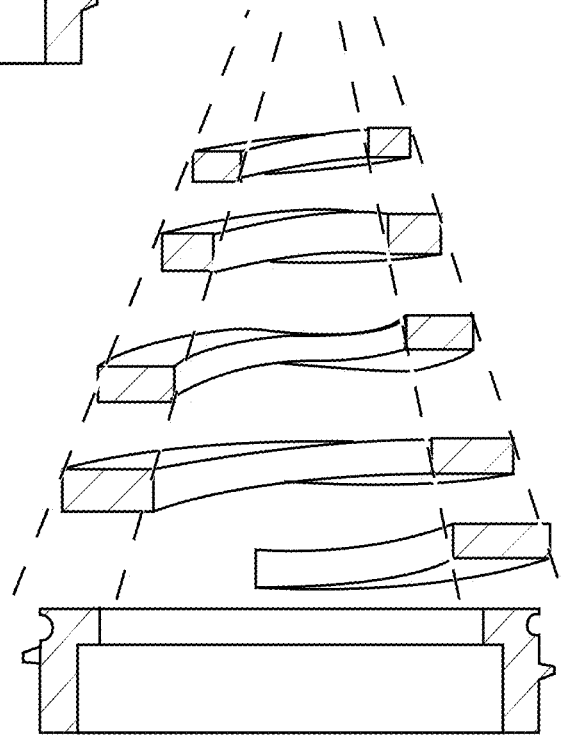

As shown in FIGS. 5C-5D, tapered-helical coil 112 may have a varying rib width 127. Rib width 127 may increase or decrease along axis 120 from first opening 122 toward second opening 124, as shown by the dashed lines in FIGS. 5C-5D. FIG. 5C shows an example of rib width 127 increasing along axis 120 from first opening 122 toward second opening 124. This may result in a lesser cross-sectional taper on the outside of tapered-helical coil 112 and a greater cross-sectional taper on the inside of tapered-helical coil 112. Therefore, slot height $\beta$ may remain constant while rib overlap a may increase along axis 120, resulting in a varying decreasing raker reduction ratio $\beta/\alpha$ from first opening 122 to second opening 124.

FIG. 5D shows an example of rib width 127 decreasing along axis 120 from first opening 122 toward second opening 124. This may result in a greater taper on the outside of tapered-helical coil 112 and a lesser taper on the inside of tapered-helical coil 112. Slot height $\beta$ may remain constant while rib overlap a may decrease along axis 120. Thus, a varying value of the raker reduction ratio $\beta/\alpha$ may result. Rib width 127 may be configured so that rib overlap a ranges from a first value at first opening 122 to a second value at second opening 124. The raker reduction ratio $\beta/\alpha$ may also remain constant with decreasing $\beta/\gamma$ ration from first opening 122 to second opening 124.

Figure 5E:
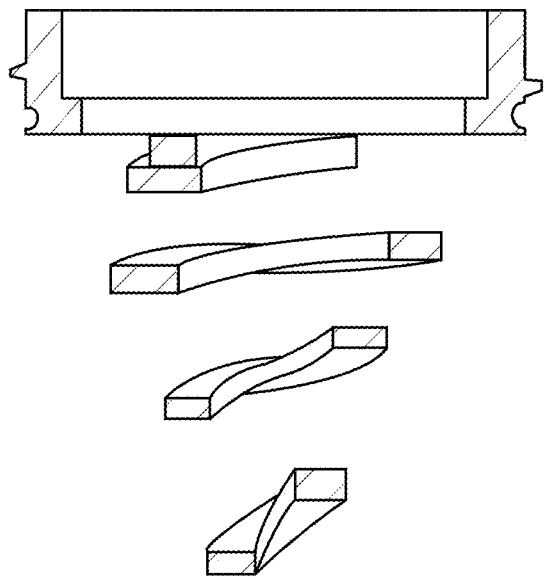
Figure 5F:
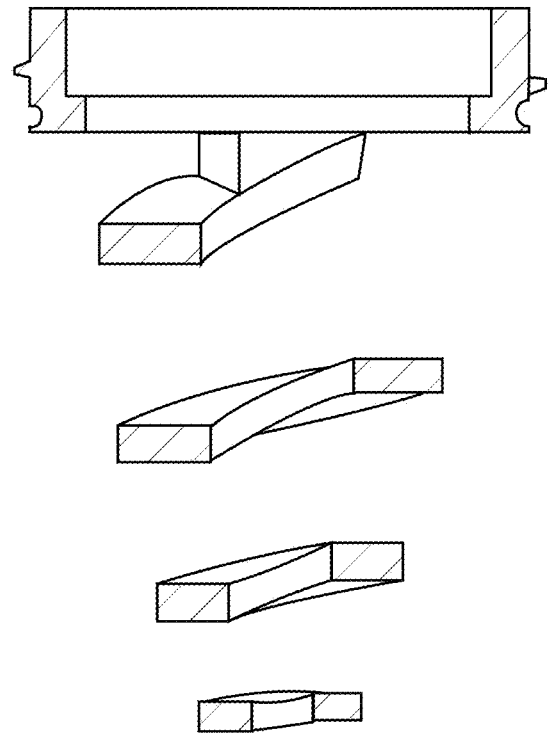

In some embodiments, tapered-helical coil 112 may progressively increase or decrease in helical pitch, such as shown in FIGS. 5E-5F, respectively. That is, helical pitch of rib 118 may be variable. In some embodiments, the varied helical pitch may result in the profile of lateral side surfaces of tapered-helical coil 112 containing filter media 142 to be curved.

As shown in FIGS. 5E-5F, tapered-helical coil 112 may have a varying helix pitch 134. Helix pitch 134 may increase or decrease along axis 120 from first opening 122 toward second opening 124. FIG. 5E shows an example of helix pitch 134 increasing along axis 120 from first opening 122 toward second opening 124. FIG. 5F shows an example of helix pitch 134 decreasing along axis 120 from first opening 122 toward second opening 124. Varying helix pitch 134 may present another degree of design flexibility to configure tapered-helical coil 112 according to desired parameters. Furthermore, parameters of tapered-helical coil 112 may be varied using a combination of methods, for example, combining a varying rib width 127, as in FIGS. 5C-5D with varying helix pitch 134 as in FIGS. 5E-5F. Either or both of these variations may be combined with other variations, such as varying cross-section profiles of rib 118, the use of multiple ribs 118, or other variations described herein.

Figure 6:
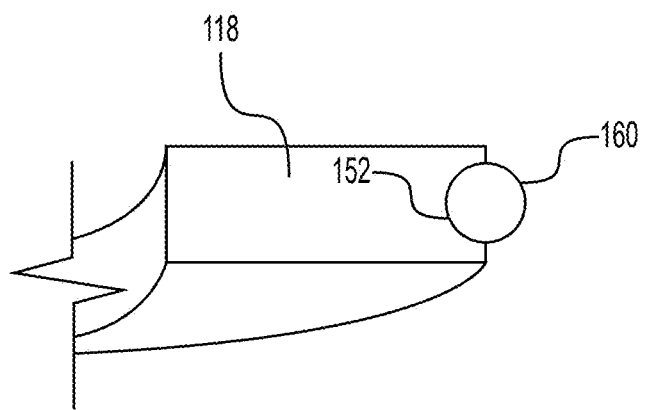
FIG. 6 shows a partial cross-section of an exemplary rib of an exemplary filtration device.

FIG. 6 shows an example of a gasketing rod 160 provided in groove 152 of rib 118, consistent with embodiments of the disclosure. Rib 118 may be provided with a groove 152 configured to house gasketing rod 160 that seals tapered-helical coil 112 against filter media 142. For example, as shown in FIG. 1, tapered-helical coil may be abutted against filter media 142 and sealed with gasketing rod 160 (shown only in cross-section) provided in groove 152. To facilitate the description of FIG. 1, gasketing rod 160 is shown only in cross-section adjacent to filter media 142, although it is understood that gasketing rod 160 and filter media 142 surround tapered-helical coil 112 as described herein. In some embodiments, gasketing rod 160 may be used to seal against support member 140, described below, rather than against filter media 142. The external face of rib 118 may include a concave portion into which gasketing rod 160 can be seated. Gasketing rod 160 may ensure a tight fit against housing 114 when tapered-helical coil 112 is nested inside housing 114 in some configurations. Gasketing rod 160 may be formed from a resilient material or sealing material. For example, in some embodiments, gasketing rod 160 may be formed of a rubber- or silicone-based material. Gasketing rod 160 may be a unitary or multi-piece component.

FIG. 17 shows a further embodiment of tapered-helical coil 112 having a rib 118. Rib 118 of the embodiment shown in FIG. 17 includes ridges 156, which may be adjacent to mesh 142 (not shown in FIG. 17). Although ridges 156 are shown on both the inlet-facing and outlet-facing sides of rib 118, it is contemplated that only one ridge 156 may be present in some embodiments. Ridges 156 may facilitate the maintenance of vortices 136 along particle flow path 138 and also further prevent buildup of particles by reducing sharp corners where particles may accumulate, thereby promoting the self-cleaning operation of the filter device.

As also shown in the embodiment of FIG. 17, in some embodiments rib 118 forms a larger portion of the radius of helical coil 112 than FIG. 5A. For example, in some embodiments, at first opening 122 of FIG. 17, rib 118 has a width that may be about 50% of the diameter of the tapered-helical coil (e.g., the inside radius is about half of the outside radius), whereas in other embodiments, such as FIG. 5A, rib 118 may be about 30% of the radius of the tapered-helical coil at first opening 122 (e.g., the inside radius is about two-thirds of the outside radius). Similarly, in the embodiment shown in FIG. 17, the rib width at second opening 124 comprises more than 95% of the radius of tapered-helical coil 112 (the rib width is more than 95% of the outer radius of tapered helical coil 112 at second opening 124), whereas in the embodiment shown in FIG. 5A, the rib width at second opening 124 may comprise about 55% of the radius of tapered-helical coil 112 (the rib width is about 55% of the outer radius of tapered helical coil 112 at second opening 124). In some embodiments, where the width of rib 118 comprises a greater proportion of the tapered-helical coil radius may facilitate vortex formation and promotes movement of the filtered particles along particle path 138 while the filtrate fluid passes through mesh 142 (not shown), thereby increasing filtration efficiency, reducing buildup of filtered particles, and improving filter operation. In other embodiments, the width of rib 118 at first opening 122 may comprise about 33%, 35%, 40%, 45%, 50%, 55%, or 60% of the radius of tapered helical coil 112. In some embodiments, the width of rib 118 at second opening 124 may comprise about 60%, 65%, 70%, 75%, 80%, 85%, 90%, 95%, 96%, 97%, 98%, or substantially the entire radius of tapered helical coil 112. It will be recognized that even when rib 118 comprises a large proportion of the radius at second opening 124, the filtered particles and particle path 138 can exit tapered-helical coil 112 in the space adjacent to rib 118, such as shown in the embodiments of FIGS. 10A-C, 16B-C, and 17.

Figure 7:
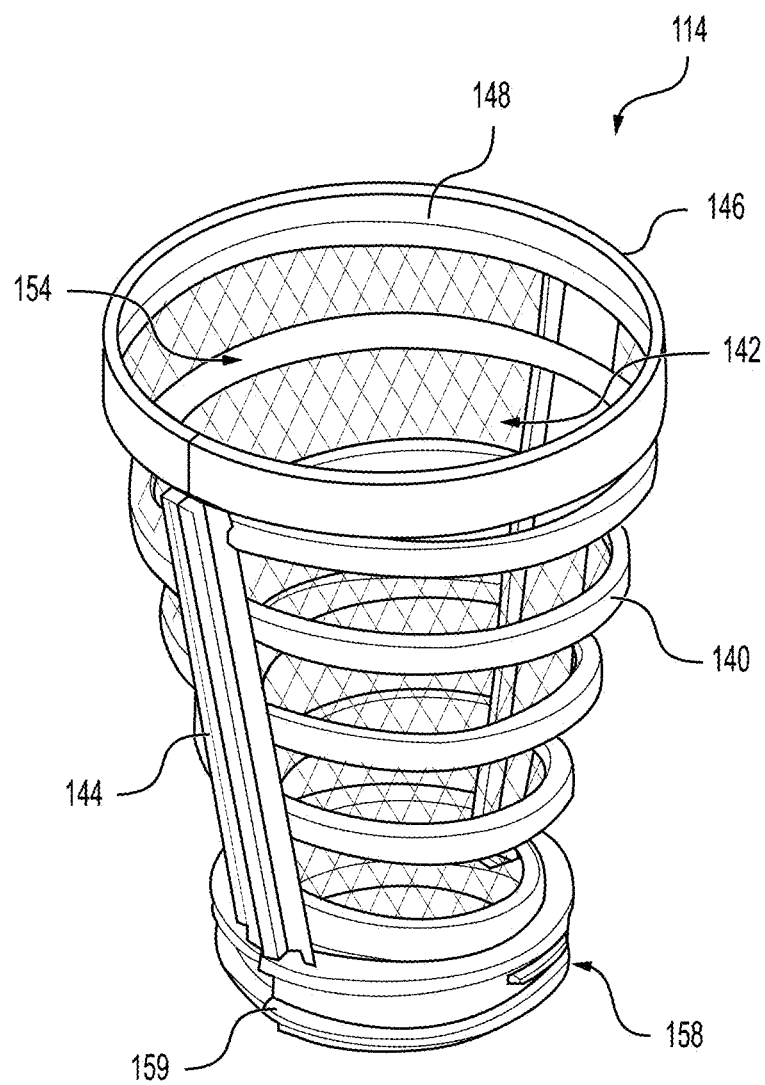
FIG. 7 shows a perspective view of an exemplary housing of an exemplary filtration device.
Figure 8:
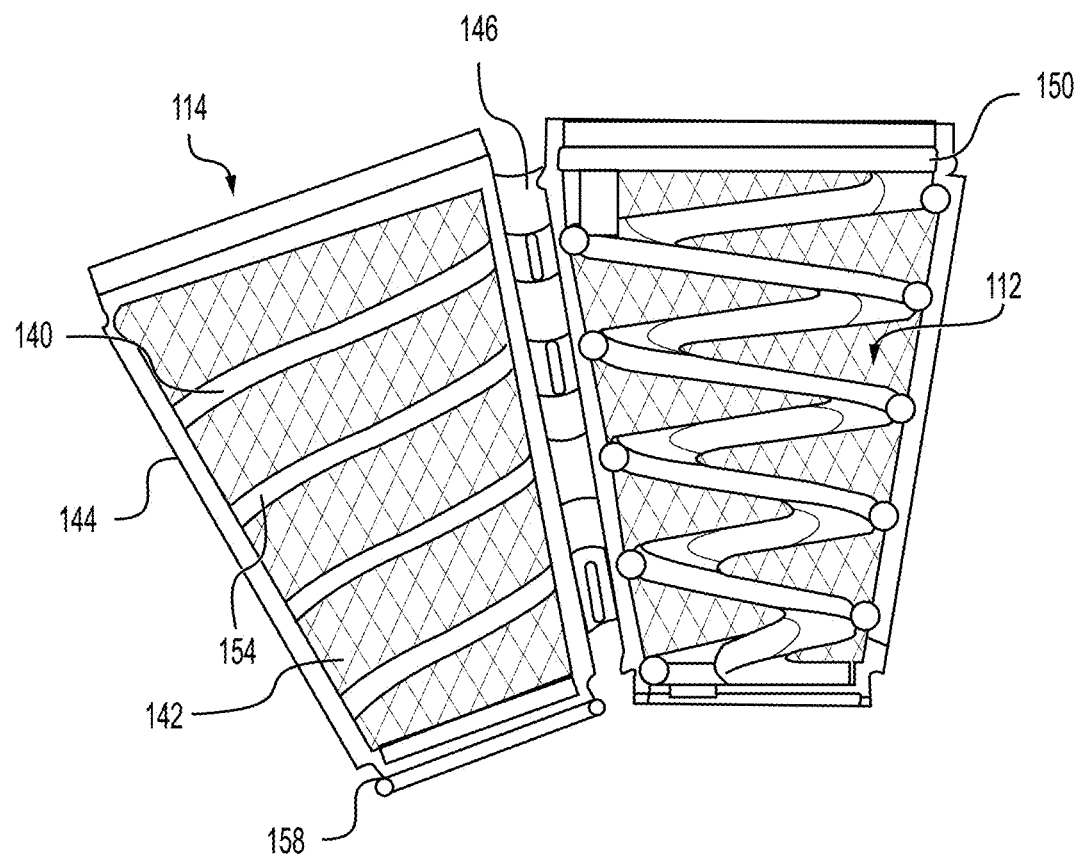
FIG. 8 shows an elevation view of an exemplary tapered-helical coil and housing in an open configuration.

FIG. 7 shows an example embodiment of housing 114, consistent with some embodiments of the disclosure. Housing 114 may enclose tapered-helical coil 112 during operation and may prevent particles from exiting the filter prior to being collected for disposal. Housing 114 may include a drop-in enclosure, such as shown in FIG. 2, or a hinge-type enclosure, such as shown in FIG. 8. Filter media 142 may be integrated into housing 114 and provide filtering functions by allowing the filtered fluid to exit laterally from the filter, while containing particles within the housing, during use. The tapered-helical path of fluid passing through tapered-helical coil 112 may tend to prevent buildup of particles on filter media 142. As shown in FIG. 7, housing 114 may include one or more support members 140. In some embodiments, support member 140 may be formed to have a similar shape to that of rib 118. Support member 140 may, in some embodiments, include a plurality of supporting ribs. In some embodiments, support member 140 may align with rib 118 to promote sealing of filter media 142 against rib 118. Support member 140 may provide support to filter media 142 or rib 118.

Filter media 142 may also be referred to as a filtration media. Filter media 142 may include a physical filter such as porous membrane, mesh, sieve, strainer, fiber layer, etc., or a chemical filter such as charcoal, activated carbon, catalytic carbon, ion-exchange media, kinetic degradation fluxion, mixed media, elements configured to react with particles to be filtered, etc. or a combination of physical and chemical media. In some embodiments, filter media 142 may include a mesh screen. The mesh screen may be formed from stainless steel, nylon, or other fibrous or ductile material. Filter media 142 may include porous material configured to block solids suspended in the fluid being filtered from passing through filter media 142. Filter media 142 surrounding tapered-helical coil 112 may circumferentially surround tapered-helical coil 112. Filter media 142 may cover the lateral sides of tapered-helical coil 112 so that particles are prevented from exiting tapered-helical coil along a direction orthogonal to axis 120, and the particles may be forced to move along axis 120 from first opening 122 to second opening 124.

In some embodiments, housing 114 may be integrated with filter media 142. For example, filter media 142 may be embedded, integrated, adhesively attached to, welded (such as plastically welded) to, or molded into support member 140. In some embodiments, filter media 142 and housing 114 may be separable. Housing 114 may be a unitary or multi-piece component. In some embodiments, filter media 142 may be a replaceable component of housing 114.

As shown in FIGS. 2 and 7, housing 114 may be formed in one or more connected portions to facilitate being placed over tapered-helical coil 112. Housing 114 may, in some embodiments, include two halves joined together by a hinged connection 146. Housing 114 may also include fastening member 144. The two halves may be substantially the same, for example having similar size and shape, and with hinged connection 146 and fastening member 144 disposed roughly on opposite sides of housing 114. Support member 140 may be formed so as to form a substantially continuous spiral around housing 114, corresponding to rib 118 of tapered-helical coil 112. Hinged connection 146 may include a piano type hinge, living hinge, a plurality of hinges, or any other mechanical arrangement for rotatably connecting parts together. Fastening member 144 may include any mating fastening elements, such as, for example, snap fasteners, clips, hooks, slide-on bars, or any other mechanical arrangement for securing parts together. In some embodiments, hinged connection 146 may be replaced by a second fastening member 144. In some embodiments, housing 114 may be a unitary piece without fastening member 144 or hinged connection 146 to facilitate a "drop-in" or "slide-in" connection with tapered-helical coil 112.

Housing 114 may include elements for holding tapered-helical coil 112 in place during operation. For example, as shown in FIG. 5A, a protrusion 150 may be provided on a member that forms first opening 122. Protrusion 150 may include an externally protruding member, such as an annular lip or pin. Protrusion 150 may abut against a mating surface on housing 114, may facilitate a snap-in or twist-in fixture, or may be pressed in and turned, such as in an L- or U-shaped slot to attach tapered-helical coil to housing 114. The connection of protrusion 150 to housing 114 may be configured to facilitate alignment of support member 140 with rib 118. In some embodiments, a gasket may be provided in between protrusion 150 and the mating surface on housing 114 so as to provide a secure seal. The sealing between protrusion 150 and housing 114 may be fluid-tight.

As shown in FIG. 5A, rib 118 may include groove 152. Groove 152 may be formed as a concavity on an external surface of rib 118. Groove 152 may be configured to mate with a corresponding surface 154 of support member 140. Surface 154 may include a flat surface or may include a convex surface that protrudes toward the interior of housing 114. In some embodiments, surface 154 may include a concave surface that recedes away from the interior of housing 114. Gasketing rod 160 may rest in groove 152 of rib 118, as shown in FIG. 6, and gasketing rod 160 may mate with surface 154 of support member 140. When housing 114 is closed around tapered-helical coil 112, support member 140 may engage rib 118 to fix tapered-helical coil 112 into position inside housing 114.

Support member 140 of housing 114 may follow the spiral shape of rib 118. in some embodiments, support member 140 may have a complementary shape with rib 118. In some embodiments, rib 118 may taper only on its inside, and thus, the complementary shape of support member 140 may not taper. In some embodiments, support member 140 may have the shape of a ring or polygonal prism. In some embodiments, support member 140 may form cylindrical rings around housing 114 or be formed of vertical ribs between the first opening and second opening of housing 114. Such formations may facilitate easier manufacturing of housing 114 without impeding the filtering capabilities of tapered-helical coil 112, for example, because the particle flow path 138 remains continuous or substantially continuous inside filter media 142. A substantially continuous particle flow path 138, in some embodiments, includes a particle path that may have barriers or obstructions, such as structural supports, but does not inhibit the formation of vortices 136 or the flow of particles along particle flow path 138. In some embodiments, a substantially continuous particle flow path 138 may be provided substantially along rib 118 of tapered-helical coil 112 but may not start at first opening 122. In some embodiments, housing 114 may be integrated into tapered-helical coil 112 as a unitary structure, rather than separate components.

As shown in FIG. 7, housing 114 may include a flow connection member 148. Flow connection member 148 may include a fastening mechanism, such as a threaded connection. Flow connection member 148 may include internal threads or external threads and may be sized and shaped to mate with complementary elements of a component supplying fluid into first opening 122 of tapered-helical coil 112. Flow connection member 148 may be provided at or near the widest portion of housing 114. Also, a particle collection connection member 158 may be provided at an opposite end of housing 114 from flow connection member 148. Particle collection connection member 158 may include a fastening mechanism, such as external threads 159, provided at or near the narrowest portion of housing 114. Fastening mechanisms may also include press fit, snap, bolted, hose clamped, quick connect connections, and the like. Particle collection connection member 158 may be sized and shaped to mate with complementary elements on a collection unit, such as residue collection unit 170. In other embodiments, particle collection connection member 158 may be configured to mate with a discharge flow, such as a hose or pipe.

FIG. 8 shows a portion of a cross-section of an example of filtration device 100 with one half of housing 114 being open about hinged connection 146. In some embodiments, filter media 142 may be provided between housing 114 and tapered-helical coil 112. Tapered-helical coil 112 may be nested in housing 114 with surface 154 of support member 140 engaging rib 118. In some embodiments, surface 154 may include a protruding surface that contacts, either directly or via gasketing rod 160 or filter media 142, rib 118. In some embodiments, surface 154 may include a flat or concave surface that may mate with gasketing rod 160 of rib 118. Tapered-helical coil 112 and housing 114 may be configured so that tapered-helical coil 112 is in a contacting relationship with housing 114 when coupled together. Support member 140 may be aligned with rib 118 in some embodiments. In some embodiments, support member 140 may be offset from rib 118 or have a profile different from rib 118.

The exemplary filtration systems described herein provide an exemplary method for filtering particles from a liquid. In some embodiments, the method comprises providing a liquid to be filtered at a first opening of a filtration device comprising a tapered-helical coil, generating vortices in the tapered-helical coil via a rib, the rib having a decreasing interior cross-section through which the fluid flows, providing a flow path along the rib for directing particles suspended in the vortices towards a second opening of the filtration device, and filtering a filtered fluid through a filter media adjacent to the flow path. Filtration may occur by cross-flow filtration across the filter media caused by the vortices and particle flow path along the rib. The flow path may be between adjacent revolutions of the rib. In some embodiments, the flow path is substantially continuous between the first opening and the second opening. In some embodiments, the first opening is wider than the second opening. In some embodiments, the flow path is configured so as to not inhibit the flow of particles along the flow path towards the second opening.

It is also contemplated that the filter systems described in this disclosure may be provided in series, such that the second opening 124 of a first tapered-helical coil may discharge into the first opening 122 of a second tapered-helical coil. In this way, it may be possible to configure a staged filtration system. In addition or alternatively, a staged filtration system may be provided in which the filtrate fluid flow 102 from the first tapered-helical coil is provided to the first opening 122 of a second helical coil. Such staging allows for filtering progressively finer particle sizes and may improve overall filtration efficiency. For example, large particles may be filtered and collected in a first tapered-helical coil whereas finer particles may be filtered and collected in a second tapered-helical coil. Where staged filtration is implemented, the tapered-helical coils may have different geometries to facilitate proper filtering at each stage.

Figure 9A:
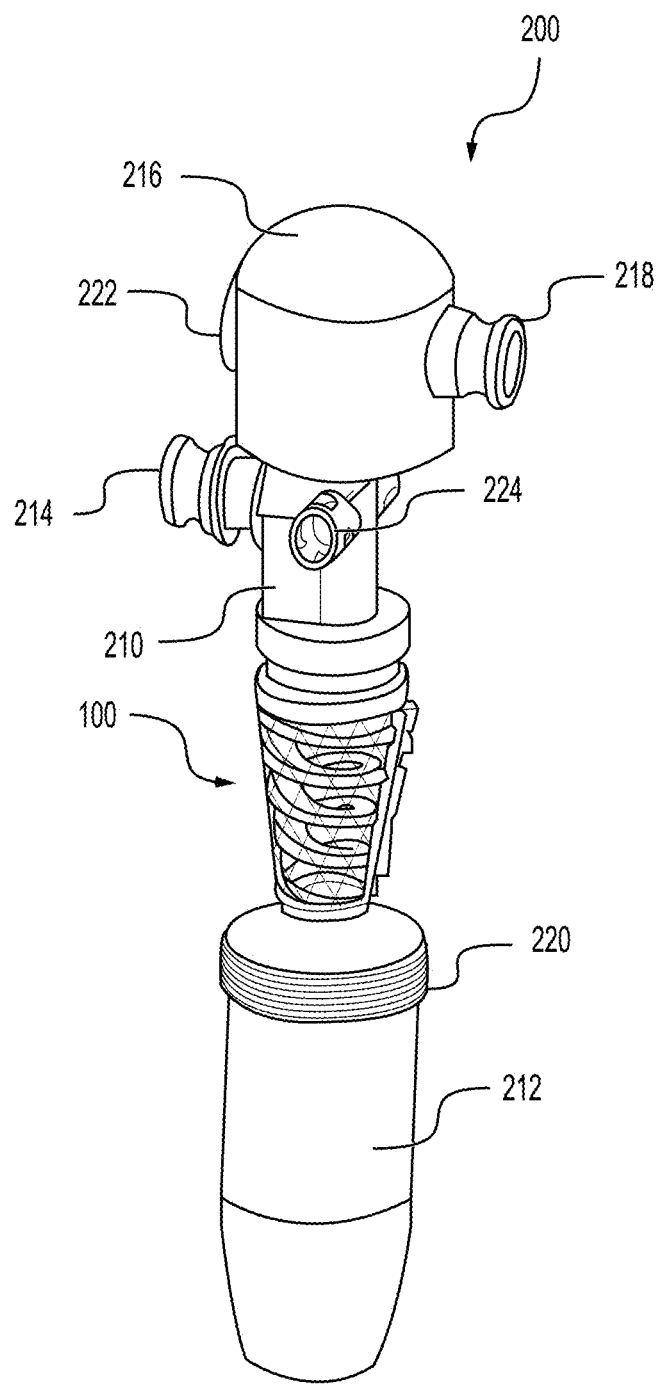
FIGS. 9A-9B show an exploded perspective and elevation views of an exemplary filtration system, consistent with some embodiments of this disclosure.
Figure 9B:
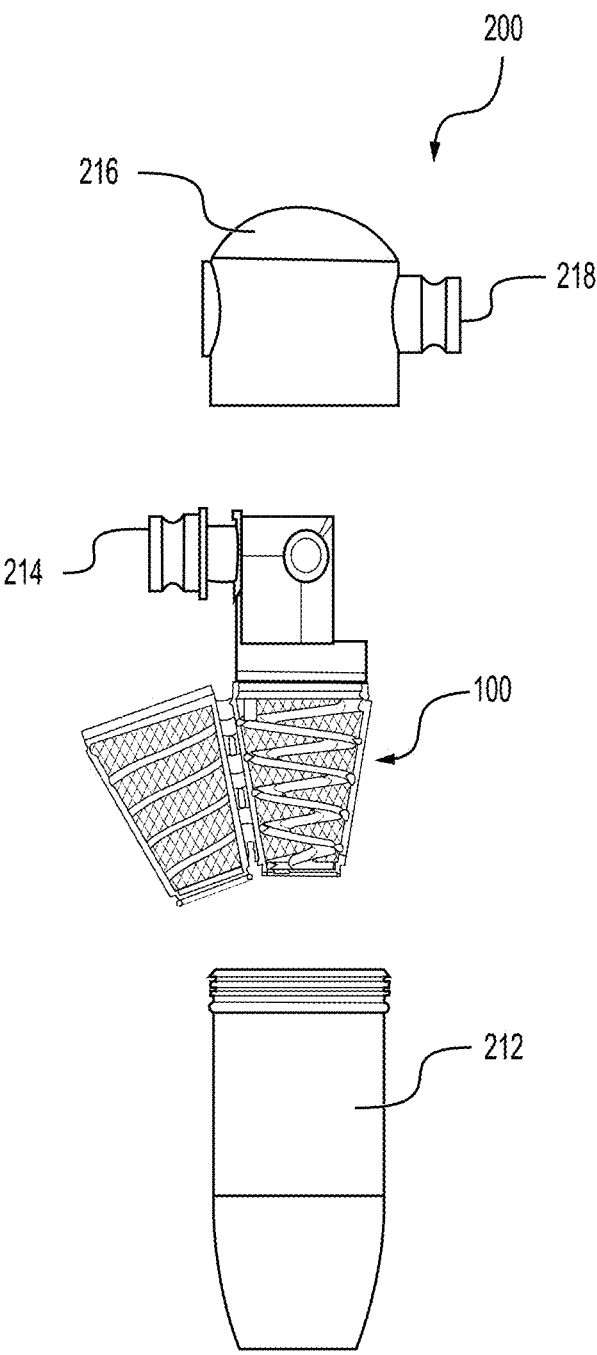

FIG. 9A shows an exploded perspective view of an exemplary system 200 for filtering a fluid. FIG. 9B shows an exploded elevation view of system 200. Although described with reference to use in washing machines in this example, system 200 may be used in other applications such as blood filtration, water faucet or dispenser filtration, mass-collection such as wastewater treatment, and other applications where suspended solids are filtered from fluids. As shown in FIG. 9A, system 200 includes filtration device 100 that is joined, at a first end, to an inlet manifold 210. Inlet manifold 210 includes an inlet opening 214 and may include a pressure relief valve 224. In some embodiments, inlet opening 214 may include an external connection, such as a camlock quick release attachment mechanism to a component of a washing machine (e.g., a washing machine discharge hose). Pressure relief valve 224 may allow fluid to bypass the filter if pressure is too high. Inlet manifold 210 directs fluid, such as discharge water from a washing machine, into filtration device 100, such as via path 201 shown in FIG. 10A.

System 200 may include enclosing member 212 that can be joined to a manifold cover 216. Manifold cover 216 includes outlet opening 218 that may include a camlock quick release attachment mechanism to a drain line. Enclosing member 212 may be provided with a fastening mechanism 220, such as external threads, to join enclosing member 212 with manifold cover 216. When joined, inlet opening 214 may extend through aperture 222 on manifold cover 216, and enclosing member 212 and manifold cover 216 may form a fluid-tight enclosure in which filtration device 100 is enclosed. In some embodiments, enclosing member 212 may act as a particle collection member. In other embodiments, enclosing member 212 may enclose a collection unit, such as collection unit 170, whereby enclosing member 212 may be removed to facilitate access to collected particles, either within enclosing member 212 or in collection unit 170.

Figure 10A:
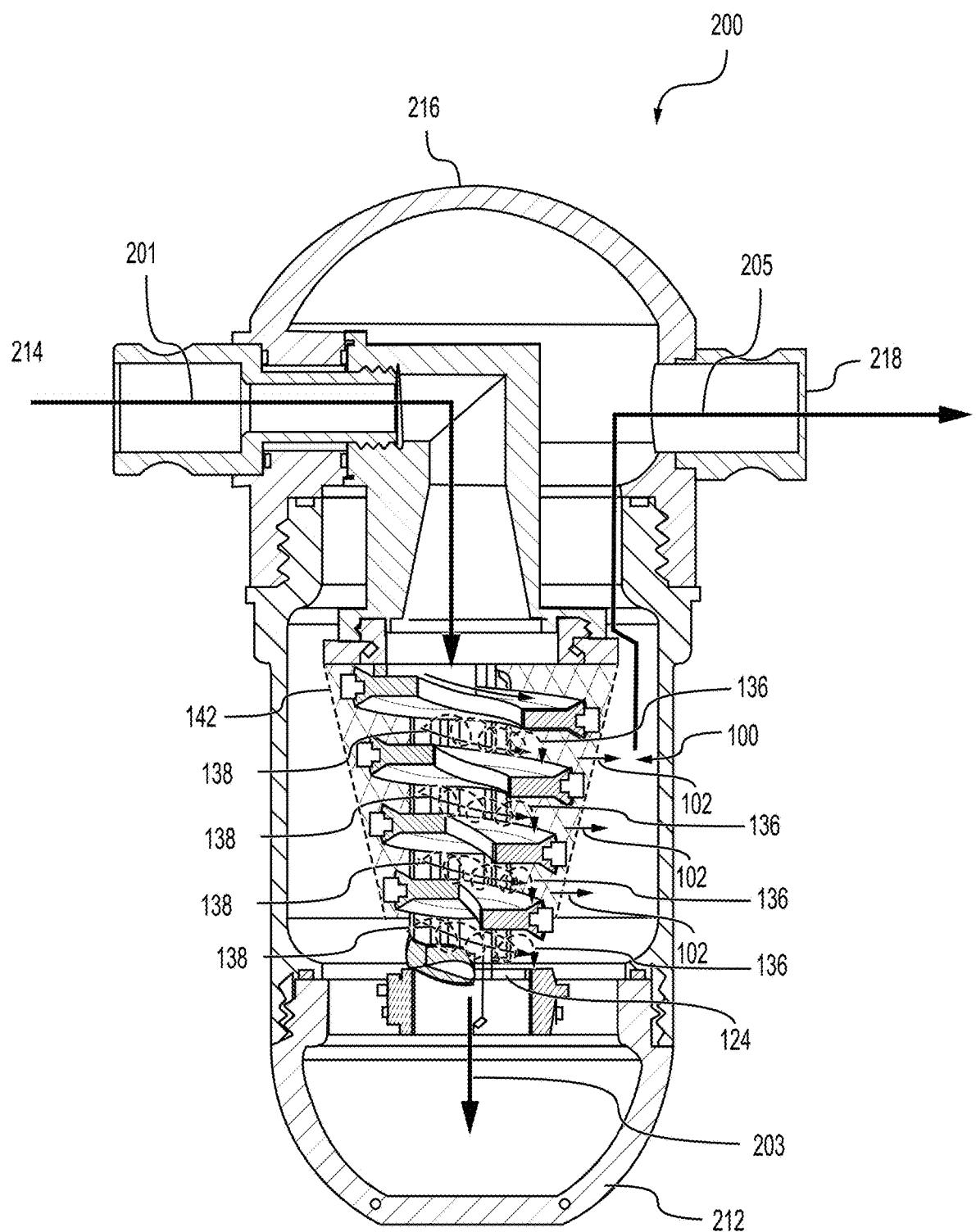
FIGS. 10A-10C show cross-section views of exemplary filtration systems, consistent with some embodiments of this disclosure.
Figure 10B:
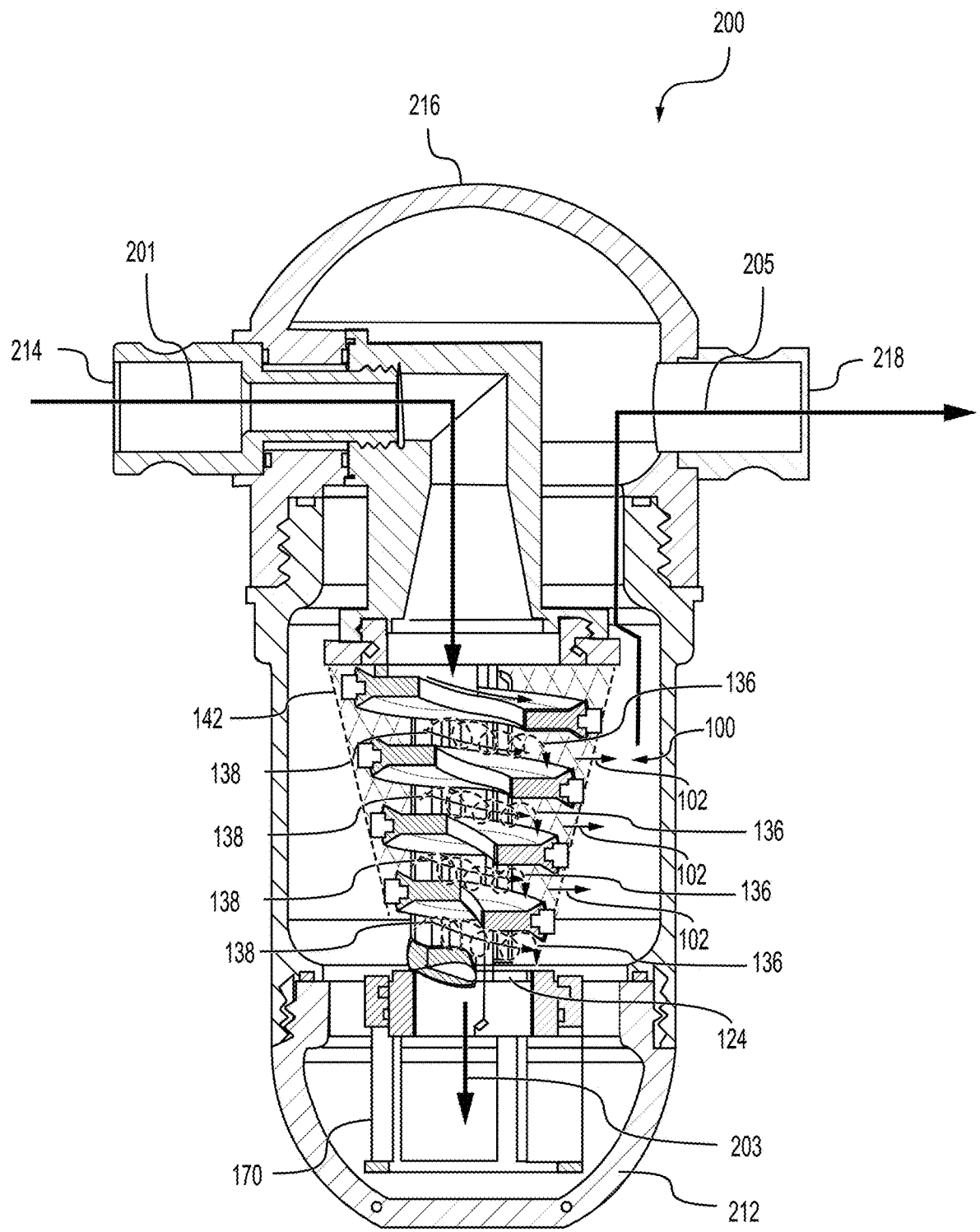
Figure 10C:
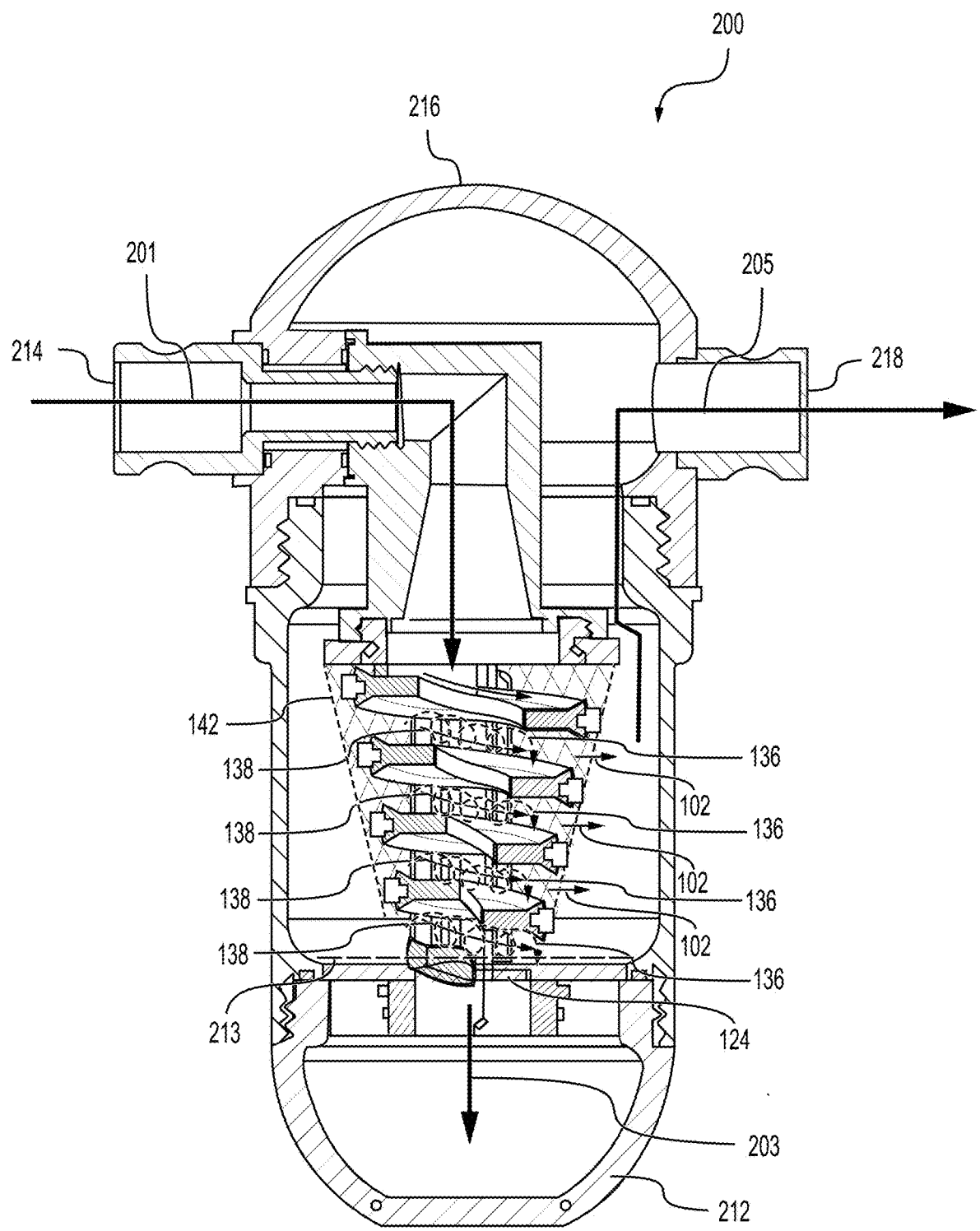

FIG. 10A shows a cross-sectional view of an exemplary embodiment of system 200 that is assembled so as to enclose filtration device 100. FIG. 10B shows a cross-sectional view of an exemplary embodiment of system 200 having filtration device 100 that includes residue collection unit 170. FIG. 10C shows a cross-sectional view of an exemplary embodiment of system 200 in which enclosing member 212 includes a filter media 213. Filter media 213 may further prevent solids exiting second opening 124 from reaching outlet opening 218. To facilitate cleaning, enclosing member 212 may include a separable component at a point at or below screen 213 so that an operator can dispose of filtered solids from enclosing member 212.

In some embodiments, enclosing member 212 may include a removable cup-like member, preferably at or below mesh 213, when mesh 213 is included, in which particles removed during filtering may be collected and disposed of. In some embodiments, enclosing member 212 may be joined to manifold cover 216 by mating threads, snap-on connection, cam lock fitting, press fit, interference fit, press-and-twist fit, or any other fastening mechanism.

Referring to FIG. 10A, an exemplary mode of operation of system 200 may involve flowing a fluid through system 200. In operation, fluid from a fluid source, such as outlet water from a washing machine, may enter inlet opening 214. The fluid may include particles to be filtered from the fluid, such as microplastic particles, suspended therein, and the fluid may be conducted in a hose or pipe connected to inlet opening 214. Fluid flows to the inside of filtration device 100 along path 201 and the fluid, such as water, may freely flow, through system 200, while particles to be filtered, such as microplastic particles, may remain suspended until they impinge an obstacle, such as tapered-helical coil 112 or filter media 142. Vortices 136 generated by tapered-helical coil 112 may cause particles to be swept by the moving fluid along path 138 to second opening 124 of tapered-helical coil 112 and to exit path 203 of filtration device 100. Particles may be captured in enclosing member 212, such as by settling. Meanwhile, clean, filtrate fluid exits filtration device 100 by paths 102 and flows to outlet opening 218 along path 205. Outlet opening 218 may be joined to a hose or pipe that directs the particle-free fluid to a discharge flow, such as a sewer line.

FIG. 10B is similar to FIG. 10A, except that filtered particles are captured in collection unit 170, which is believed to better collect filtered particles than relying on settling of the particles as in FIG. 10A.

FIG. 10C is similar to FIG. 10A, except that filtered particles are contained in the bottom of enclosing member 212 by filter media 213, which is believed to better collect filtered particles than relying on settling of the particles as in FIG. 10A.

Although the systems shown in FIGS. 10A-10C show the filtration device 100 in a vertical orientation for axis 120 with the first opening 122 at the "top" of system 200 and the second opening 124 at the "bottom" of system 200, the methods and systems described herein may be used in any orientation. For example, where filtration device 100 is provided such that axis 120 may be provided in a horizontal orientation, an upward or downward diagonal orientation, or a vertical orientation where second opening 124 is provided at the "top" of system 200 and first opening 122 is provided at the "bottom" of system 200. Similarly, although outlet opening 218 is shown closer to first opening 122 than second openings 124 in FIGS. 10A-10C, in some embodiments, outlet opening 218 may be provided at or near second opening 124, which may be advantageous, for example, when filtration device 100 includes collection unit 170. Similarly, although inlet opening 214 and outlet opening shown with a 90-degree angle leading to axis 120 of filtration device 100, it is contemplated that inlet opening 214 may be provided at any angle to axis 120, which may be determined by the particular application and use.

Figure 16A:
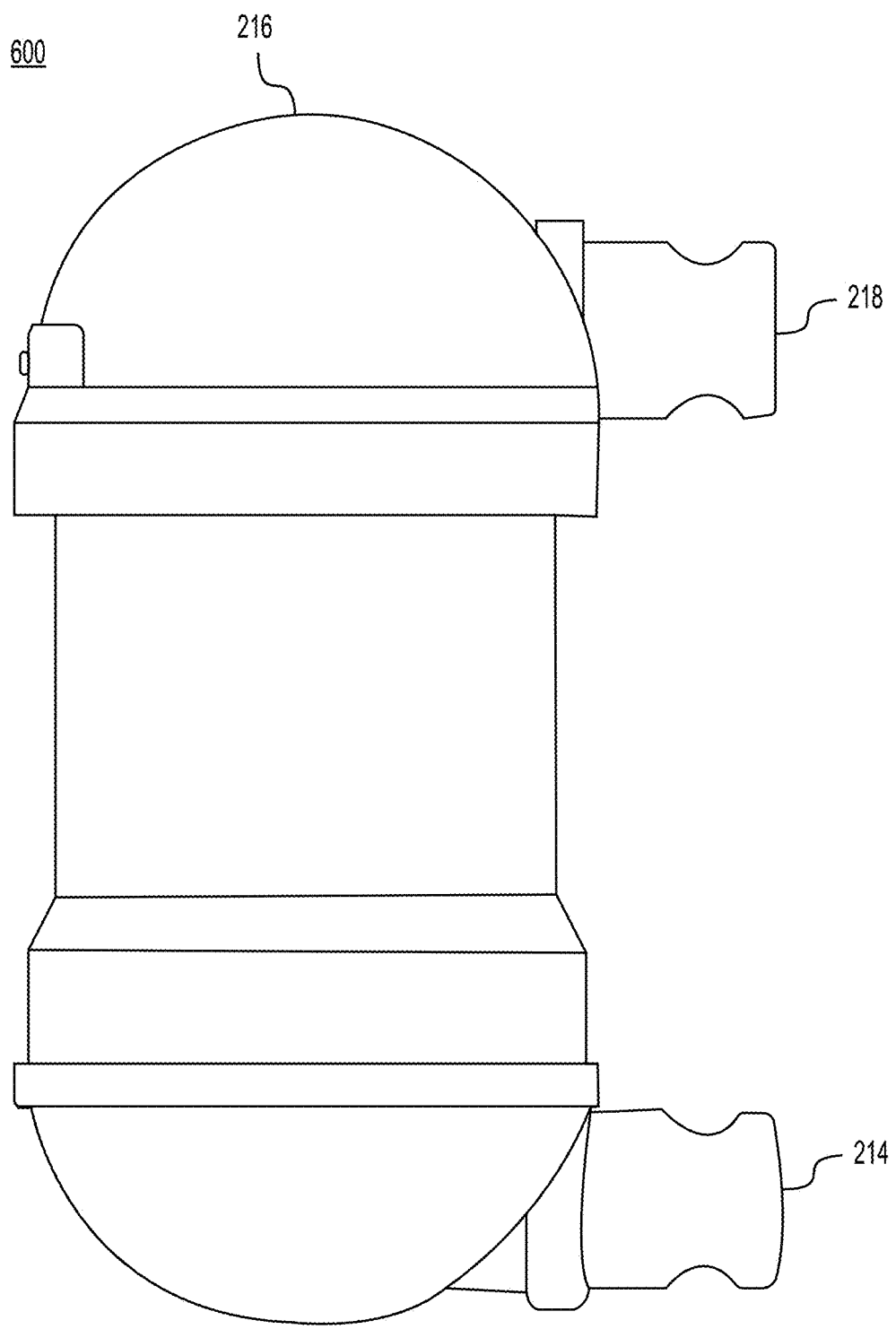
FIGS. 16A-16C show an elevation and cross-section views of exemplary filtration systems, consistent with some embodiments of this disclosure.
Figure 16B:
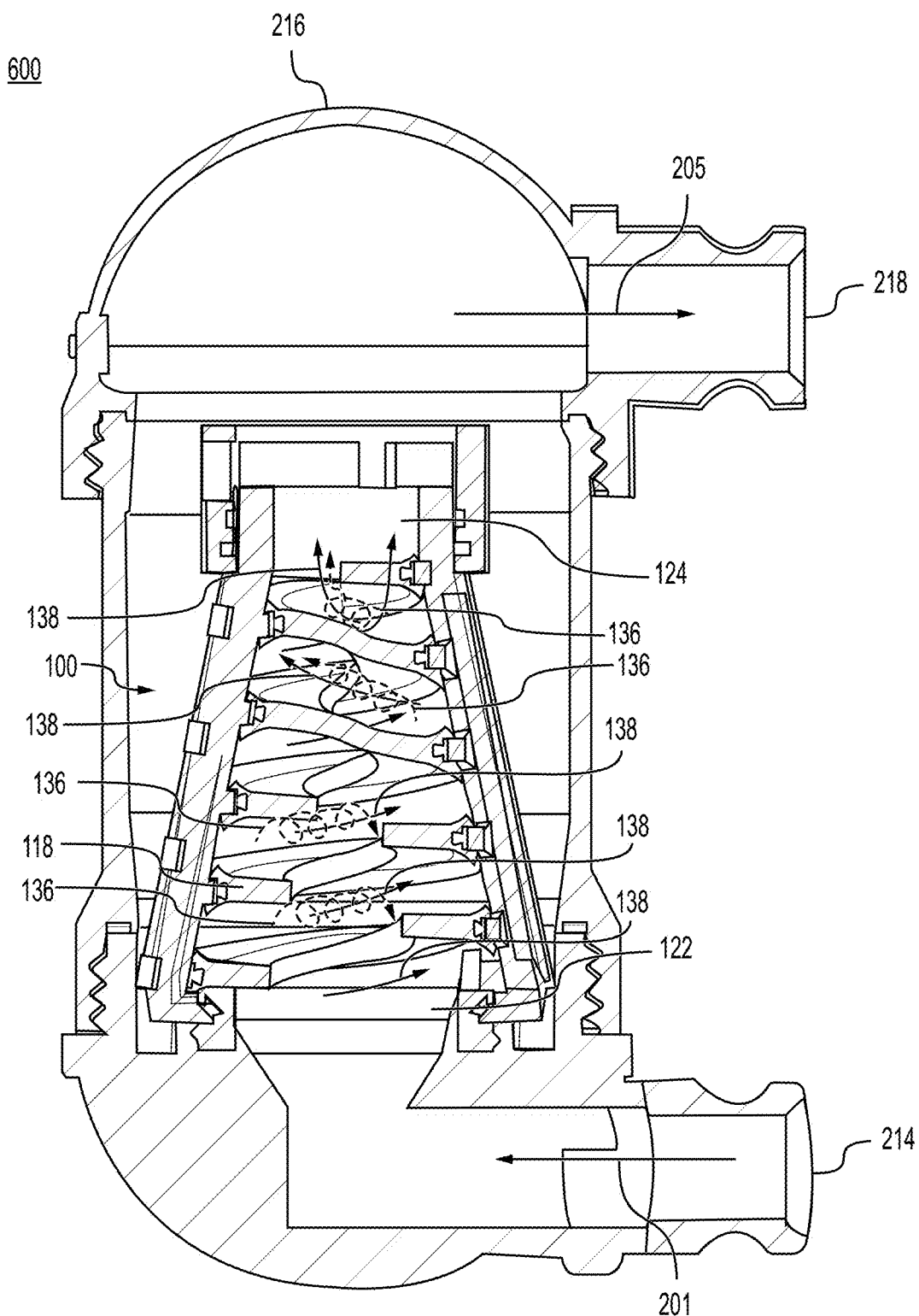
Figure 16C:
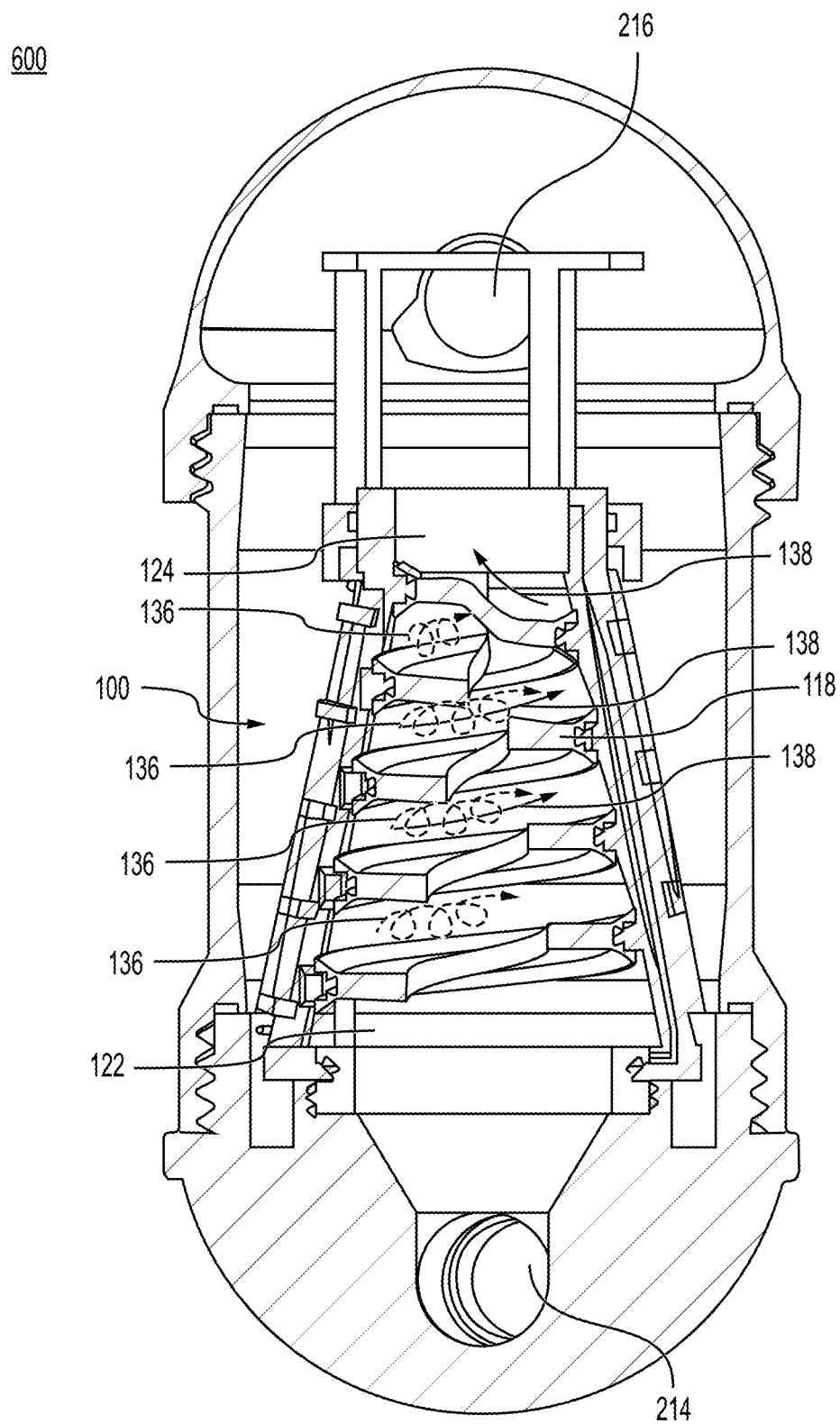

FIGS. 16A-16C show another embodiment of a system 600 in which the inlet opening 214 is near first opening 122 and outlet opening is near second opening 124, respectively. Such orientation may, in some circumstances, be advantageous because the filtrate need not pass back up the manifold cover 216, as in FIGS. 10A-C (filter media 142 is omitted in FIGS. 16B-16C). Although inlet opening 214 and outlet opening 218 are shown at right angles to filtration device 100, it is contemplated that inlet opening 214 and outlet opening may be in-line with inlet flow direction 126 of filtration device 100, or at any other angle, such as 45 degrees, 30 degrees, or 60 degrees to inlet flow direction 126.

FIGS. 21A-21D show exemplary isometric and cross-sectional views of another exemplary filtration system including a filtration device, such as a filtration device similar to filtration device 100, consistent with some embodiments of this disclosure. FIGS. 21A-21D show a system 2100 in which an inlet opening 214 is near a first opening 122 of the filtration device at the wider end of tapered-helical coil 112. Second opening 124 of the filtration device at the narrow end of tapered-helical coil 112 is open to collection unit 2102, which may be similar to residue collection unit 170. Collection unit 2102 is shown as a cylindrical collection unit in the embodiments of FIGS. 21A-21D. Collection unit 2102 may, in other embodiments, have other shapes. As described above, tapered-helical coil 112 and collection unit 2102 may be enclosed by filter media 142 and 172, respectively (not shown for simplicity), such as, for example, a mesh filter media. The filtration device, including tapered-helical coil 112 and collection unit 2102 are shown enclosed in a housing 2104. Housing 2104 includes inlet opening 214 and outlet opening 218. In some embodiments, housing 2104 may include a window 2106 that permits visibility of at least a portion of the filtration device, such as tapered-helical coil 112 or collection unit 2102, through housing 2104. Tapered-helical coil 112 may be coupled to housing 2104, such as, for example, by threaded portion 2107, which may facilitate insertion, removal, or replacement of tapered-helical coil 112, such as for cleaning or other maintenance. In some embodiments, other coupling mechanisms may be used to couple tapered-helical coil 112 to housing 2104, such as, for example, an annular lip, pin, snap-in or twist-in fixture, or pressed-in or turned-in slot, such as an L or U-shaped slot.

Figure 21A:
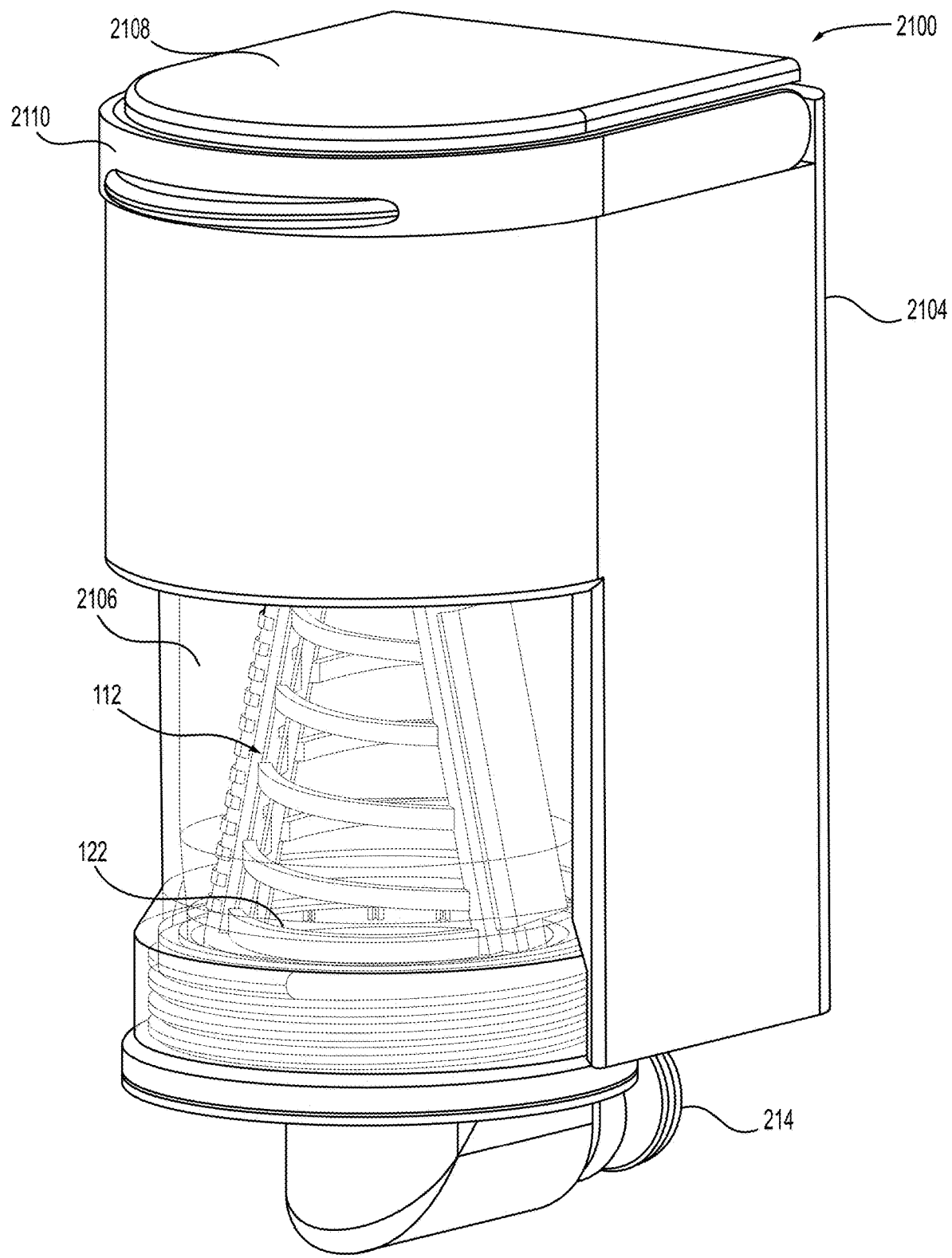
FIGS. 21A-21D show exemplary isometric and cross-sectional views of exemplary filtration systems, consistent with some embodiments of this disclosure.
Figure 21B:
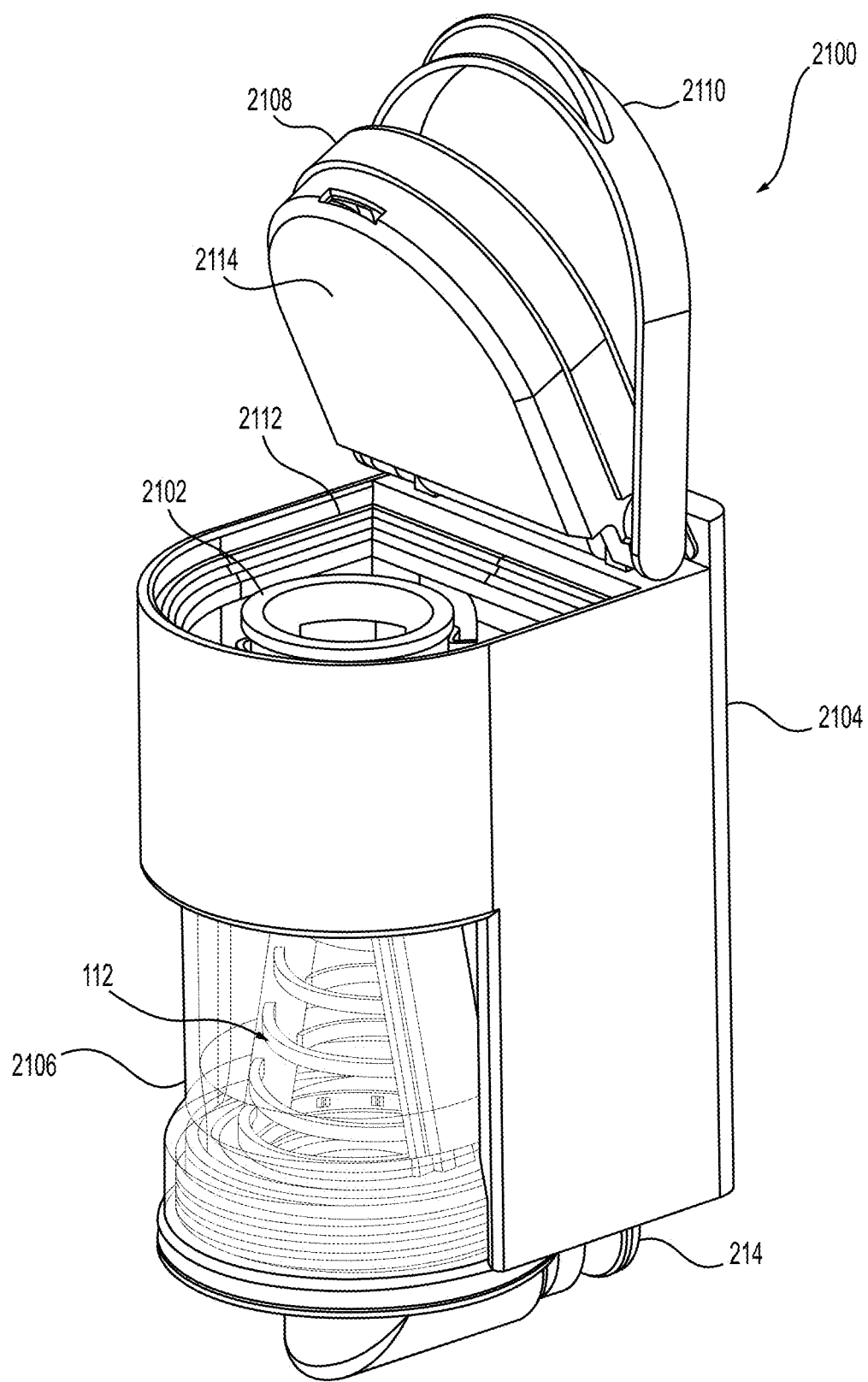
Figure 21C:
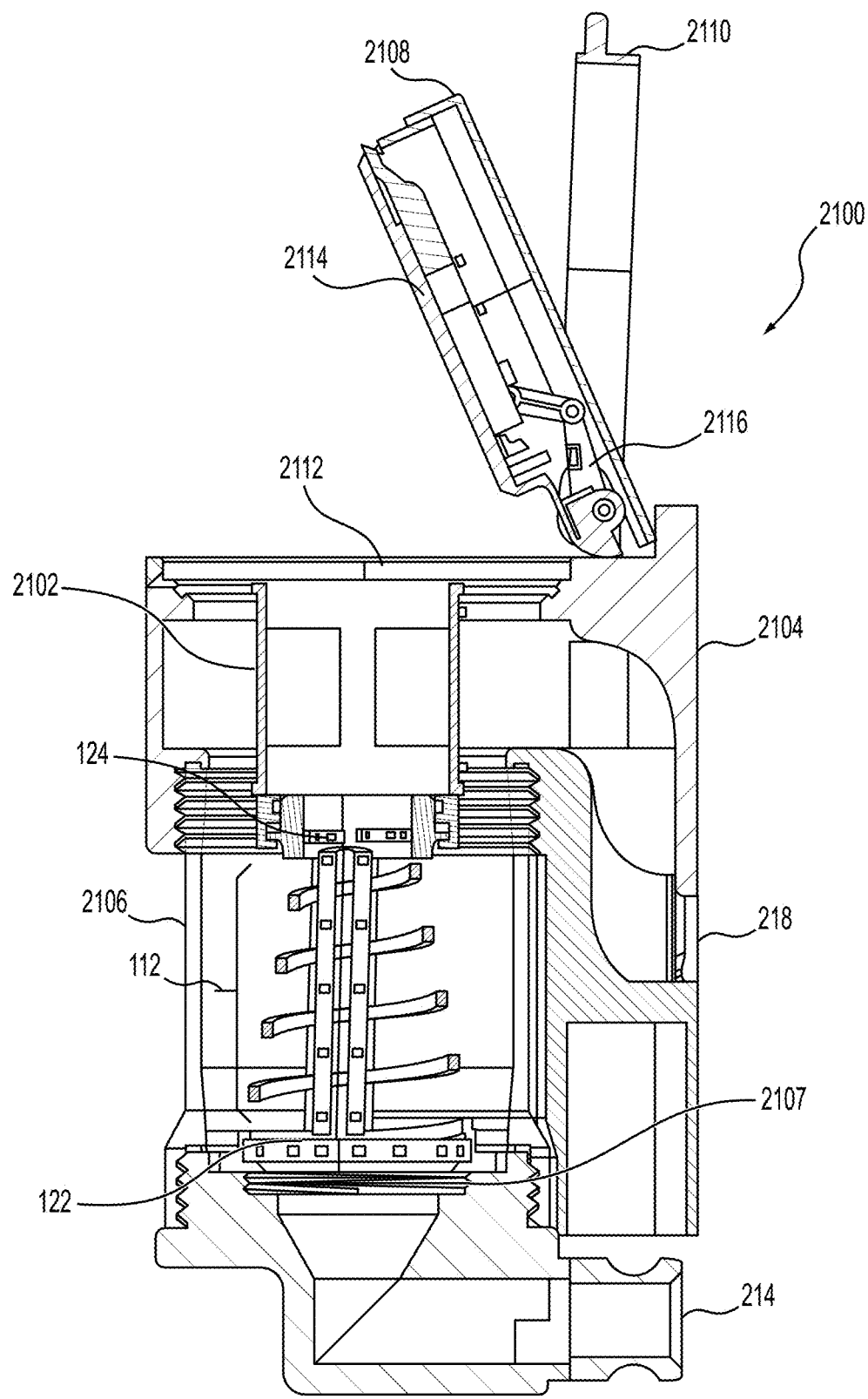
Figure 21D:
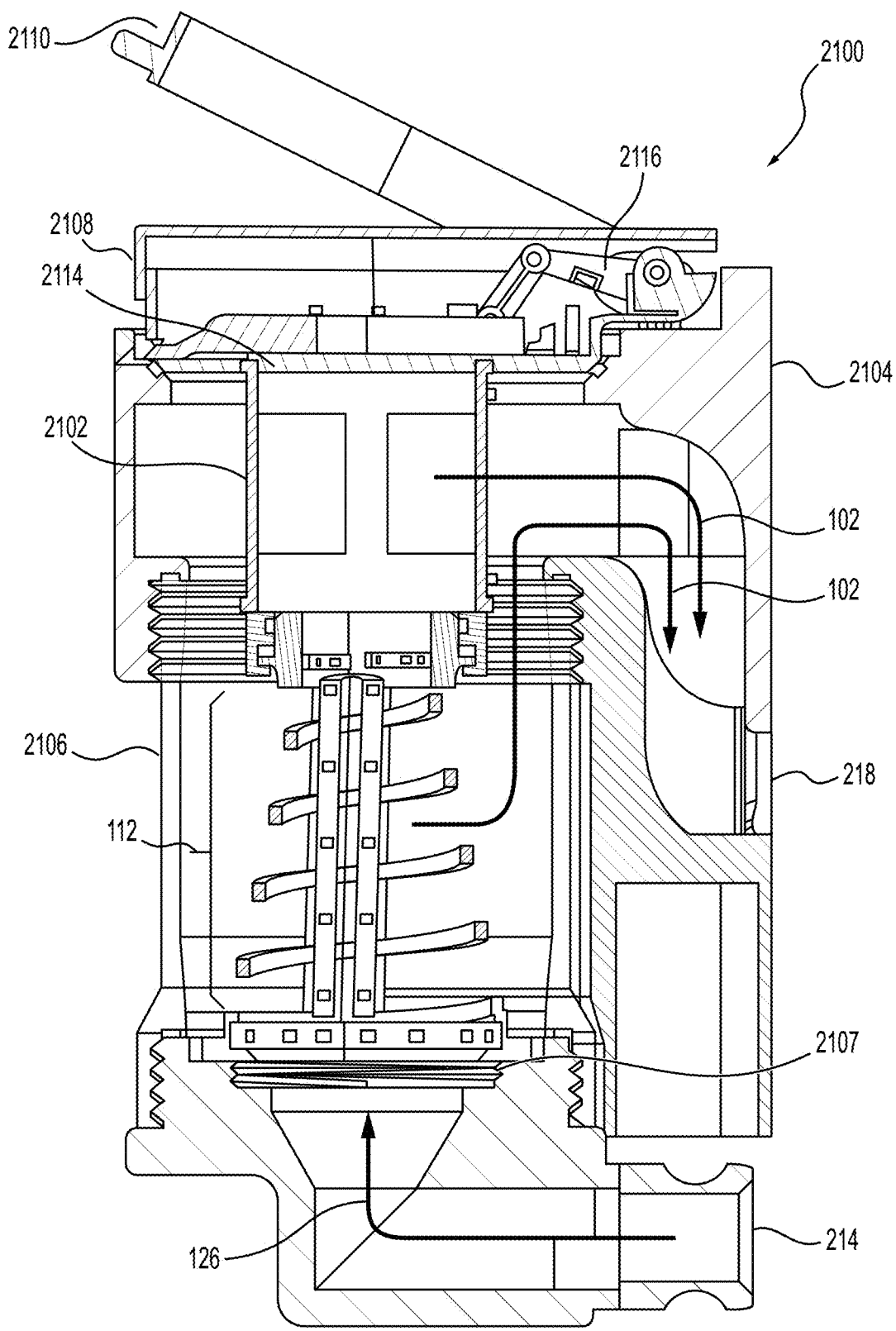

Housing 2104 includes a sealing portion 2108 and closure mechanism 2110 operatively connected to sealing portion 2108. Closure mechanism 2110 is configured to open and close sealing portion 2108. Sealing portion 2108 form may be configured to provide a watertight seal for the interior of housing 2104 and may facilitate access to tapered-helical coil 112 and collection unit 2102, such as for cleaning, repairing, replacing or performing maintenance on the collection unit 2102 or tapered-helical coil 112 or for cleaning the inside of housing 2104. In FIG. 21A, sealing portion 2108 and closure mechanism 2110 are shown in a fully closed position, which creates a watertight seal at opening 2112 of housing 2104 (shown in in FIGS. 21B and 21C). In FIGS. 21B and 21C, sealing portion 2108 and closure mechanism 2110 are shown in an open position to facilitate access to the interior of housing 2104, such as for accessing collection unit 2104 or tapered-helical coil 112. FIG. 21D shows sealing portion 2108 and closure mechanism 2110 in a closed position, although closure mechanism 2110 is not fully closed. In FIGS. 21A-21D, exemplary closure mechanism 2110 is shown as a pull-down handle around the outside of sealing portion 2108. Closure mechanism 2110 may, in some embodiments, include a handle or lever on the side of housing 2104, be integrated into sealing portion 2108 as a latch, snap-closure, or other closure type. In some embodiments, closure mechanism may include a threaded closure, an annular lip, pin, snap-in or twist-in fixture, or pressed-in or turned-in slot, such as an L or U-shaped slot.

A sealing mechanism 2116 may, in some embodiments, provide further pressure on sealing portion 2108 when closure mechanism 2110 is fully closed, as shown in FIG. 21A as compared to FIG. 21D in which sealing portion 2108 is closed, but closure mechanism 2110 is not yet fully closed. One or more of closure mechanism 2110, sealing portion 2108, or sealing mechanism 2116 may also include a locking mechanism (not shown) to prevent accidental opening of sealing portion 2108 during operation.

In some embodiments, sealing portion 2108 includes a lower surface 2114 that forms on cylindrical face of collection unit 2102 when sealing portion 2108 is in a closed position, such as shown in FIGS. 21A and 21D. In such embodiments, filtered liquids exit collection unit 2102 through the filter media (not shown) around the circumference of collection unit 2102. In other embodiments, lower surface 2114 of sealing portion 2108 may not form a cylindrical face of collection unit 2102, such that there is a separation between collection unit 2102 and lower surface 2114. In such embodiments, the face of collection unit 2102 nearest to lower surface 2114 may include a filter media or may include a solid surface.

In operation an inlet fluid flow 126 of a fluid-to-be-filtered enters system 2100 at inlet 214. The fluid is filtered by tapered-helical coil 112 and collection unit 2102 as described above. Filtered liquids 102 passing through filter media 142 (not shown) of tapered-helical coil 112 or filter media 172 (also not shown) of collection unit 2102 exit housing 2104 at outlet 218. Filtered particles are generally collected in collection unit 2102 because the operation of tapered-helical coil 112 facilitates the flow of filtered particles into collection unit 2102.

Although FIG. 21D shows closure mechanism 2110 in the closed position, it is understood that generally during operation, closure mechanism 2110 will be fully closed.

In some embodiments, when exemplary system 2100 is connected to a source of liquid to be filtered, such as a washing machine discharge line, sealing portion 2108 may be vertically oriented above the narrow end of tapered-helical coil 112. This configuration may provide certain advantages not previously known in the art. For example, when sealing portion 2108 is in an open position to facilitate access to collection unit 2102 or tapered-helical coil 112, any remaining fluid in system 2100 will not leak because the opening 2112 is above any remaining liquid. Therefore, such configuration provides for maintenance and cleaning even when liquid is present in system 2100. The ease of access provided by sealing portion 2108 and opening 2112 also permits tapered-helical coil 112 and collection unit 2102 to operate as a reusable filter device, such as for filtering microplastics from washing machine discharge, because the filtration device can be easily accessed to clean filtered particles from the device and then closed to provide filtration in subsequent operation.

To facilitate cleaning, replacement, or maintenance of collection unit 2102, collection unit 2102 may, in some embodiments, be detachably connected to tapered-helical coil 112. When sealing portion 2108 is in an open position, a user may separate collection unit 2102 from tapered-helical coil 112. In some embodiments, such as where lower surface 2114 of sealing portion 2108 forms a face of collection unit 2102, opening sealing portion 2108 may provide direct access to cleaning and maintenance of collection unit 2102 without removal. Therefore, in some embodiments, collection unit 2102 may be integrally connected to or formed with tapered-helical coil 112. In some embodiments, to facilitate cleaning, replacement, or maintenance of tapered-helical coil 112, tapered-helical coil 112 may be detachably connected to housing 2104 and may be separated or removed when sealing portion 2108 is in an open position. Window 2106 may further facilitate reusability by permitting a user to determine whether tapered-helical coil 112 should be cleaned. In operation, collection unit 2102 may be cleaned more frequently than tapered-helical coil 112 because, as described above, the configuration of tapered-helical coil 112 facilitates the flow of filtered particles towards and into collection unit 2102 (e.g., particle collection unit 170) such that the filter mesh of tapered-helical coil 112 remains relatively clean and has a slower buildup of filtered particles than collection unit 2102 over time.

The filter devices, systems, and methods described herein are particularly useful for filtering particles from a fluid having a high flow rate or high flow speed. For example, a high flow speed may be a flow speed at first opening 122 greater than about 50 cm/sec. Prior art filters are unable to efficiently filter particles, in particular small particles or microsolids, at such high flow speeds and flow rates because they develop back pressure, turbulence leading to reverse flow, or clogging that can lead to damage or failure of the filter. The filter devices, systems, and methods described herein overcome these drawbacks by promoting vortex 136 formation along particle path 138 and cross-filtration across filter media 142 while allowing the filtered particles to exit via second opening 124. The filter devices described can perform this at high flow speeds and high flow rates, such as in washing machine discharge, which can have flow rates as greater than 600 $cm^3$/sec or 950 $cm^3$/sec and flow speeds of greater than 90 cm/sec or 140 cm/sec. The filter devices, systems, and methods provide efficient filtering operation with reduced particle buildup, thereby allowing for sustained or continuous use at high flow speeds, such as greater than 50 cm/sec, greater than 60 cm/sec, greater than 70 cm/sec, greater than 80 cm/sec, greater than 90 cm/sec, greater than 100 cm/sec, greater than 110 cm/sec, greater than 120 cm/sec, greater than 130 cm/sec, greater than 140 cm/sec, greater than 150 cm/sec, greater than 160 cm/sec, greater than 170 cm/sec, or greater than 180 cm/sec, thereby allowing their use in high-flow applications without the drawbacks of other filters. Similarly, the filters, systems, and methods may provide efficient filtering operation with reduced particle buildup at high flow rates, such as, flow rates as flow rates greater than 200 $cm^3$/sec, greater than 250 $cm^3$/sec, greater than 300 $cm^3$/sec, greater than 350 $cm^3$/sec, greater than 400 $cm^3$/sec, greater than 450 $cm^3$/sec, greater than 500 $cm^3$/sec, greater than 550 $cm^3$/sec, greater than 600 $cm^3$/sec, greater than 650 $cm^3$/sec, or greater than 700 $cm^3$/sec, greater than 750 $cm^3$/sec, greater than 800 $cm^3$/sec, greater than 850 $cm^3$/sec, greater than 900 $cm^3$/sec, greater than 950 $cm^3$/sec, greater than 1000 $cm^3$/sec, greater than 1050 $cm^3$/sec, greater than 1100 $cm^3$/sec, greater than 1150 $cm^3$/sec, or greater than 1200 $cm^3$/sec, thereby allowing their use in high-flow applications without the drawbacks of other filters. These high flow rates and high flow speeds are associated with high-flow discharges, such as washing machine discharge. The filter devices, systems, and methods described herein therefore meet unmet needs in the art.

Figure 11:
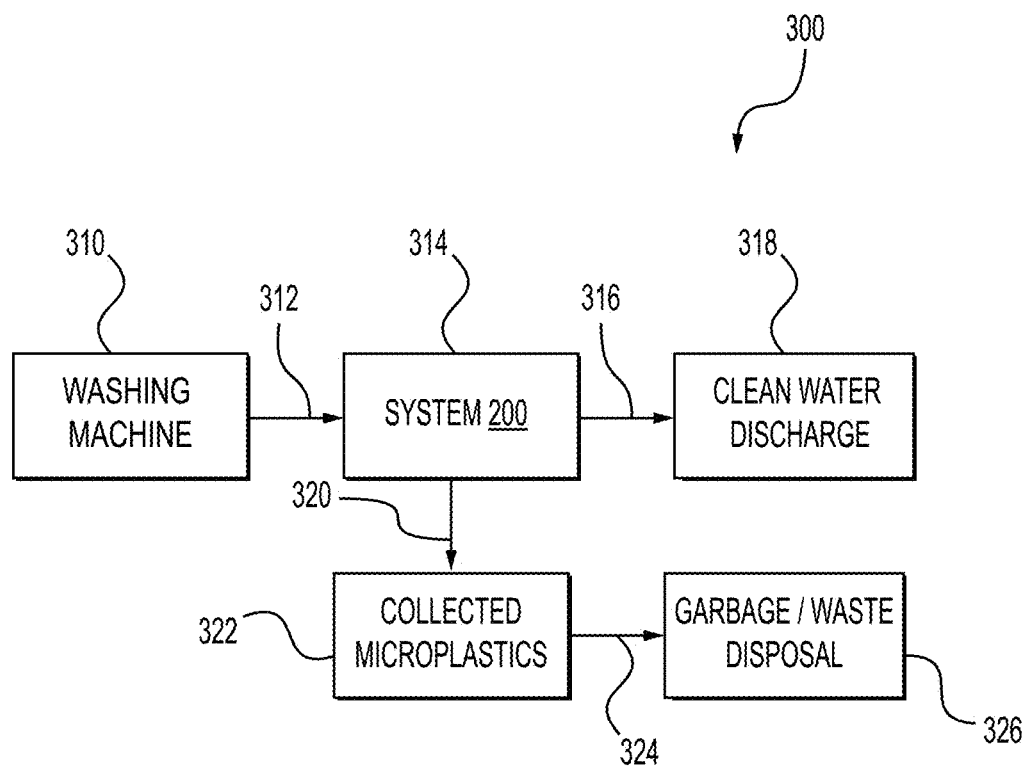
FIG. 11 shows a schematic flow diagram of an exemplary method, consistent with some embodiments of this disclosure.

FIG. 11 shows an exemplary flow chart of a method 300, consistent with embodiments of the disclosure. In some embodiments, method 300 may involve using system 200 with a washing machine 310. As shown in FIG. 11, water with suspended particles leaves washing machine 310 at step 312 and enters system 200 at step 314. Filtered water leaves system 200 indicated by arrow 316 and then proceeds to clean water discharge at step 318. Particles, such as microplastic particles, are filtered out of the water and are removed from system 200 indicated by arrow 320 as collected microplastics at step 322. At step 324, the particles are transported and may be disposed of at step 326.

Figure 12:
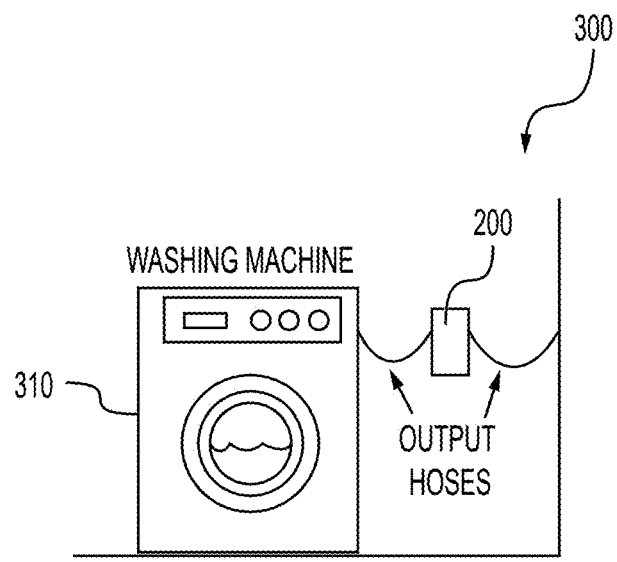
FIG. 12 shows a schematic diagram of an exemplary in-use configuration for the method of FIG. 11.

FIG. 12 shows an exemplary view of an embodiment of an operation configuration for method 300 using system 200 and a washing machine in which the system 200 is external to the washing machine.

Figure 13:
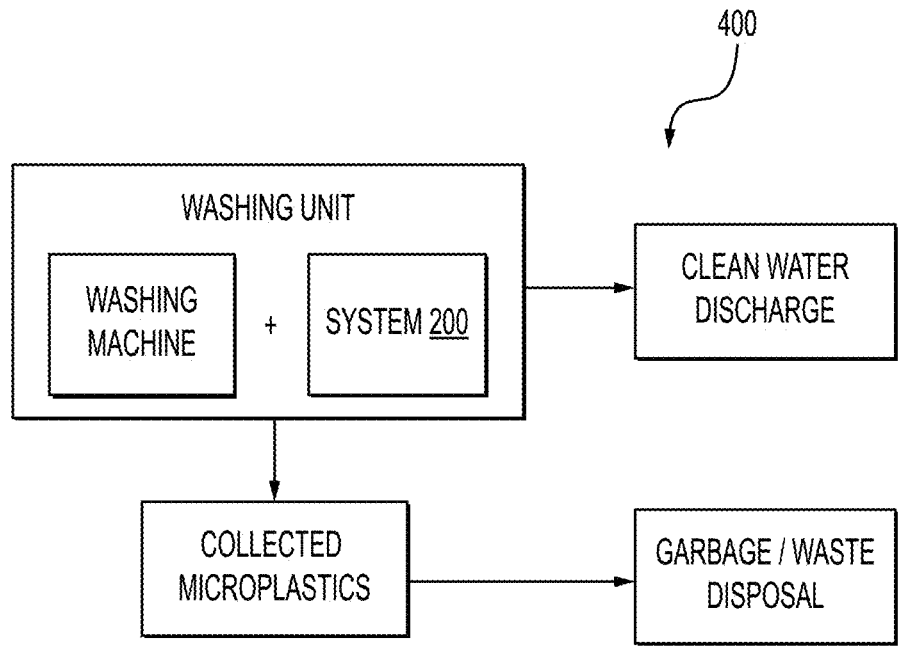
FIG. 13 shows schematic flow diagram of an exemplary method consistent with some embodiments of this disclosure.
Figure 14:
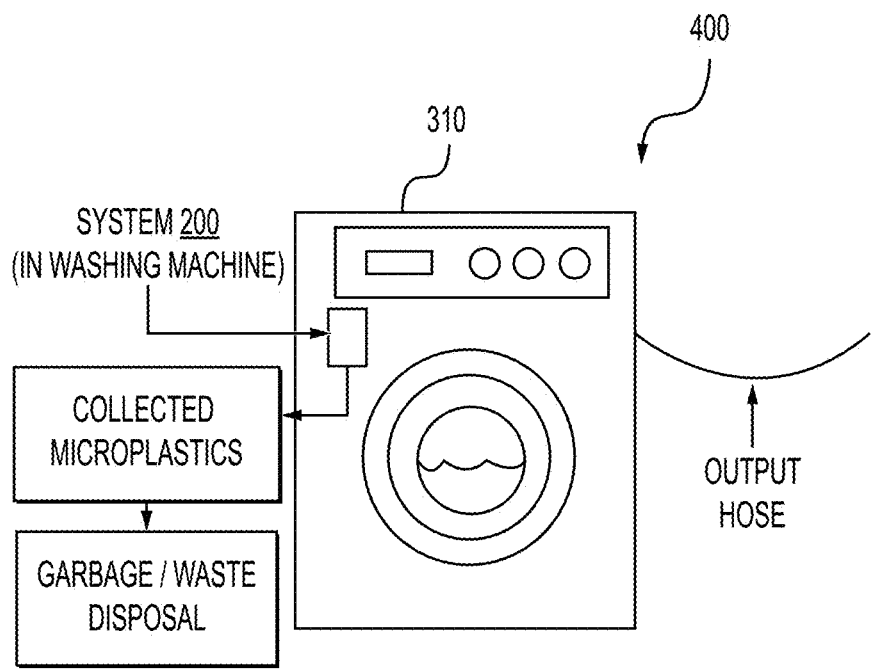
FIG. 14 shows a schematic diagram of an exemplary in-use configuration for the method of FIG. 13.

FIG. 13 shows an exemplary flow chart of a method 400, consistent with embodiments of the disclosure. Method 400 may be similar to method 300 except that system 200 is disposed interior to the washing machine. The flow of FIG. 13 may be similar to that of FIG. 11 except that system 200 is located inside the washing machine housing, as shown in FIG. 14.

In some embodiments, a particle collection member may be configured to be removed from an enclosure in a manner such that the fluid remains in the enclosure. Allowing fluid to remain in the enclosure while the particle collection member is removed may encourage an operator to frequently check and clean the particle collection member. For example, an operator may remove the particle collection member and discard captured particles and residue without concern for spilling the fluid. In some embodiments, system components may be oriented in a manner that allows fluid to drain from the particle collection member before or during removal. In operation, however, the system may keep the tapered-helical coil of the filter completely submerged with fluid so that vortices are generated effectively. There may be provided a draining mechanism to remove fluid from an enclosure where the particle collection member resides. In some embodiments, the particle collection member may be disposed at an upper location with respect to gravity. In some embodiments, a removal direction of the particle collection member may be opposite the gravitational direction. In some embodiments, the particle collection member may not be removed, but may instead have a slide-out or hinged portion to access the collection area.

In some embodiments, there may be provided a scraping mechanism configured to clean the tapered-helical coil or filter media. Although the tapered-helical coil may be configured to be self-cleaning, the scraping mechanism may further clean the tapered-helical coil and filter media. The scraping mechanism may dislodge certain particles that may be outside of an effective target filtering range, or other foreign matter. The scraping mechanism may be configured to operate periodically or based on feedback from sensors.

The scraping mechanism may be internal to the tapered-helical coil. The scraping mechanism may be powered by the fluid flow through the filter. The scraping mechanism may include fins that use the momentum of the fluid flowing through the filter to self-rotate. The scraping mechanism may be operated by an external power source (e.g., by hand) or autonomously depending on filter application, size, or other parameters. The scraping mechanism may be integrated with the housing. The scraping mechanism may follow down the path of the rib and may be used to clean off the rib and filter media. The scraping mechanism may fit between revolutions of the tapered-helical coil. The scraping mechanism may be configured to operate based on feedback received from the filter. The scraping mechanism may operate based on a schedule, for example, to clean the tapered-helical coil and filter media after 5 loads, 10 loads, or 15 loads of laundry, or any number of loads. The scraping mechanism may operate based on measured parameters of fluid flow through the filter such as pressure drop and system maintenance, or any feedback received via sensors. A measured pressure drop may indicate a build up of particles, indicating that the filter should be cleaned to improve filtering performance.

In some embodiments, there may be provided a tapered-helical coil having parameters as follows. Rib width 127 may be configured to be in a range between about 0.025 inches and about 120 inches. Rib height 128 may be configured to be in a range between 0.025 inches and about 24 inches. Helix height 130 may be configured to be in a range between about 0.025 inches and about 500 inches. The helix outside diameter may be configured to be a value varying between about 0.025 inches and about 200 inches. Helix pitch 134 may be configured to be between about 0.025 inches and about 120 inches. In some embodiments, the helix parameters may be on the micron scale, such as in a range between about 1 micron and about 50,000 microns.

Figure 15:
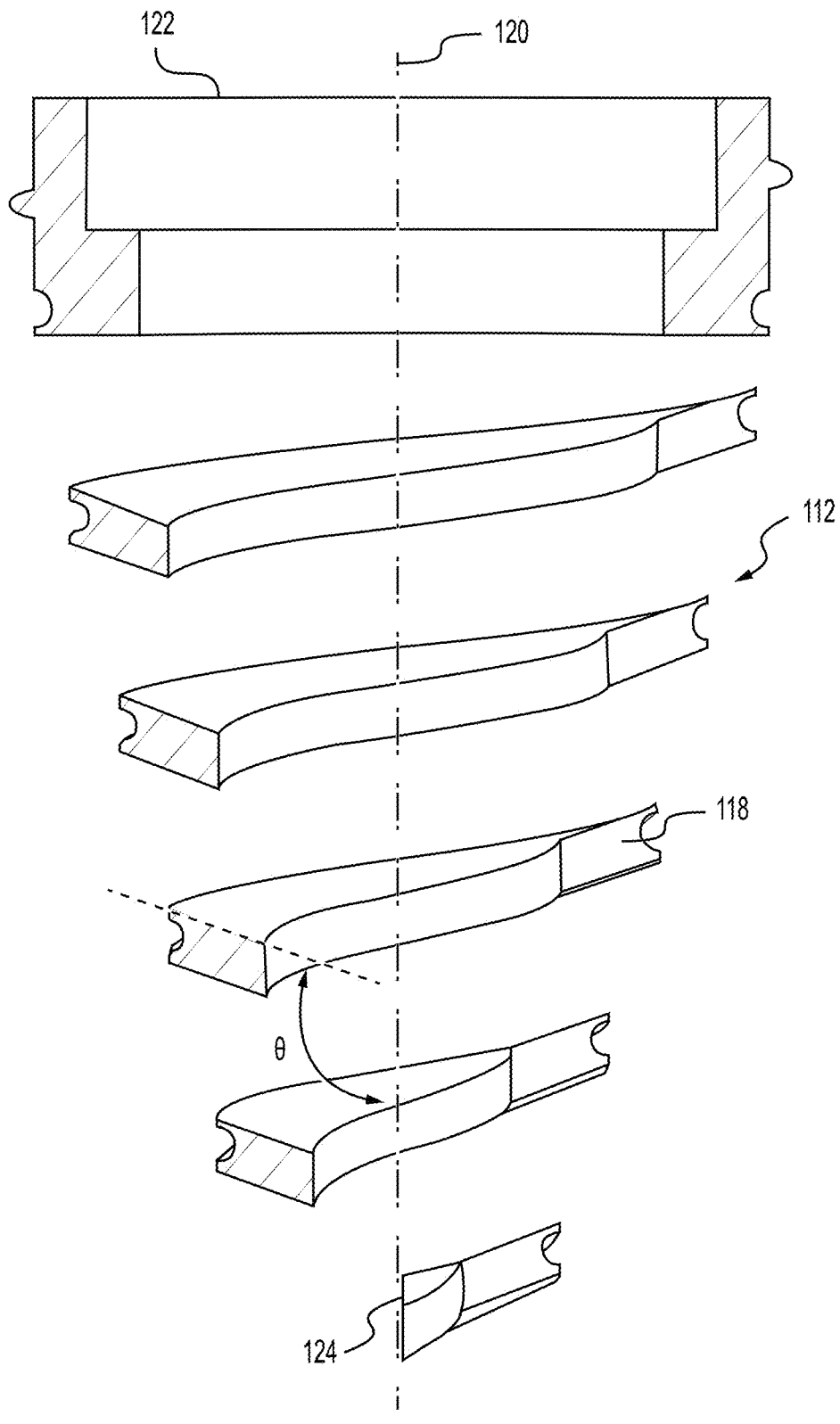
FIG. 15 shows an exemplary partial cross-section of an exemplary tapered-helical coil.

In some embodiments, a rib angle $\theta$ may be measured as the angle between axis 120 of tapered-helical coil 112 in the direction of second opening 124 and the surface of rib 118, as shown in FIG. 15. In some embodiments rib angle $\theta$ may be an angle in a range from 10 degrees to 170 degrees and may be used for different fluid filtration applications. In some embodiments, rib angle $\theta$ may be in a range from about 45 degrees to about 135 degrees, from about 60 degrees to about 135 degrees, from about 90 degrees to about 135 degrees, from about 60 degrees to about 120 degrees, from about 60 degrees to about 105 degrees, from about 60 degrees to about 90 degrees, from about 75 degrees to about 105 degrees, from about 80 degrees to about 100 degrees, or from about 85 degrees to about 95 degrees. As shown in FIG. 5A, rib angle $\theta$ may be about 90 degrees in some embodiments.

In some embodiments, fins, blades, or vanes may be applied along the outside of the housing in a configuration to use the momentum of the filtered or unfiltered water to cause the filter to spin in a direction opposite the direction of the taper of tapered-helical coil 112. For example, if the helix sweep is clockwise from first opening 122 to second opening 124, the fins, blades, or vanes may cause the filter to spin counter counterclockwise. In some embodiments, the filter spinning may permit the filtered particles to move faster towards second opening 124 by creating a screw-like effect. In various embodiments, parameters, such as filter rotation speed, fin angle, and all helical variables may be adjusted depending on the application. Such embodiments may provide advantages in certain applications, such as described above, where both the inlet and outlet are near first opening 122, such that the flow of filtered fluid outside filtration system 100 is opposite the inlet flow direction 126. The use of fins, vanes, or blades to create a rotation may also be beneficial in other applications, such as solid waste filtration, "dragging" operations such as pulling the filtration system 100 through a body of fluid such as a body of water.

Parameters of the tapered-helical coil may be varied depending on the application. For example, the tapered-helical coil may be composed of sections with multiple or changing pitches resulting in increasing or decreasing step width along the coil.

EXPERIMENTAL RESULTS

Microplastics are believed to lead to a myriad of diseases, infections, and harmful bodily responses. The largest percentage of these microplastics come directly from the outlet of domestic washing machines. Countries across the world have recognized the problem of microplastics. The first experimental method is intended to evaluate whether a filter meets the most restrictive existing legislation or proposed legislation (e.g., the "Microplastic Filters (Washing Machines) Bill" by the U.K. House of Commons) and is adapted from the method described in Imogen Napper et al., *The efficiency of devices intended to reduce microfibre release during clothes washing*, Science of the Total Environment 738 (2020) (available at https://doi.org/10.1016/j.scitotenv.2020.140412) ("Napper"). The Napper paper applied a similar test and found that the highest microplastic reduction of prior filters was about 78% by mass, which is insufficient to meet industry goals. An improved filter device is therefore required to meet the complex needs of high filtration efficiency, high flow rate, high flow speed, resistance to particle buildup, and ease of cleaning.

Quantitative methods were used to evaluate the performance of exemplary filters. In some embodiments, test methods are tailored to evaluating the efficiency of microplastic filters for use with washing machines. Such methods are also representative of other filtering conditions.

Example 1: Fabric Method

A first experimental test method was used to evaluate the efficiency of microplastic filters for washing machines. The first method may be applied to filters that are internal or external to the washing machine. Specifications of the first experimental method may include the following.

The first experimental method describes a procedure to determine, by mass, a filter's efficiency when applied to washing machine wastewater. The method may be applied to all variations of washing cycles. Post filtration may be specified based on a desired application, which may be, for example, dictated by legislation, regulation, or other rule specifying an accuracy level, such as post filtration to 10 µm and other parameters.

In the first experimental test method, a standard washing machine pumps wastewater through the filtration device being tested. The filtration device outputs the filtered wastewater into a waystation that pumps the filter effluent through a 10 µm filter, which is used to determine the amount of microplastics removed from the wastewater. Results of the first experimental test method may include a measure of the efficiency of microplastic filtering applied to washing machines. The first experimental test method uses mass to represent the amount of particulates captured by the filter device. A 10 µm post-filter is used, but other specifications can be used based on desired precision.

Figure 18:
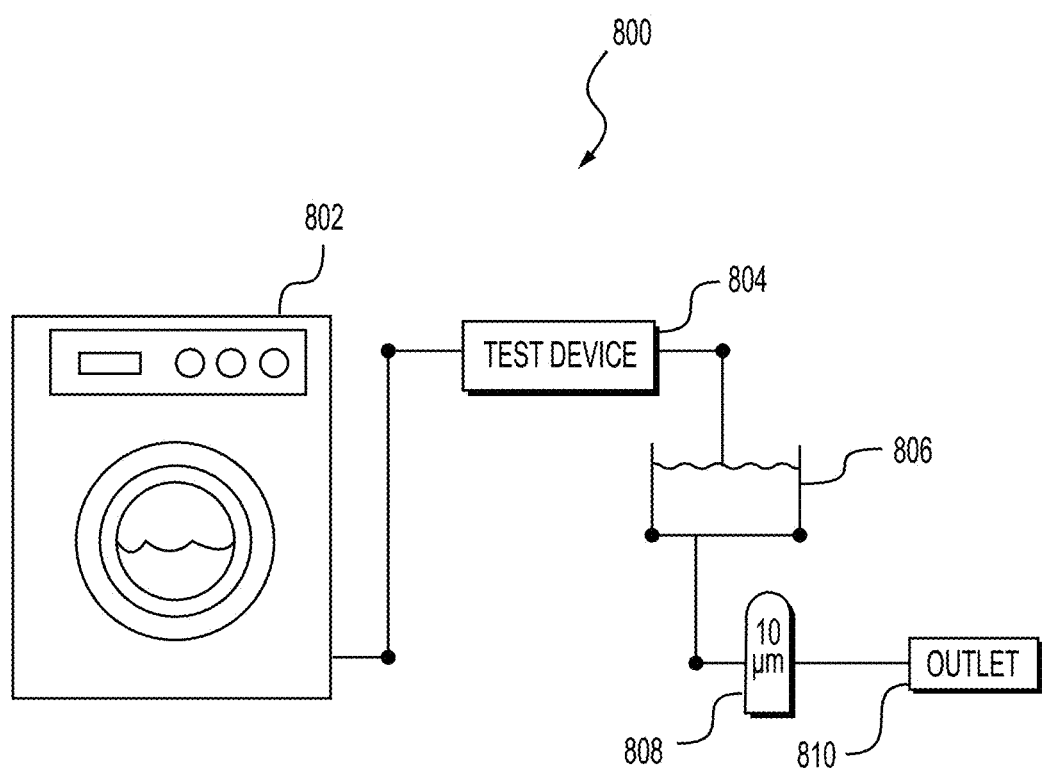
FIG. 18 shows a first exemplary setup for a test method to measure filtration efficiency.

A first testing apparatus 800 may be prepared as shown in FIG. 18. The testing apparatus may be constructed from individual components and assembled in the direction shown. Components may include:

Washing Machine 802—Any standard domestic washing machine, either top load or front load may be used. To compare one filter to another, the same washing machine may be used. In the first exemplary method, an LG model ACQ89947217 top loading washing machine was used. The flow rate of water discharge for the LG model ACQ89947217 washing machine was 15 gallons/minute (about 947 cm³/sec) with a discharge flow speed of about 140 cm/sec.

Pressure Transducer (not shown)—Necessary accuracy from 0-200 kPa.

Testing Device 804—The filter-to-be-evaluated during the test, described below.

Waystation 806—To collect discharge from testing device 804. A twenty-gallon tank is used with a piped connection fabricated on the underside with ¾ inch threads.

Pump (not shown)—A centrifugal pump to facilitate passing the discharge from waystation 806 through 10 µm filter 808 specified with a maximum flow rate of 18.95 LPM.

10 µm filter 808—A post-filter to capture any particles that passed through test device 804, which can be used to calculate the efficiency of test device 804. A reverse osmosis membrane filter was used as the 10 µm post filter.

Outlet 810—Discharge from 10 µm filter 808.

Scale (not shown)—This method uses a weight scale with a precision up to 0.0001 g.

To prepare the testing apparatus, the waystation is bleached to clean any particulates or residue from previous trials. The 10 µm post filter housing is bleached to clean any particulates or residue from previous trials. Each sensor is calibrated after every 3-5 trials.

The first experimental test method was performed using the following steps. The filter-to-be-evaluated and the 10 µm filter were placed into a dehydrator at 40° C. until constant weight was measured. "Constant weight" in the method was denoted by three weight measurements taken with one hour between each measurement, resulting in three measurements having a deviation of ±0.002 g or less. The humidity of the dehydrator was recorded at each measurement. The initial weight of each filter-to-be-evaluated and 10 µm filter were considered the average of the final three weight values for each filter.

The filter-to-be-evaluated 804 was connected to the washing machine 802 discharge line as shown in FIG. 18, with the discharge line discharging into the inlet side of the filter-to-be-evaluated. The discharge line of the filter-to-be-evaluated was directed into the waystation 806, centrifugal pump (not shown) pumps the filtered water to the 10 µm filter 808.

Eight towels (5 kg weight) containing synthetic fibers were placed into the drum of the washing machine. The normal wash cycle was selected and recorded. The wash cycle was started and the discharge water flowing from the washing machine was passed through the filter-to-be-evaluated and into the way station. The discharge flow rate from the washing machine was 15 gallons/minute (about 947 cm³/sec) with a discharge flow speed of about 140 cm/sec, which was passed into the inlet side of the filter-to-be-evaluated. From the way station, water will flow through the centrifugal pump and 10 µm post filter.

After running the washing machine, the filter-to-be-evaluated was removed and placed into a dehydrator at 40° C. The 10 µm post filter was removed and placed into a dehydrator at 40° C. The filters were left in the dehydrator until a constant weight was measured for each filter. The final weight of each filter was the average of the final three weight values when the constant weight was determined for each filter.

The percent efficiency of the filtration of the filter-to-be-evaluated was calculated by $$\% = \frac{C_2 - C_1}{(C_2 - C_1) + (M_2 - M_1)} \qquad \text{Eq. (1)}$$

where $C_1$ is weight in grams of the filter-to-be-evaluated before testing, $C_2$ is weight in grams of the filter-to-be-evaluated after testing, $M_1$ is weight in grams of the 10 µm post filter before testing, and $M_2$ is weight in grams of the 10 µm post filter after testing.

Using a filtration device such shown in FIGS. 16A-16B, where the filter-to-be-evaluated ("Experimental Filter 1") included the tapered-helical coil having one rib and an outer diameter of 2.5 inches at the inlet (first opening) side, an inner diameter such that the rib comprises substantially the radius of the helical coil at the outlet (second opening) side of the tapered-helical coil (i.e., the rib comprised the entire radius of the coil at the second opening, such as shown in FIG. 16B, where the particle flow path of the tapered-helical coil feeds into the collection unit), a helix angle of 11.5 degrees, a pitch of 0.75 inches, a rib width of 0.375 inches, a rib thickness of 0.1875 inches, a rib angle of 90 degrees (i.e., perpendicular to the inlet flow direction), a revolution count of 4.5 revolutions for the tapered-helical coil from the first opening (inlet side) to the second opening (outlet side), and a raker reduction ratio β/α of 3.68. The filter media mesh size of Experimental Filter 1 was a stainless steel 30 µm mesh. The outlet (second opening) side of the tapered-helical coil included a cylindrical collection unit surrounded by the same mesh as the coil. The tested fabric was 5 kg of cotton towels containing synthetic fibers and normal soil. The wash cycle was deep fill, high spin, with warm water. The resulting output efficiency averaged over 3 measurements was 90.16% microplastics removal by the filter-to-be-evaluated, with a range of +3% and −1% (i.e., an efficiency range from 89.16% to 93.16%).

Experimental Filter 1 in Example 1, therefore, has a measured microplastics filtration efficiency that is significantly better than the 78% microplastics filtration efficiency of the highest-rated microplastics filter described in the Napper paper using a comparative method. Thus, Experimental Filter 1 in Example 1 has a measured microplastics filtration efficiency between 10% and 15% greater than the most-efficient prior known microplastics filter.

Thus, unlike the prior filters, the filters described herein have significantly improved filtering efficiency and performance, capable of meeting the stringent requirements of microplastics legislation, including a filtering greater than 90% of microplastics by mass when post-filtered to 10 microns when measured using the method of Example 1. Notably, this filtration rate was achieved with a 30 µm mesh filter media, substantially larger than the post-filtration size of 10 µm. The results therefore indicate an ability of Experimental Filter 1 to filter smaller particle sizes, such as microplastics, with a larger filter media pore size.

Embodiments of the filter and filter system described herein provide improved filtration of particles from fluids. For example, the filters and filter systems described herein are effective at filtering greater than 90% of filtered microparticles (e.g., microplastics) by mass from washing machine wastewater when measured using the method of Example 1. In particular, the filters and filter systems described herein are effective at filtering greater than 90% of filtered microparticles (e.g., microplastics) by mass when post-filtered to 10 microns when measured using the method of Example 1. Some embodiments of the filters and filter systems described herein are effective at filtering greater than 92%, 93%, 94%, 95%, 96%, 97%, or 98% or 99% of filtered microparticles (e.g., microplastics) by mass when post-filtered to 10 microns when measured using the method of Example 1. As such, the filters and filter systems described herein are also effective at filtering greater than 60%, greater than 65%, greater than 70%, greater than 75%, greater than 80%, greater than 85%, greater than 87%, greater than 88%, and greater than 89% of filtered microparticles (e.g., microplastics) by mass from washing machine wastewater, including microplastics when post-filtered to 10 microns using the method of this Example 1.

Example 2: Flock Method

A second experimental test method was used to evaluate the performance of microplastic filters for filtration systems, such as washing machines or other wastewater systems, using flock fibers. Specifications of the second experimental method may include the following.

The second experimental method describes a procedure to determine, by mass, a filter's performance when using commercially available flock fibers. Post filtration may be specified based on a desired application, which may be, for example, dictated by legislation, regulation, or other rule specifying an accuracy level, such as post filtration to 10 µm and other parameters.

Figure 19:
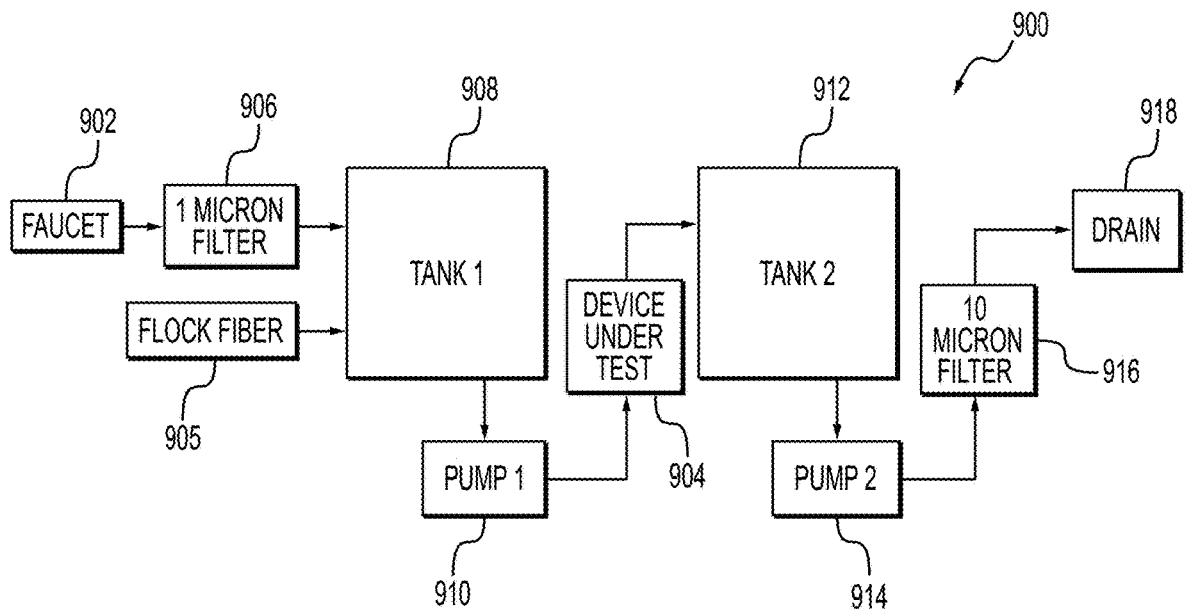
FIG. 19 shows a second exemplary setup for a test method to measure filtration efficiency.

In the second experimental test method, shown in FIG. 19, a pump is used to move water containing microplastic Nylon flock fiber from a first storage tank through the filtration device being tested. The filtration device outputs the filtered water into a second storage tank where the water is pumped through a 10 µm filter, which is used to determine the amount of fiber. Results of the second experimental test method may include a measure of the efficiency of microplastic filtering, such as for washing machines. The second experimental test method uses mass to represent the amount of particulates captured by the filter device. A 10 µm post-filter is used, but other specifications can be used based on desired precision.

A second testing apparatus 900 may be prepared as shown in FIG. 19. The testing apparatus may be constructed from individual components and assembled in the direction shown. Components may include:

Faucet 902 is a standard tap faucet.

1 µm filter 906 is a polypropylene melt-blown filter manufactured by Aquaboon, part number B01M1LB29B, for filtering water from faucet 902 into tank 908.

Testing Device/filter-to-be-evaluated 904 included the following devices:

"Experimental Filter 2"—The filter-to-be-evaluated during the test is similar to that shown in FIGS. 16A and 16C and included the tapered-helical coil having one rib and an outer diameter of 2.5 inches at the inlet (first opening) side. The rib had a rib width of 0.60 inches, a rib thickness of 0.1875 inches, rib angle of 90 degrees (i.e., perpendicular to the inlet flow direction), a pitch of 0.75 inches, a raker reduction ratio β/α of 3.69, and a revolution count of 4.5 revolutions for the tapered-helical coil from the inlet side to the outlet side. The inner diameter of the rib at the outlet side (second opening) comprises substantially the radius of the tapered-helical coil (i.e., the rib comprised the entire radius of the coil at the second opening, such as shown in FIG. 16B, where the particle flow path of the tapered-helical coil feeds into the collection unit). The helix angle of the tapered-helical coil was 11.5 degrees. The filter media mesh of filter 905 was a 20 µm porometric GKD mesh. The outlet side (second opening) of the tapered-helical coil included a cylindrical collection unit surrounded by the same mesh as the coil. The collection unit had a cylindrical shape with a diameter of 2.0 inches and a height of 2.0 inches; the inlet diameter between the tapered-helical coil and one face of the collection unit was about 1.23 inches. The circumference of the collection unit and the face opposite the inlet to the collection unit from the tapered-helical coil were enclosed by the same 20 µm porometric GKD mesh as the tapered-helical coil's circumference.

Figure 23A:
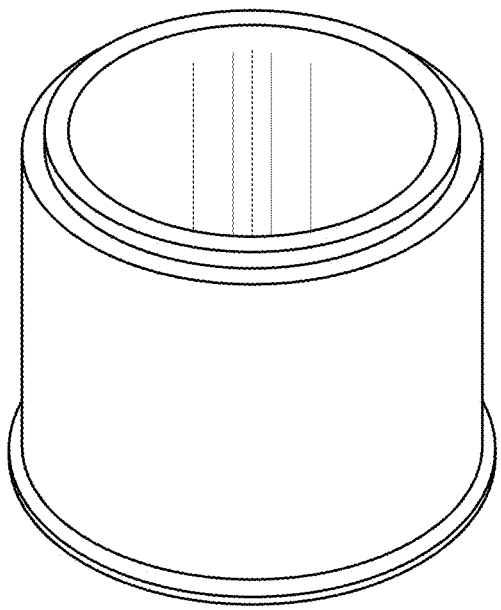
FIGS. 23A-23C show filters being tested according to Example 3.

"Dead End Filter"-a conventional dead end filter, shown in FIG. 23A, having a 20 µm porometric GKD mesh (not shown) arranged perpendicular to the flow direction.

Figure 23B:
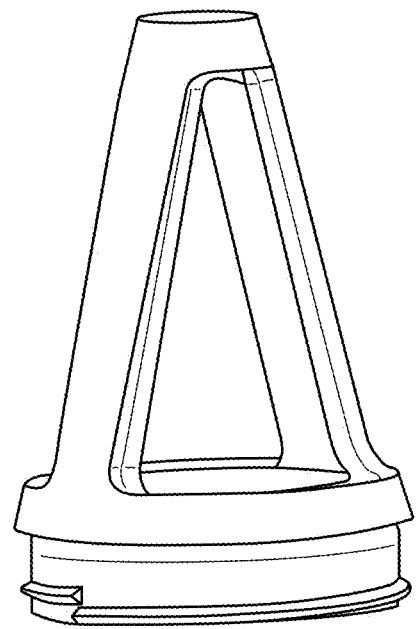

"Cross-Flow Filter"-a conical cross-flow filter, shown in FIG. 23B, having the same first opening diameter as Experimental Filter 2 and a 20 µm porometric GKD mesh (not shown) in a conical shape surrounding the tapered portion of the cone.

Figure 23C:
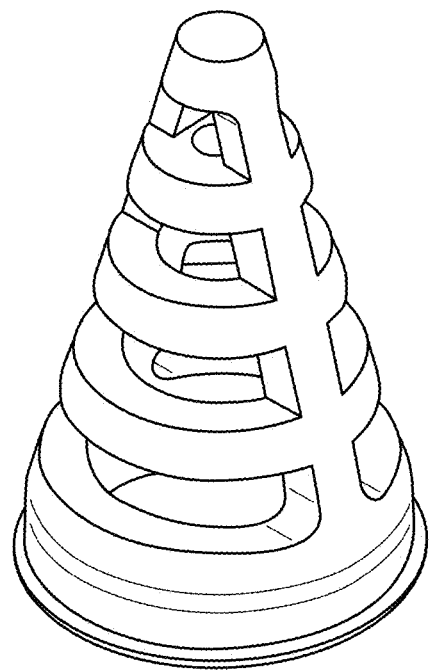

"Vortical Cross-Flow Filter"-a conical, vortical cross-flow filter, shown in FIG. 23C, having three decreasing concentric rings inside the cone and having the same first opening diameter as Experimental Filter 2 and having a 20 µm porometric GKD mesh (not shown) surrounding the tapered portion of the cone. The Vortical Cross-Flow Filter has an aspect ratio of rib width to height between ribs of 3.69.

Flock fiber 905 is a commercially available black nylon flock fiber manufactured by Donjer, part number 716-Black.

Tanks 908 and 912 are 20 gallon tanks manufactured by Aqueon, part number 170925.

10 µm filter 916-A post-filter to capture any particles that passed through test device 904 and is a polypropylene melt-blown filter manufactured by Membrane Solutions, part number MPP-F10-10. 10 µm filter 916 is housed in a pressure relief filter housing manufactured by Pentair Industries, part number B003VT7ERY.

Pumps 910 and 914 are commercially available washing machine drain pumps manufactured by Whirlpool Corp., part number BPX401-27, operating at 80 Watts and 1.5 Amps.

Drain 918 is a wastewater drain.

Piping between components is clear vinyl tubing having a 1.0 inch inside diameter.

Scale (not shown)—A weight scale is used with a precision up to 0.0001 g.

The components are assembled as shown in FIG. 19.

To prepare the testing apparatus, tanks 908 and 912 were rinsed to clean any particulates or residue from previous trials. The 10 µm post filter 916 housing is rinsed to clean any particulates or residue from previous trials. Each sensor is calibrated after every 3-5 trials.

The second experimental test method was performed using the following steps. The filter-to-be-evaluated 904 and the 10 µm filter 916 were placed into a dehydrator at 40° C. until constant weight was measured. "Constant weight" in the method was denoted by three weight measurements taken with one hour between each measurement, resulting in three measurements having a deviation of ±0.02 g or less. The humidity of the dehydrator was recorded at each measurement. The initial weight of each of the filter-to-be-evaluated 904, the 1 µm filter 906, and the 10 µm filter 916 was considered the weight of each filter after three constant weights were measured.

Two sheets of 12 in wide aluminum foil were weighed and the weight recorded. A piece of 10-micron filter paper was weighed and the weight recorded. 0.5±0.02 g of flock fiber 905 was weighed and the weight recorded.

Tank 908 was filled with 3.5 gallons of water from faucet 902 filtered through 1 µm filter 906. The pre-weighed 0.5 g of flock fiber 905 was added to the water in tank 908.

The fiber-water mixture was pumped using pump 901 from tank 908 through the filter-to-be-evaluated 904 into tank 912. The measured flow rate was 10.0 gal/min with a flow speed of about 124 cm/s.

The process of weighing 0.5±0.02 g of flock fiber 905, adding the flock fiber to 3.5 gallons of water in tank 908 and pumping the fiber-water mixture through filter-to-be-tested 905 into tank 912 an additional nine times (total of ten filtration process trials).

Tank 908 was then rinsed with water from faucet 902 filtered through 1 µm filter 906 and pumped through filter-to-be-evaluated 904 to ensure all flock fiber had been filtered through filter-to-be-evaluated 904 into tank 912. This rinse was performed three times.

The water from tank 912 was then pumped through pump 914 through 10 µm filter 916 into drain 918. Tank 912 was rinsed, and the water pumped through 10 µm filter 916 three times using pump 914 to ensure all of flock fiber 905 that passed through device-to-be-evaluated 904 has been pushed through device.

The 10-micron filter containing the flock fiber 905 that passed through filter-to-be-evaluated 904 was placed on the aluminum foil sheets. The filter housing was then rinsed through the 10-micron filter paper to remove any remaining flock fiber from the housing, and the filter paper was placed on the aluminum foil.

The 10-micron filter and filter paper on the aluminum foil were then dried at 95 degrees Fahrenheit until a constant weight was measured.

The percent efficiency of the microplastics filtration by the filter-to-be-evaluated 904 was then calculated using the following equation:

$$\% \text{ Filter Efficiency} = \frac{m_{flock} - \Delta m_{10}}{m_{flock}} * 100$$

where $\Delta m_{10}$ corresponds to the mass gain of the 10-micron filter and filter paper measured as, $\Delta m_{10} = m_{10,final} - m_{10,initial}$, and $m_{flock}$ corresponds to the total mass of microplastic flock fiber 905 introduced into the system, which is measured by:

$$m_{flock} = \Sigma_{i=1}^{n} m_i$$

where $m_i$ corresponds to the mass of microplastic flock fiber for each trial, i, of the ten trials.

The amount of microplastics collected by the collection unit versus that retained in the tapered-helical coil in the filter-to-be-evaluated 904 was also determined. The amount if microplastics collected in the collection unit of the filter-to-be-evaluated 904 was determined by removing the filter-to-be-evaluated 904 from the housing, separating the collection unit from the tapered-helical coil of the filter-to-be-evaluated 904. The collection unit and tapered-helical coil were dried at 90 degrees Fahrenheit until a constant weight was measured and the weights were recorded. The percent of microplastics collected in the collection unit was calculated by the following equation $$\% \text{ Captured Particles in Collection Unit} = \frac{\Delta m_{CC}}{m_{flock}} * 100$$

where $\Delta m_{cc}$ corresponds to the change in mass of the collection unit, as measured by the final mass after filtration minus the initial mass of the collection unit before filtration, $m_{cc,final} - m_{cc,initial}$, and $\Delta m_{SL}$ corresponds to the change in mass of the tapered-helical coil based on the microplastics collected, as measured by the final mass of the tapered-helical coil after filtration minus the initial mass of the tapered-helical coil before filtration, $m_{SL,final} - m_{SL,initial}$.

The flock fiber filtration efficiency according to Example 2 is shown in Table 1 below:

| Device-to-be-tested | Trial 1 (%) | Trial 2 (%) | Trial 3 (%) | Average (%) | Std. Dev. (%) |
|---|---|---|---|---|---|
| Experimental Filter 2 | 99.82 | 99.81 | 99.84 | 99.8 | 0.02 |
| Dead End Filter | 99.90 | 99.19 | 99.80 | 99.7 | 0.4 |
| Cross-flow Filter | 99.90 | 99.90 | 98.34 | 99.4 | 0.9 |
| Vortical Cross-flow Filter | 99.90 | 99.25 | 99.90 | 99.7 | 0.4 |

The percent of fibers collected by Experimental Filter 2 in the collection unit is shown in Table 2 below:

| Trial | 1 | 2 | 3 | Average | Std. Dev. |
|---|---|---|---|---|---|
| % Flock Fiber in Collection Unit | 83.0% | 76.5% | 92.4% | 84.0% | 8.0% |

As shown in Table 1, Experimental Filter 2 collects upwards of 99% of flock fiber, which simulates microplastics, in wastewater systems. Experimental Filter 2 also exhibited the lowest standard deviation of the four filters being tested. Although the other filters being tested also exhibited upwards of 99% efficiency of flock fiber, as shown by Example 2, the Experimental Filter design also has the capability to achieve high efficiency with larger filter mesh pore sizes. Filtration efficiency of 99% may be expected from the mesh pore size of the Dead End, Cross-Flow, and Vortical Cross-Flow filters being tested, however, because smaller pore sizes restrict flow through the filter, merely having a smaller pore size does not permit such filters to be used in applications, such as washing machines or other high flow rate or high flow speed applications. Therefore, mesh pore size is not indicative of the filter's ability to provide acceptable filtrating operation. For example, as discussed in Example 3, the Dead End filter could not achieve any functional operation because the flow was immediately reduced to zero cm/s and gal/min, causing both flow failures and pressure failures. Similarly, despite having a similarly sized cone, the Cross-Flow and Vortical Cross-Flow filters also failed after significantly fewer trials, as explained in Example 3, despite having the same cone size as Experimental Filter 2.

Experimental Filter 2 shows exemplary performance as compared with other filters, but has the added benefit that at least 75% of the filtered microplastics are transported to the collection unit, and on average, more than 80% of the filtered microplastics are transported to the collection unit, by the design of the filter. Facilitating transport of the filtered microplastics/particles to the collection unit has several benefits not previously known in the art. First, the collection of filtered particles into the collection unit makes the device easier to clean, especially with the complexity required to clean the tapered-helical coil. Cleaning the collection unit is further aided by designs, such as shown in FIGS. 22A-22D, which allow easy access to the collection unit, thereby simplifying the process of maintenance and cleaning. Second, facilitating transport of the filtered microplastics/particles to the collection unit prevents buildup of the filtered particles in the tapered-helical coil, thereby prolonging the time between cleanings because the filter media of the tapered-helical coil remains relatively clean and therefore is able to continue filtering liquids.

Further advantages of Experimental Filter 2 are discussed with respect to Example 3 below.

Embodiments of the filter and filter system described herein provide improved filtration of particles from fluids. For example, the filters and filter systems described herein are effective at filtering greater than 90% of filtered microparticles (e.g., microplastics) by mass from washing machine wastewater when measured using the method of Example 2. In particular, the filters and filter systems described herein are effective at filtering greater than 90% of filtered microparticles (e.g., microplastics) by mass when post-filtered to 10 microns when measured using the method of Example 2. Some embodiments of the filters and filter systems described herein are effective at filtering greater than 91%, 92%, 93%, 94%, 95%, 96%, 97%, 98%, or 99% of filtered microparticles (e.g., microplastics) by mass when post-filtered to 10 microns when measured using the method of Example 2. As such, the filters and filter systems described herein are also effective at filtering greater than 60%, greater than 65%, greater than 70%, greater than 75%, greater than 80%, greater than 85%, greater than 87%, greater than 88%, and greater than 89% of filtered microparticles (e.g., microplastics) by mass from washing machine wastewater, including microplastics when post-filtered to 10 microns when measured using the method of Example 2.

Similarly, embodiments of the of the filter and filter system described herein provide improved filtration of microparticles from fluids by facilitating travel of the filtered particles from the tapered-helical coil to the collection unit. For example, some embodiments of the filters and filter systems described herein are effective at facilitating transport of greater than 50%, 60%, 65%, 70%, 75%, 80%, 82%, 83%, 84%, 85%, 86%, 87%, 88%, 89%, 90%, 91%, 92%, 93%, 94%, or 95% of filtered microparticles (e.g., microplastics) by mass from the tapered-helical coil to a collection unit when post-filtered to 10 microns when measured using the method of Example 2.

Example 3: Simulated Load Cycle Tolerance Method

A third experimental test method was used to evaluate the number of simulated filtration cycles, such as washing machines load cycles, a given microplastic filter can sustain before creating significant back pressure or pressure buildup behind the filter such that the pressure affects filter, washing machine, or pump performance. Microplastics in the washing machine and filtration cycle are measured using flock fibers. Specifications of the third experimental method may include the following.

The third experimental method describes a procedure to determine, by count, a filter's tolerance for repeated filtration cycles, such as filtering wastewater from washing machine load cycles, when using commercially available flock fibers.

Figure 20:
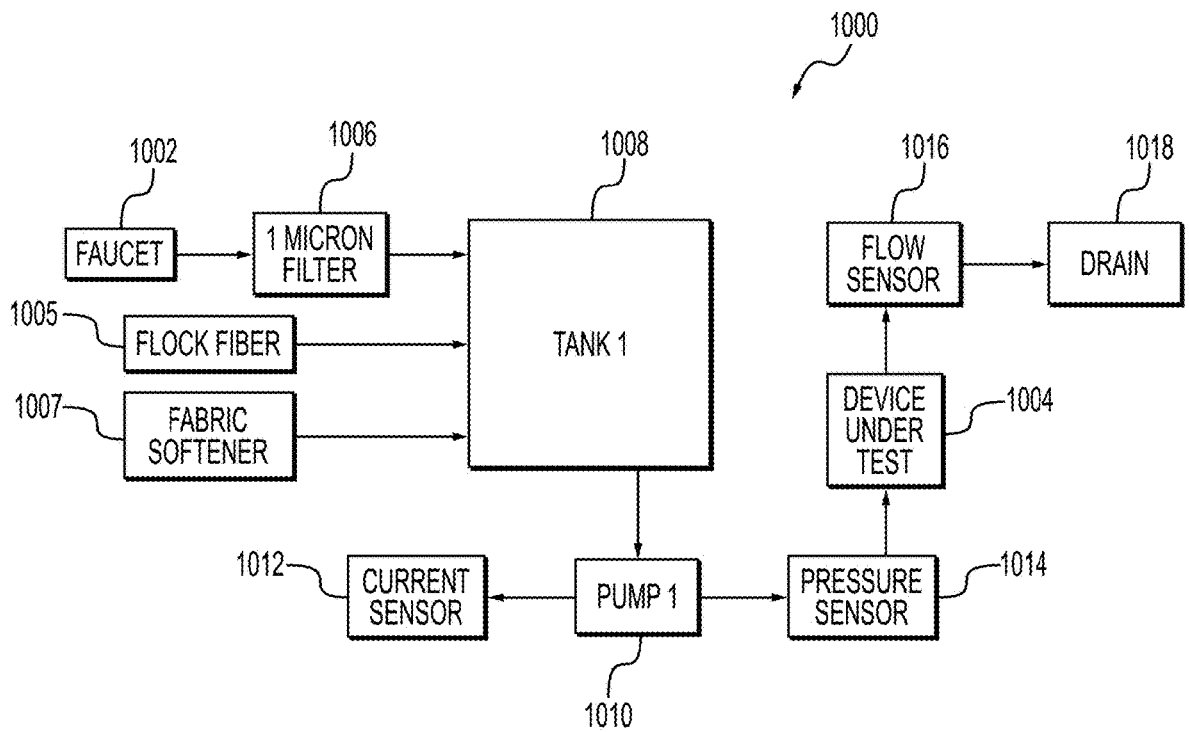
FIG. 20 shows an exemplary setup for a test method to measure load cycle tolerance for a filter.

In the third experimental test method, shown in FIG. 20, a pump is used to force filtered water containing microplastic flock fiber from a storage tank through the filtration device being tested. A pressure sensor measures the pressure buildup behind the filtration device to be tested while a flow sensor measures the flow at the outlet of the filter being tested (e.g., at outlet 218). Results of the third experimental test method may correspond to a representative measure of the number of washing machine loads a particular filter can sustain before the filtered material begins to affect filter, washing machine, and pump performance, creating pressure buildup behind the filter being tested or decreased flow throughput.

A third testing apparatus 1000 may be prepared as shown in FIG. 20. The testing apparatus may be constructed from individual components and assembled in the direction shown. Components may include:

Faucet 1002, 1 μm filter 1006, filter-to-be-tested (testing device) 1004, flock fiber 1005, pump 1010, and drain 1018 are as described in Example 2 for faucet 902, 1 μm filter 906, filter-to-be-tested (testing device) 904, flock fiber 905, pump 910, and drain 918, respectively. Piping between connections is 1.0 inch inner-diameter vinyl tubing, as discussed in Example 2.

Fabric softener 1007 is commercially available Ultra GAIN® Fabric Softener with Aroma Boost and Blissful Breeze scent.

Current sensor 1012 is a Poniie PN portably micro electricity current sensor to monitor electrical power consumption.

Pressure sensor 1014 is a digital pressure gauge sensor manufactured by SSI Technologies, part number MG1-G-A-9V-R.

Flow sensor 1016 is a turbine flow meter manufactured by Bonvoisin, part number Roy-7.

To simulate a wash cycle, first, 0.405±0.02 g of flock fiber 1005 was weighed out and the weight was recorded. Next, 35±0.50 g of fabric softener 1007 was weighed out and the weight recorded. Fabric softener 1007 was added to better simulate the effect of actual laundry on the behavior of the filters being tested. Then, tank 1008 was filled with 3.5 gallons of water from faucet 1002, filtered through 1 μm filter 1006. The measured weights of flock fiber 1005 and fabric softener 1007 were added to tank 1008. An additional 3.5 gallons of water from faucet 1002, filtered through 1 μm filter 1006, was added to tank 1008, bring the total water amount in tank 1008 to 7.0 gallons, which is a typical amount of water in a Whirlpool® washing machine load cycle. The solution was mixed well via stirring. The water-flock-softener solution was pumped through pump 1010, through filter-to-be-tested 1004 via pressure sensor 1014. The filtered liquid exited filter-to-be-tested 1004 through flow sensor 1016 and into drain 1018. The flow rate (gal/min or gpm) at flow sensor 1016, pressure buildup behind the filter being tested at pressure sensor 1014 (psi), and current at pump 1010 (amps, measured by current sensor 1012) were measured at 15 second intervals and recorded.

Once all of the water-flock-softener solution was removed by pump 1010, the simulated wash load cycle was complete. The simulated wash load cycle was repeated until the pressure buildup behind the filter being tested at pressure sensor 1014 measures 3.4 psi or greater. 3.4 psi was chosen as the pressure buildup at which a Whirlpool® washing machine signals a flow fault. The result was recorded and considered to be the load cycle tolerance. After the pressure value of 3.4 psi was determined, additional load cycles were performed until the flow rate through flow sensor 1016 was 0.0 cm/s, at which point a zero flow error or flow failure was determined.

Table 3 below shows the number of loads for each of the Dead End Filter, Cross-Flow Filter, Vortical Cross-Flow Filter, and Experimental Filter to both a pressure buildup of 3.4 psi behind the filter being tested and until the flow rate through the filter was 0.0 gal/min.

TABLE 3

| Filter being tested | Loads completed to 3.4 psi pressure buildup/pressure failure | Loads completed to 0.0 gal/min flow failure |
| --- | --- | --- |
| Experimental Filter 2 | 8 | 13 |
| Dead End Filter | 0 | 0 |
| Cross-Flow Filter | 2 | 3 |
| Vortical Cross-Flow Filter | 2 | 3 |

It is clear from the results of Example 2 that Experimental Filter 2 has significantly improved performance than any of the other Dead End, Cross-Flow, and Vortical Cross-Flow filters being tested. Experimental Filter 2 showed a 300% and 333% increase in number of loads to pressure failure and flow failure, respectively, over both the Cross-Flow Filter and Vortical Cross-Flow Filter. As compared to a Dead End Filter, which failed before even one load cycle was completed, Experimental Filter 2 shows dramatic improvement both in terms of number of loads to pressure failure and flow failure. Even as compared to the Cross-Flow and Vortical Cross-Flow Filters, Experimental Filter 2 completed 8 cycles to pressure failure and 13 cycles to flow failure, whereas the Cross-Flow Filter and Vortical Cross-Flow Filter completed only 2 cycles each to pressure failure and 3 cycles to flow failure.

FIGS. 22A-22G show the results of the load cycle tolerance testing, flowrate, flow speed, and pressure of the testing method described in this Example 3. In FIGS. 22A-22G, "Dead End" results refer to the Dead End Filter under test, "Cross Flow" results refer to the Cross-Flow Filter under test, "Vortical Cross Flow" results refer to the "Vortical Cross Flow Filter" under test, and "CLEANR" results refer to Experimental Filter 2 under test.

Figure 22A:
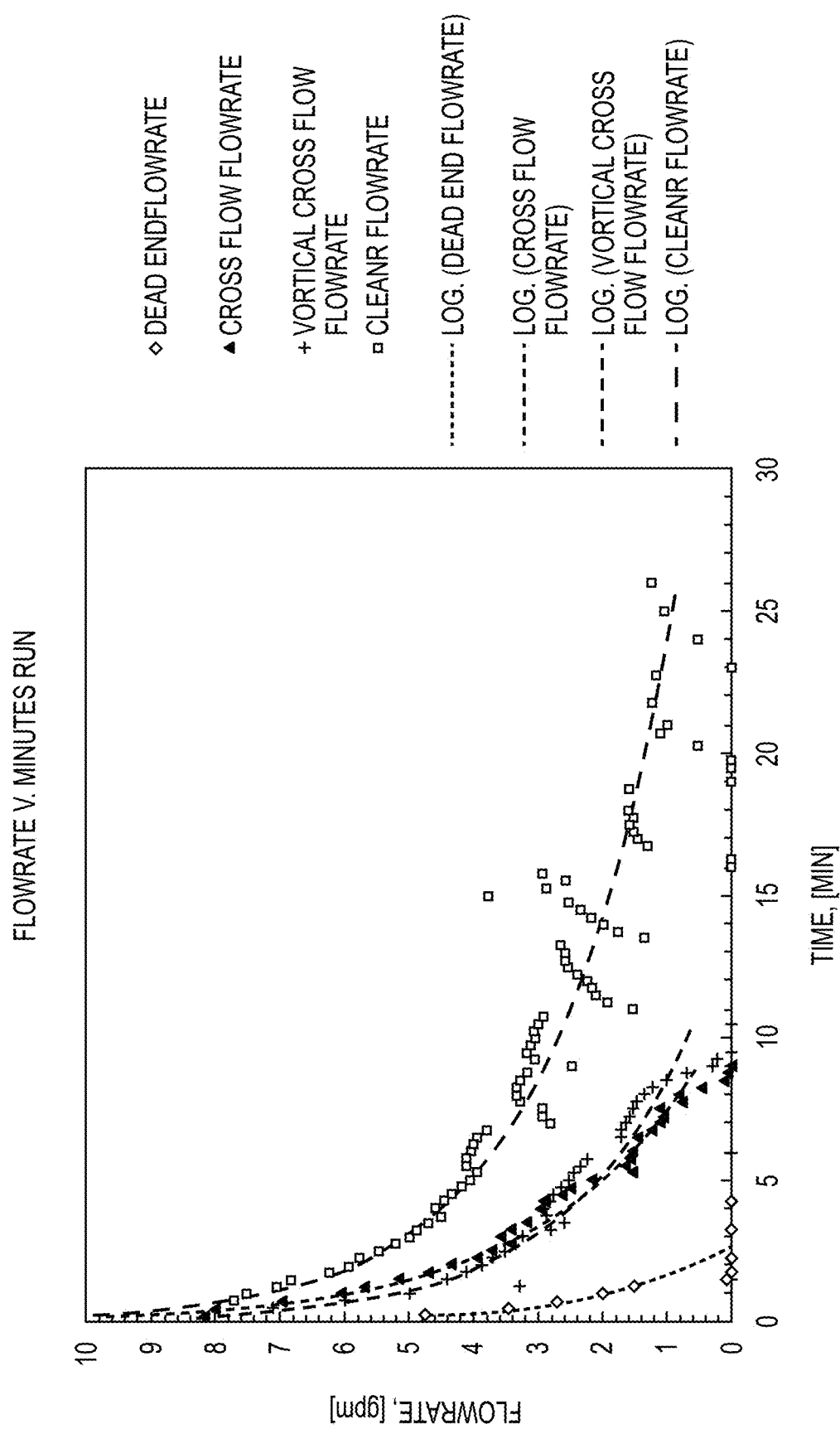
FIGS. 22A-22G show results of the load cycle tolerance testing, flowrate, flow speed, and pressure of the testing method described in Example 3.
Figure 22B:
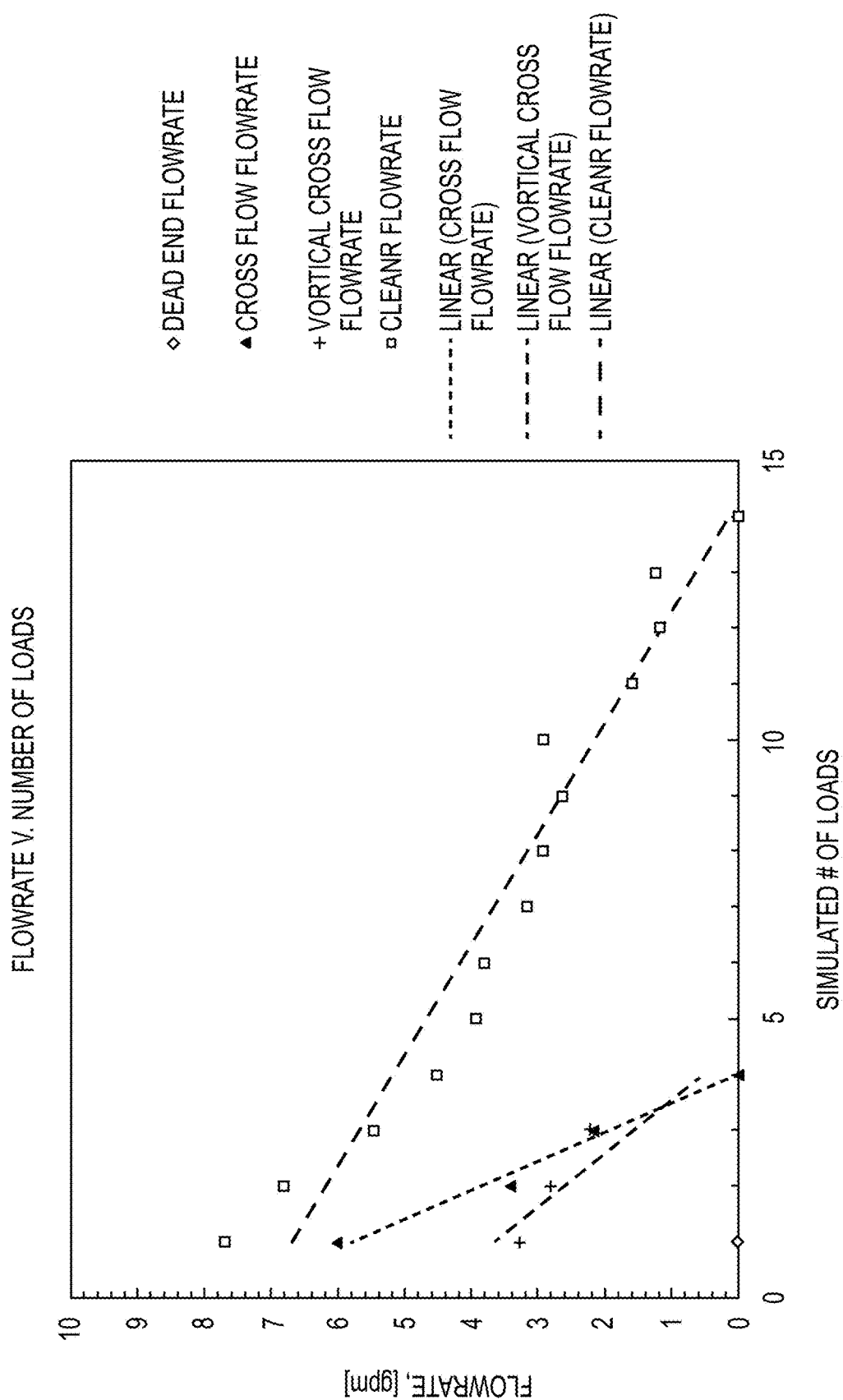
Figure 22C:
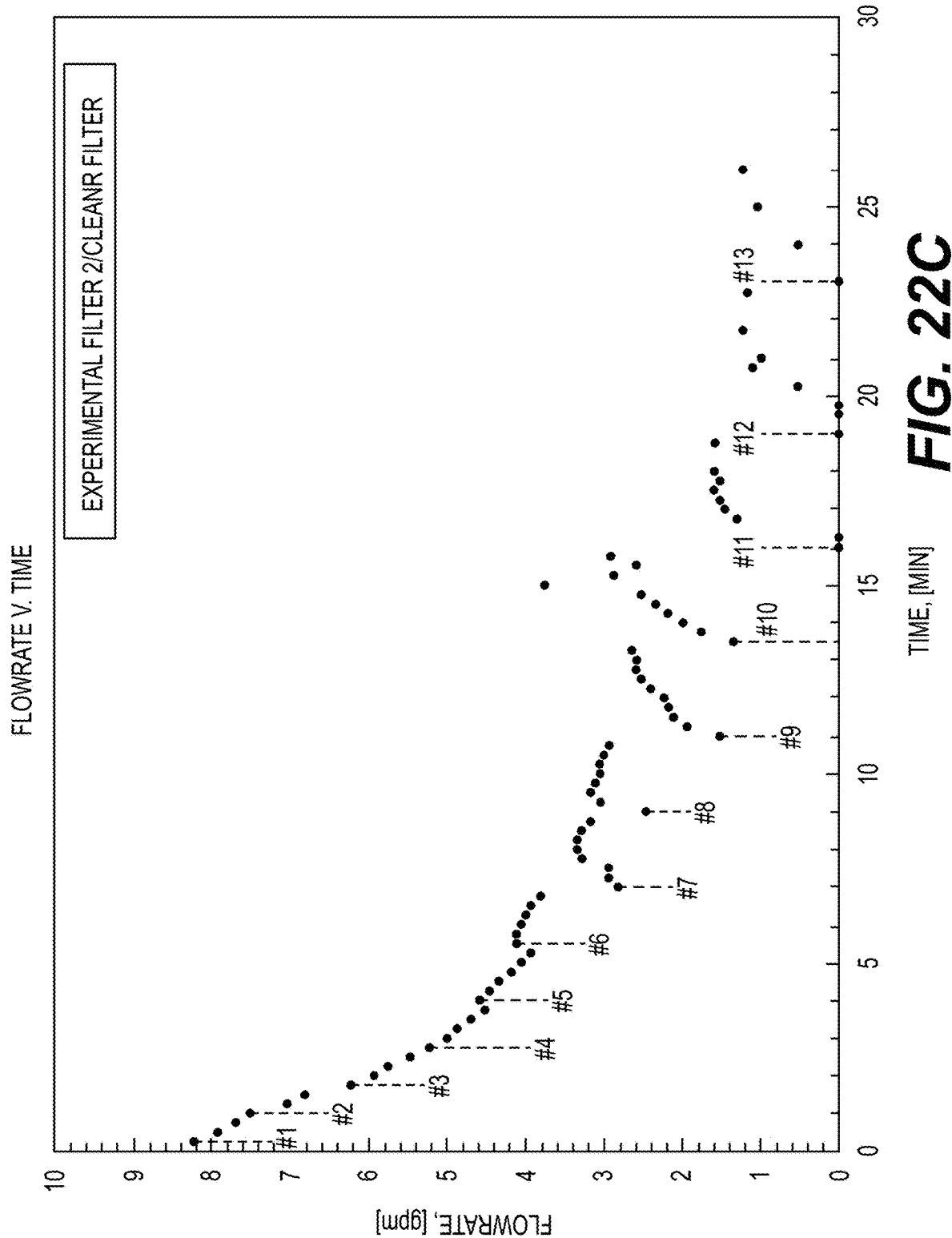

FIG. 22A shows the measured flowrate at flow sensor 1016 over time across each of the simulated wash load cycles. FIG. 22B shows the flow rate data versus the number of simulated load cycles until flow failure (0.0 gal/min flow rate) was measured. The values plotted in FIG. 22B are determined at the end of each wash load cycle. FIG. 22C shows the flow rate over time for each wash load cycle for Experimental Filter 2 for each of the loads.

The flow rate data in FIG. 22A shows that Experimental Filter 2 provides a longer more continuous flow rate, indicating a lesser amount of clogging and prolonged lifespan compared to the dead end, cross-flow, and vortical cross-flow filters tested. FIGS. 22A and 22C, which shows a greater granularity of flow rates show that Experimental Filter 2 has improved flow rate over the other filters tested. While all of the filters show a generally decreasing flow rate over time in early load counts, from loads 7-13, Experimental Filter 2 showed an increasing flow rate over time in each of these loads, suggesting that the design of Experimental Filter 2 improves the overall flow rate even as filtered particles accumulate in the tapered-helical coil and the collection unit. The vortices generated in the design of the tapered-helical coil improve the filtration and flow rate. In particular, vortices generated by the configuration of Experimental Filter 2 may resuspend collected particles on the tapered-helical coil, thereby opening up the mesh for improved flow and improving filter efficiency and lifespan This improved flow rate may also be due to the dual-filter nature of Experimental Filter 2 where filtered liquid can exit the filter through the tapered-helical coil or the collection unit because both contain a filter media.

Figure 22D:
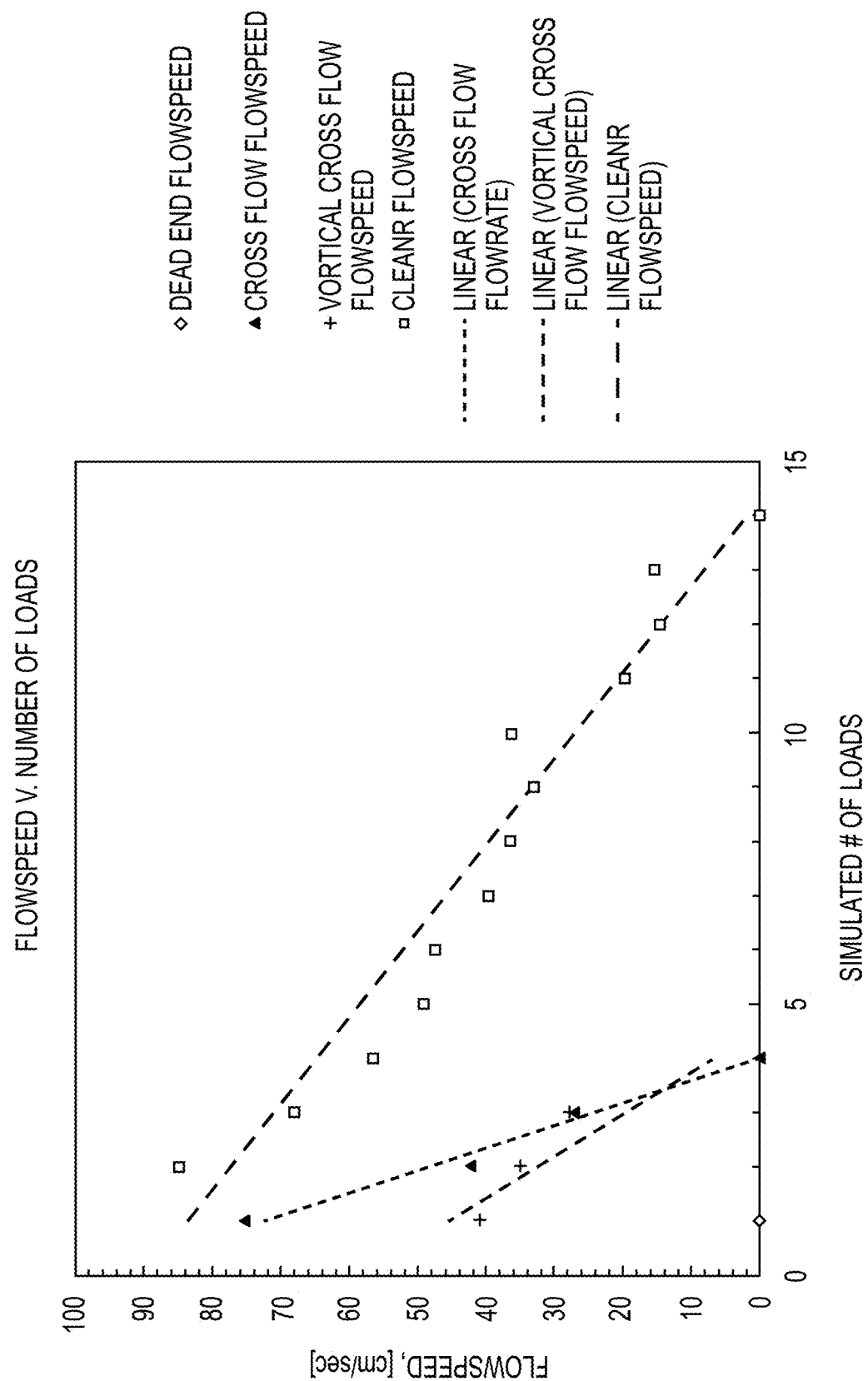

FIG. 22D shows the flow speed measured at flow sensor 1016, which is the flow speed of the filtered liquids through each of the filters being tested. FIG. 22D shows that the flow speed through Experimental Filter 2 remains significantly higher over time as compared to all other filters tested. In particular, as shown in FIG. 22D, the flow speed through Experimental Filter 2 does not fall below 50 cm/s until after the fifth load, whereas each of the other filters tested had the flow speed reduced to below 50 cm/s after one or zero loads. The flow speed data confirms that Experimental Filter 2 shows improved performance at high flow speeds and maintains the high flow speeds required for washing machine applications much longer than the other filters tested. In particular, Experimental Filter 2 maintained a flow speed of 50 cm/s or more five times longer (through 400% more loads) than any of the other filters tested. Experimental Filter 2 was also operational through more than four times as many loads (13 loads vs. 3 loads, or a 333% increase in number of loads) than both the Cross-Flow and Vortical Cross-Flow filters tested before a flow failure was measured. The other filters tested were not able to function effectively at high flow speeds. The other filters tested, therefore, also could not be used repeatedly to filter particles, such as microplastics, in high flow applications.

Figure 22E:
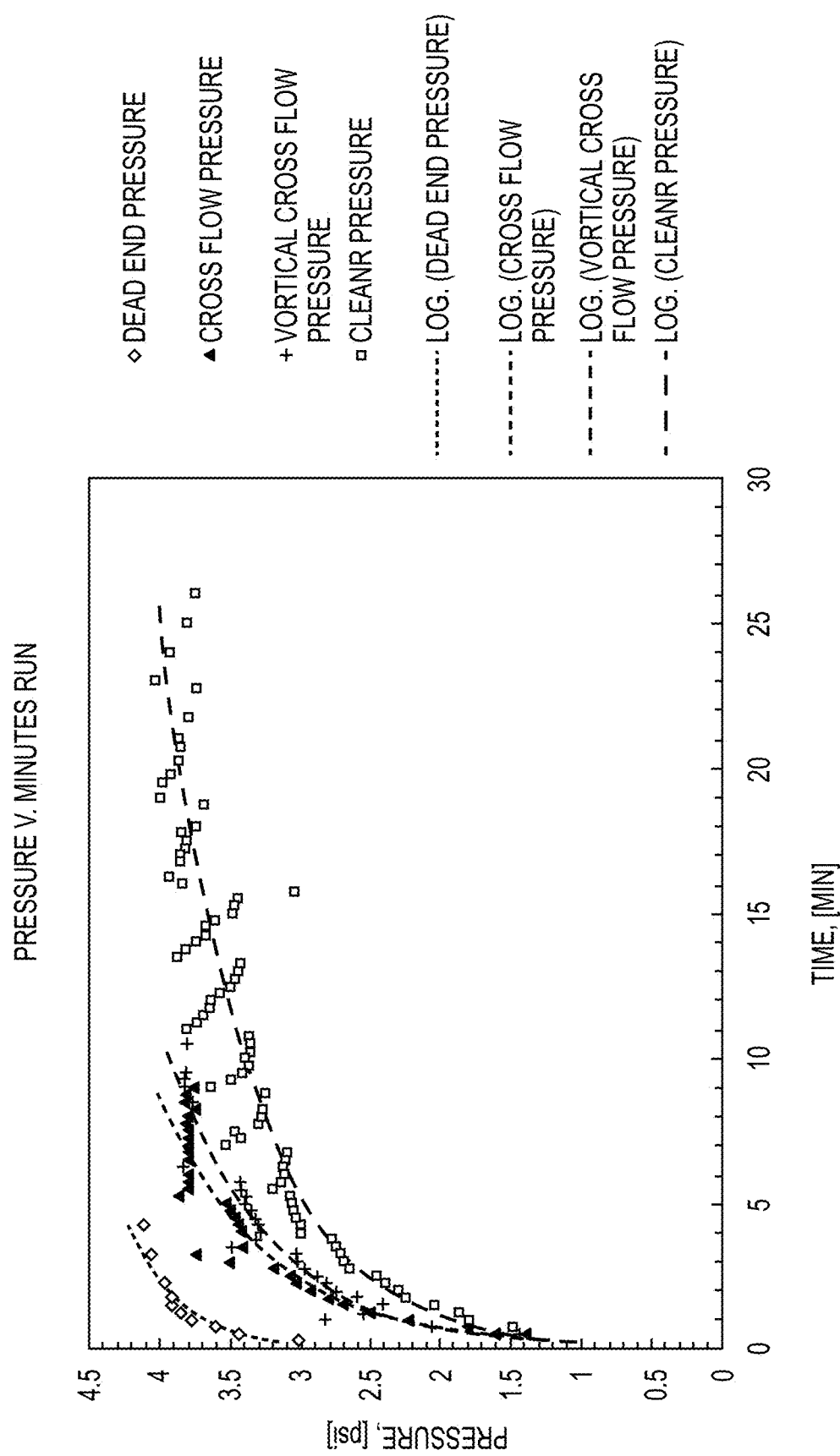
Figure 22F:
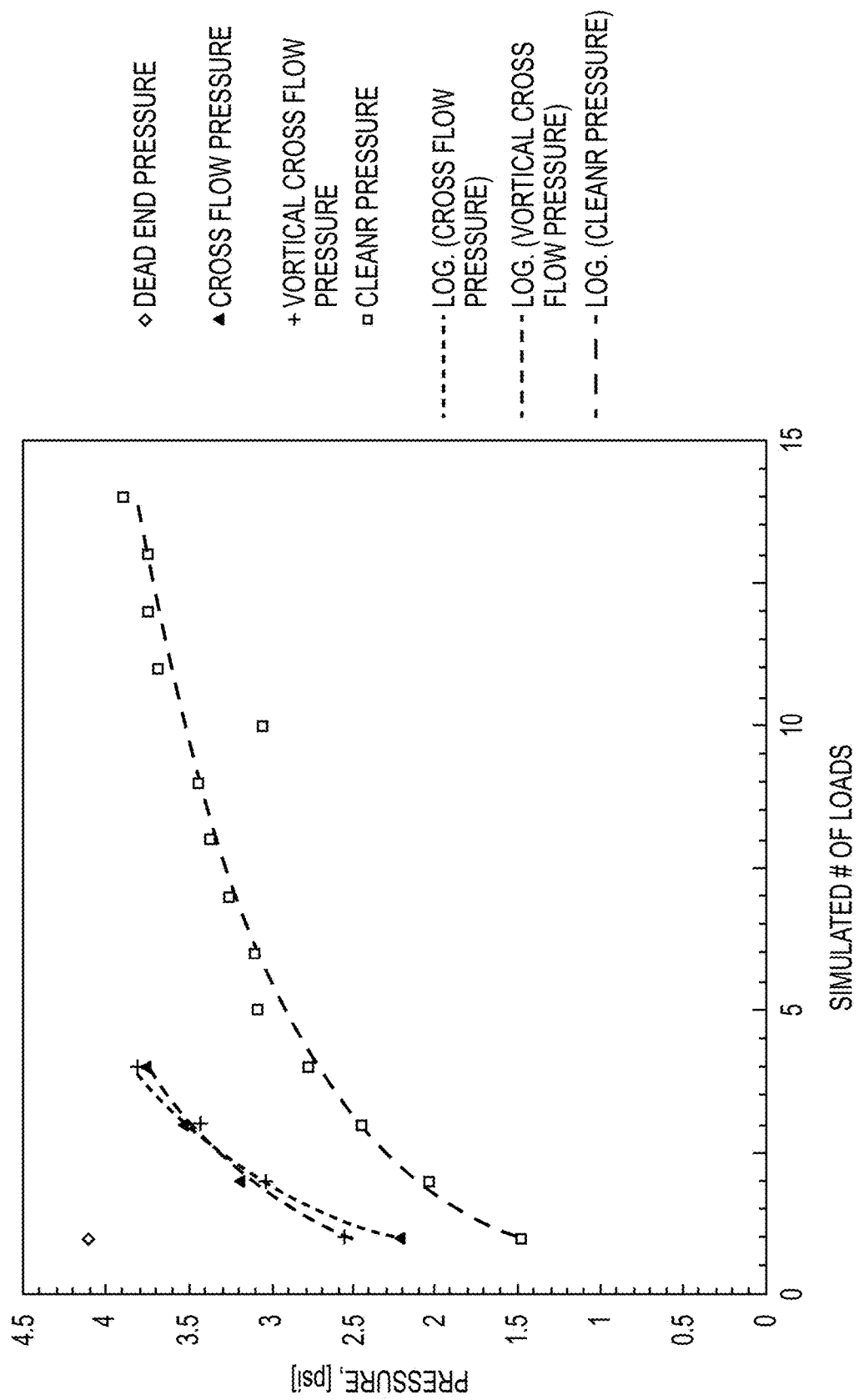
Figure 22G:
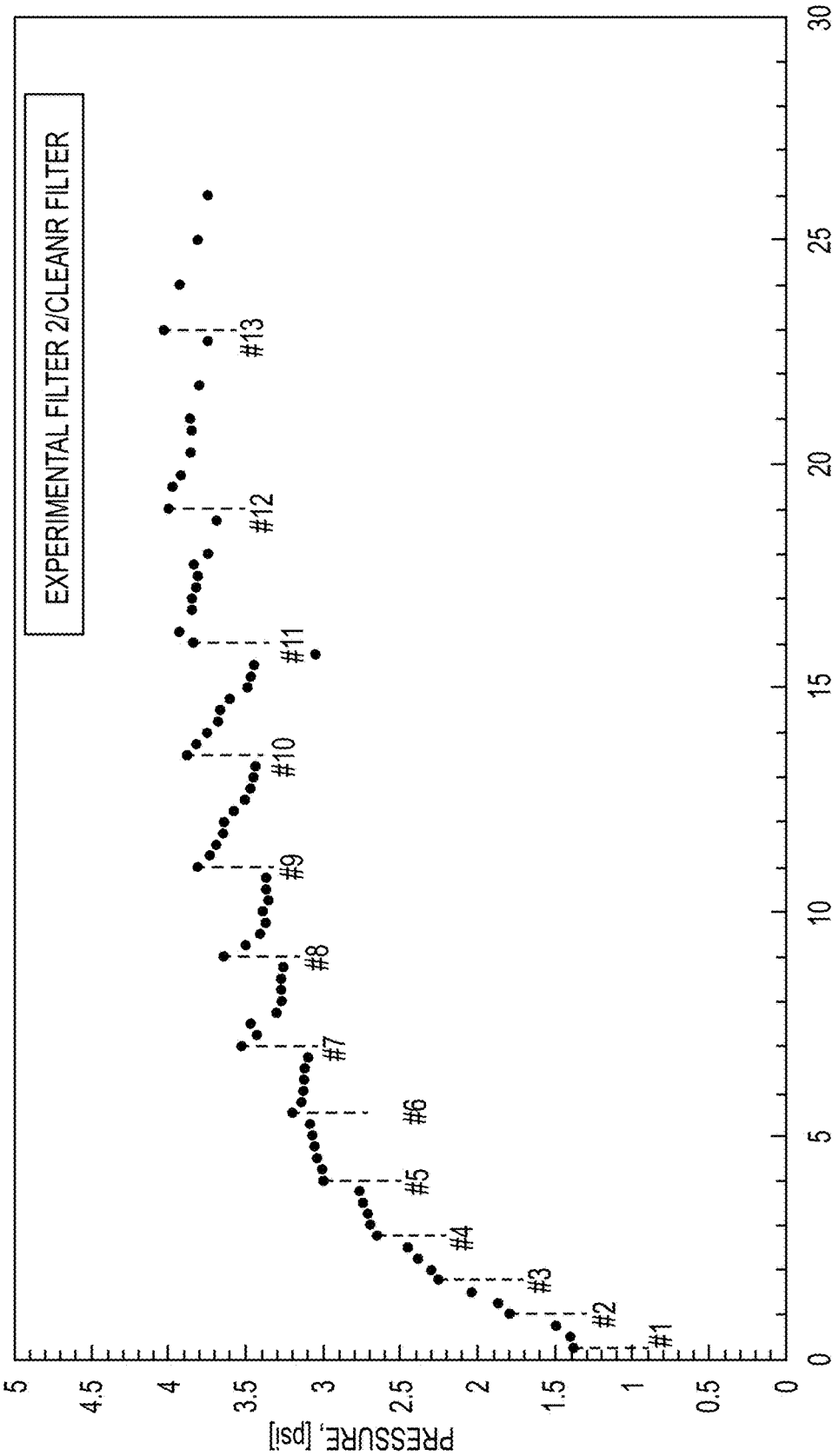

FIG. 22E shows the pressure buildup behind the filter being tested measured at pressure sensor 1014 over time to determine a pressure failure, while FIG. 22F shows the same pressure buildup behind the filter being tested measured at pressure sensor 1014 for each load up until the flow failure was determined. The values shown in FIG. 22F are the pressure value at the end of the load cycle. FIG. 22G shows the pressure buildup behind Experimental Filter 2 measured at pressure sensor 1014 over time for each of the loads.

As shown in FIGS. 22E-22G, Experimental Filter 2 shows significantly less pressure buildup over time and repeated use as compared to the other filters tested. When measuring against number of loads, Experimental Filter 2 showed a much shallower slope for the pressure buildup. Similar to flow rate, while all of the filters show increasing pressure buildup for the first several loads, after load five, Experimental Filter 2 shows decreasing pressure buildup over time for each of loads six through thirteen. This decreasing pressure appears to correspond to the increase in flow rate seen in FIGS. 22A and 22C, confirming that Experimental Filter 2 provides improved performance with better flow with fewer disruptions. Similarly, the life of the filter and machine may be extended by this behavior without triggering a pressure fault because of the decreasing pressure over time during each load after several loads. The design of Experimental Filter 2 facilitates the formation of vortices to maintain filtered particles in suspension and facilitated the progression of the filtered particles to the second opening, where they are collected by the collection unit. This design helps the filter media of the tapered-helical coil remain relatively free of particle accumulation, thereby prolonging the life of the filter before flow rate and flow speed are reduced. The prolonged use life makes the design of Experimental Filter 2, and other embodiments described herein, an improvement over other filters, such as dead-end, cross-flow, conical cross-flow, and vortical cross-flow filters, because Example 4: Polyester Cotton and Flocked Efficiency Tests A fourth experimental test method was used to evaluate filter efficiency. This Example measured efficiency of an embodiment of the inventive filter with design of Experimental Filter 2, except using a 15 µm (stainless steel GKD mesh), by determining the microplastic distribution changes between pre-filtered and post-filtered washing machine wastewater.

The materials tested according to this Example were Polyester-Cotton and Flock Fiber (consistent with Example 2). When selecting samples of each of these materials, the weight of each sample tested was consistent, wherein each test was performed on two water samples to determine the change in microplastic distribution. The change in microplastic distribution was used to calculate the filtration efficiency of the filtration device under test. The following steps will be taken for each individual test.

The following cleaning procedure was performed before testing:
    test setup was cleaned completely with 1-micron pre-filtered water running for 20 minutes through the entire system and lint-free wipes;
    in between tests, the system was flushed with 1-micron pre-filtered water running for 5 minutes through the entire system and lint-free wipes;
    after running water through the system, any remaining water was manually blown out of tank 1 and into tank 2;
    the inventive filter under test was poured into tank 2;
    any remaining water was manually blow out of tank 2 and into the sink.

Washing Machine Tests:
The following washing procedure was next performed using a Whirlpool front load washing machine Model #WFW5605 MW:
    tested garments had gone through 4 pre-wash cycles, and 2 trial tests for a total of 6 washes before undergoing the inventive filter was placed into the system to filter microplastics.
    before testing, a blank load (without garments) was run through the washing machine, meaning a full wash cycle with nothing in the machine.
    the water that entered the washing machine was maintained at approximately 30±2° C. . . .
    the garments were weighed to keep the weight to approximately 1.4±0.1 kg for each test.

After inserting the desired garment material of test into washing machine drum the following load settings were selected on the Whirlpool washing machine:
Wash cycle: "Normal"
What to wash? "Delicates"
Cold temperature (⅕)
Spin (β/5)~1000 RPM
Soil (⅓) "Light"

The washing machine effluent was discharged into the first holding tank with the lid on the tank (both the first and second holding tanks included lids).

Flock Test:
For testing of flock materials, the following procedure was performed:
    Tank 1 was filled with 3.5 gallons of pre-filtered water (1 µm).
    Approximately 0.5±0.002 g of flock fiber was added to tank 1. The flock dish was washed three times with pre-filtered water to remove any residual flock material.
    Tank 1 was filled until a total of 7 gallons of water has entered the tank, use the incoming moving water to integrate the flock into the water (without a stir stick).

The following sampling procedure, which included taking a first sample followed by a "Through Filter" procedure to gather a second sample, was carried out immediately after the foregoing washing steps.

Sampling:

The stir stick was washed with filtered water.

The outside of the sample bottle with lint-free wipes.

The water in tank was stirred with a stir stick, ensuring the labeled end does not enter water.

While the water is moving, the sample bottle was completely submerged in the water sample.

Once the bottle was completely full, the sample bottle was removed.

Through Filter:

In this procedure, the water in tank 1 was pumped through the inventive filter under test and into tank 2.

The remaining water was pushed from tank 1 into tank 2.

Fiber Characterization and Quantification in Wastewater

The detection of shedded fibers in the effluents from the described washing machine was performed using a Dynamic Image Analysis technique and is referred to as "Hohenstein Dynamic Image Analysis data". The technique used to generate this data herein is described in the article by J. Haap, et al., *Microplastic Fibers Released by Textile Laundry: A New Analytical Approach for the Determination of Fibers in Effluents, Water* 2019, 11, 2088; doi: 10.3390/w11102088, which is herein incorporated by reference for its teachings related to this technique.

Table 4 below shows the efficiency of an embodiment of the Vortical Cross-Flow Filter as described herein, showing removal of nearly 91% of polyester cotton particles, which is a reliable proxy of microplastics filtration, as measured by weight.

TABLE 4

| Polyester Cotton Efficiency by Weight (g): | | | |
|---|---|---|---|
| Pre-Test Weight Sums: | | Post-Test Weight Sums: | |
| High Count | Low Count | High Count | Low Count |
| 0.000293198 | 0.000222962 | 2.77927E−05 | 1.65778E−05 |
| Low Side: | Average: | High Side: | |
| 87.53% | 90.94% | 94.35% | |

It is clear from the results of Example 4 that the inventive experimental filter are extremely efficient removing small particles, such as polyester cotton particles, from fluids. Graphical representations of the results presented in Table 4 regarding the efficiency of removing polyester cotton particles are shown in FIGS. 24A-24D.

Figure 24A:
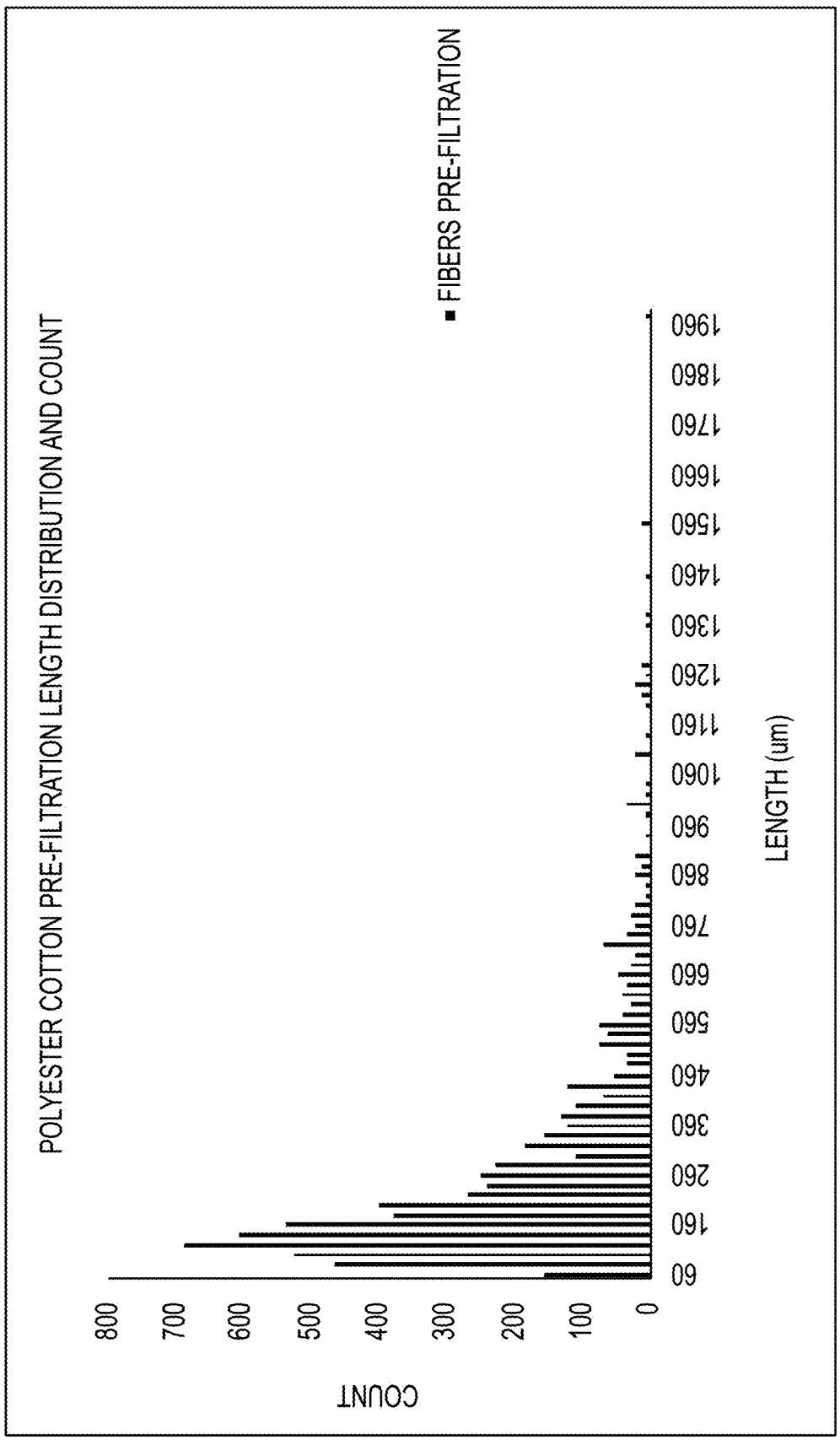
FIGS. 24A-24D show results of efficiency testing on an embodiment of an inventive filter by determining the microplastic distribution changes (by weight and particulate numbers) between pre-filtered and post-filtered washing machine waste water of polyester-cotton materials for the testing method described in Example 4.
Figure 24B:
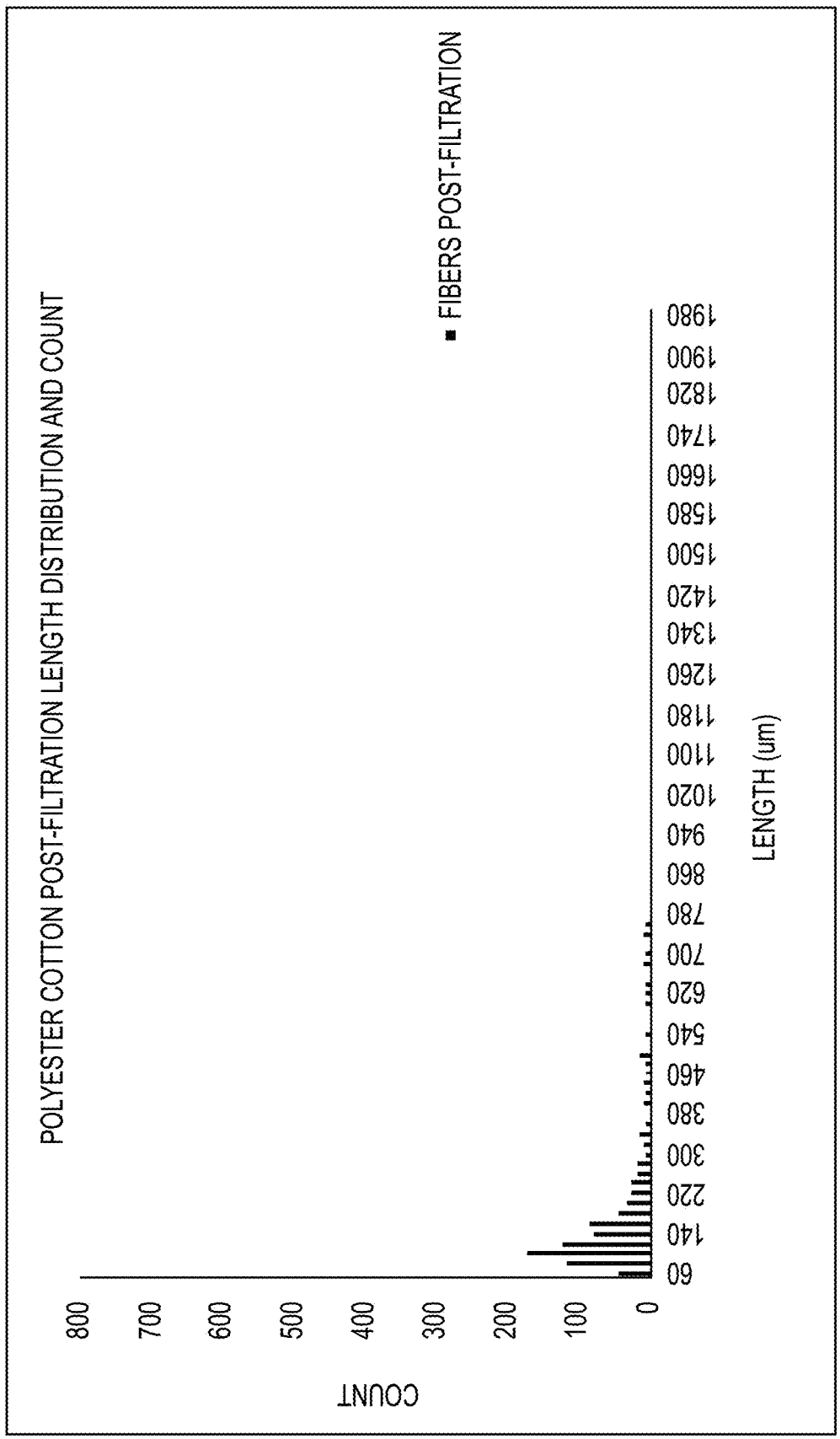
Figure 24C:
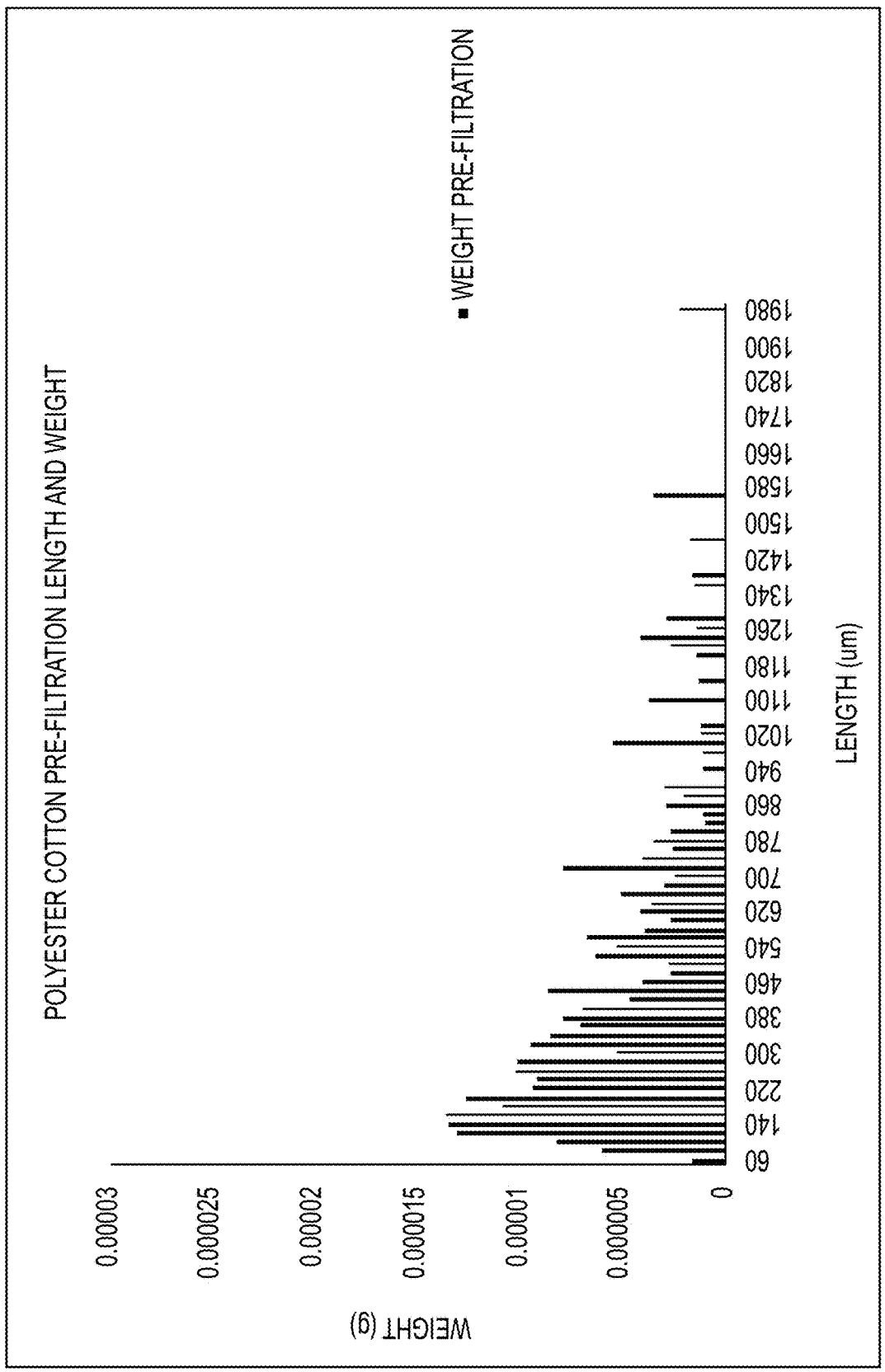
Figure 24D:
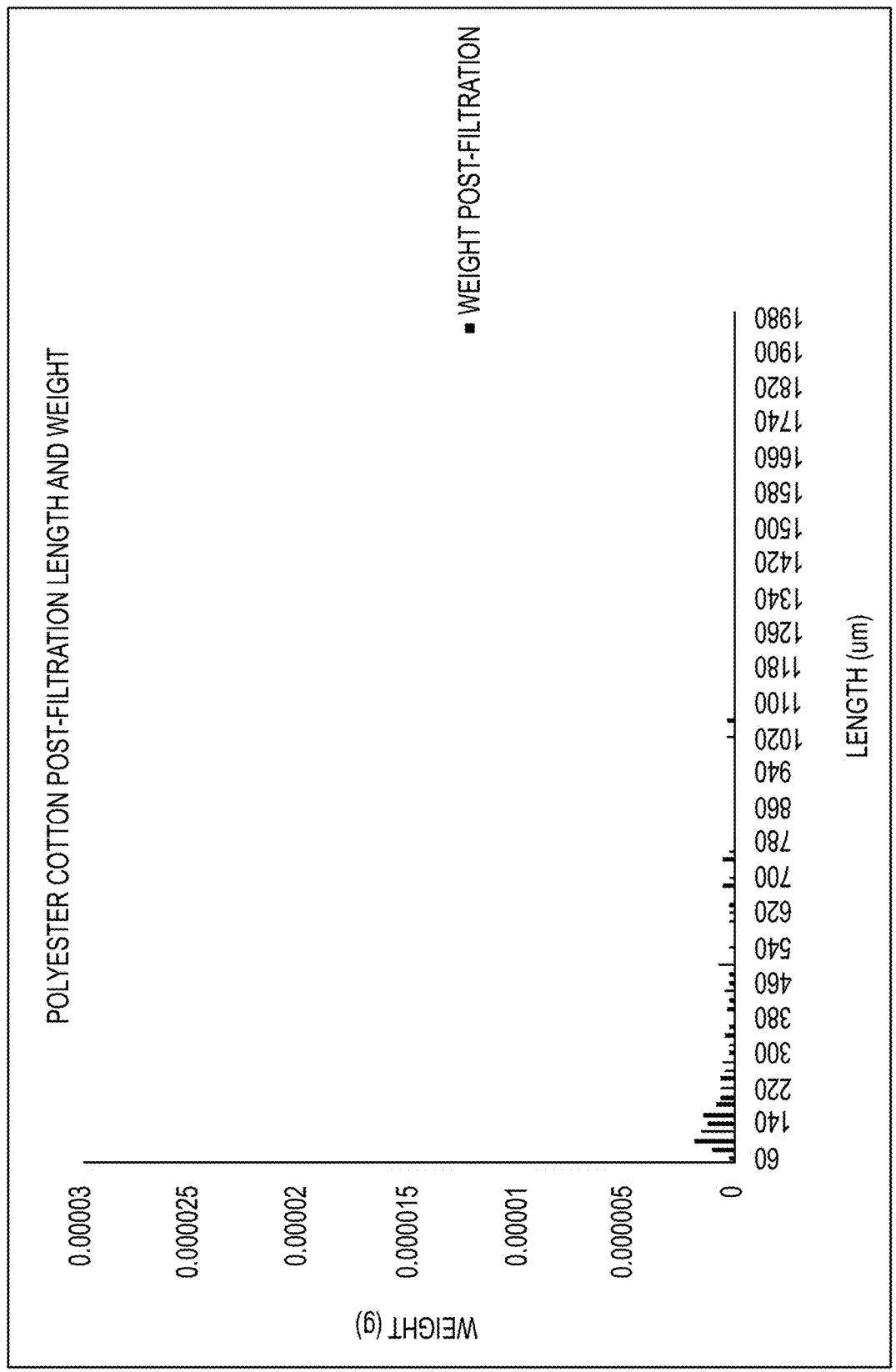

FIGS. 24A and 24B show results of efficiency testing by dynamic image analysis on the inventive filter under test in Example 4 by determining the microplastic distribution changes (by number of polyester cotton particulates) between pre-filtered and post-filtered washing machine wastewater, respectively. FIGS. 24C and 24D show results of efficiency testing on the same inventive filter under test in Example 4 by determining the microplastic distribution changes (by weight of polyester cotton particulates) between pre-filtered and post-filtered washing machine wastewater, respectively.

Table 5 below shows the efficiency of a Vortical Cross-Flow Filter as described herein, showing an average removal of over 99% of flock particles, as measured by weight.

TABLE 5

| Flock Efficiency by Weight (g): | | | |
|---|---|---|---|
| Pre Test Weight Sums: | | Post Test Weight Sums: | |
| High Count | Low Count | High Count | Low Count |
| 0.007910946 | 0.006969905 | 1.79317E−05 | 2.71281E−08 |
| Low Side: | Average: | High Side: | |
| 99.74% | 99.87% | 100.00% | |

It is further clear from the results of Example 4 that the inventive experimental filter is extremely efficient removing flock particles. Graphical representation of the results presented in Table 4 regarding the efficiency of removing polyester cotton particles are shown in FIGS. 25A-25D.

Figure 25A:
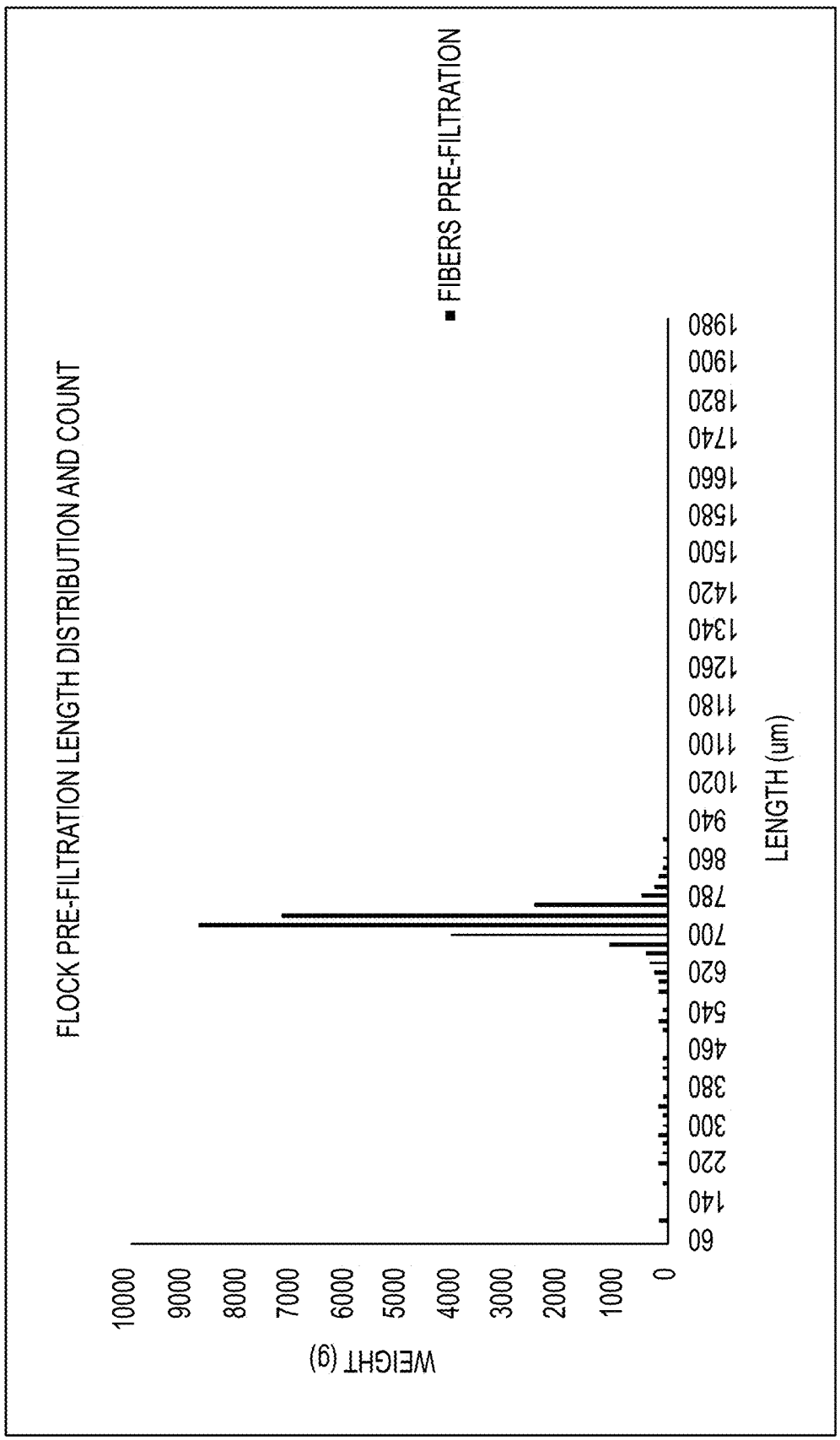
FIGS. 25A-25D show results of efficiency testing an embodiment of an inventive filter by determining the microplastic distribution changes (by weight and particulate numbers) between pre-filtered and post filtered washing machine waste water of flocked materials for the testing method described in Example 4.
Figure 25B:
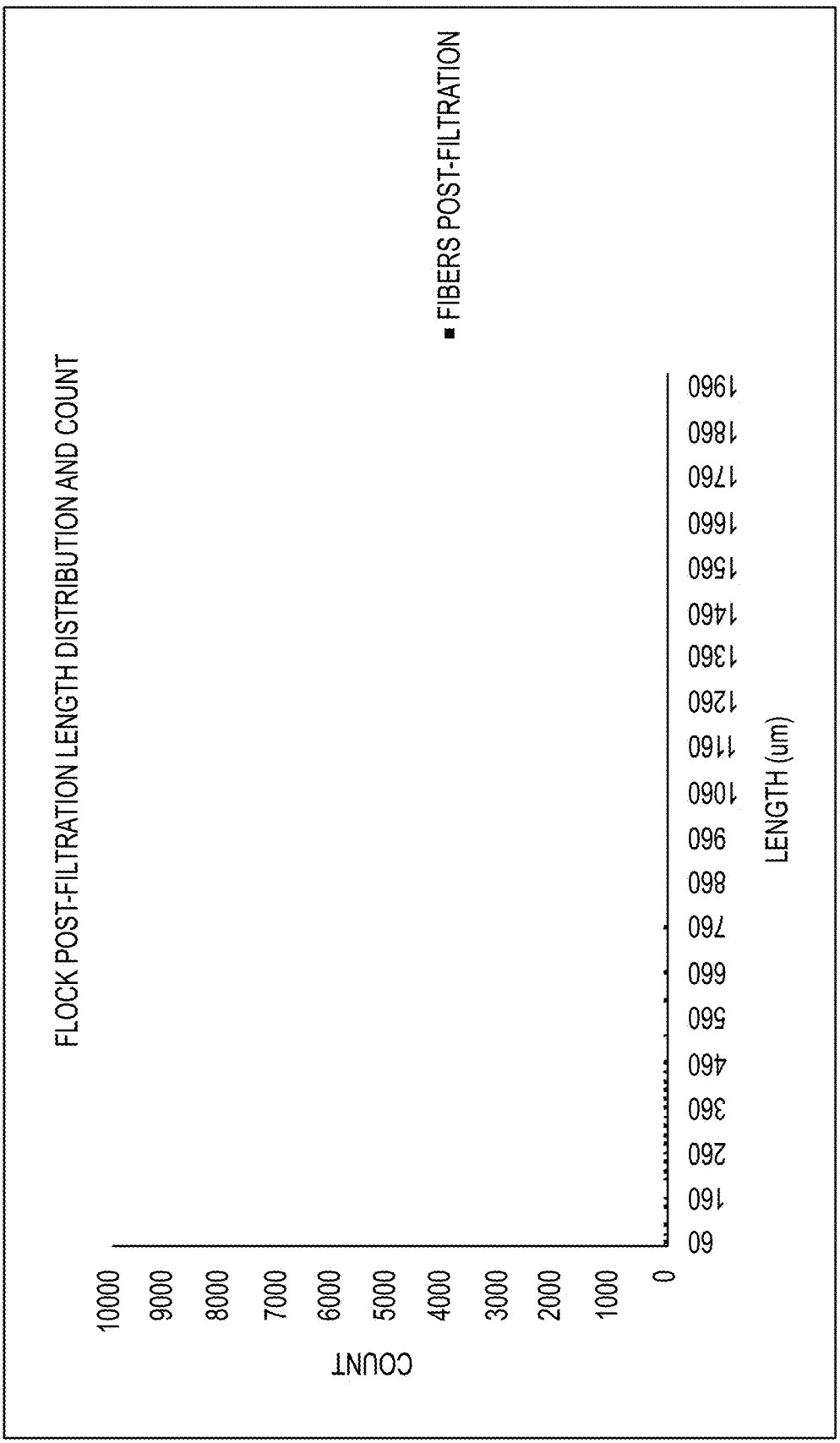
Figure 25C:
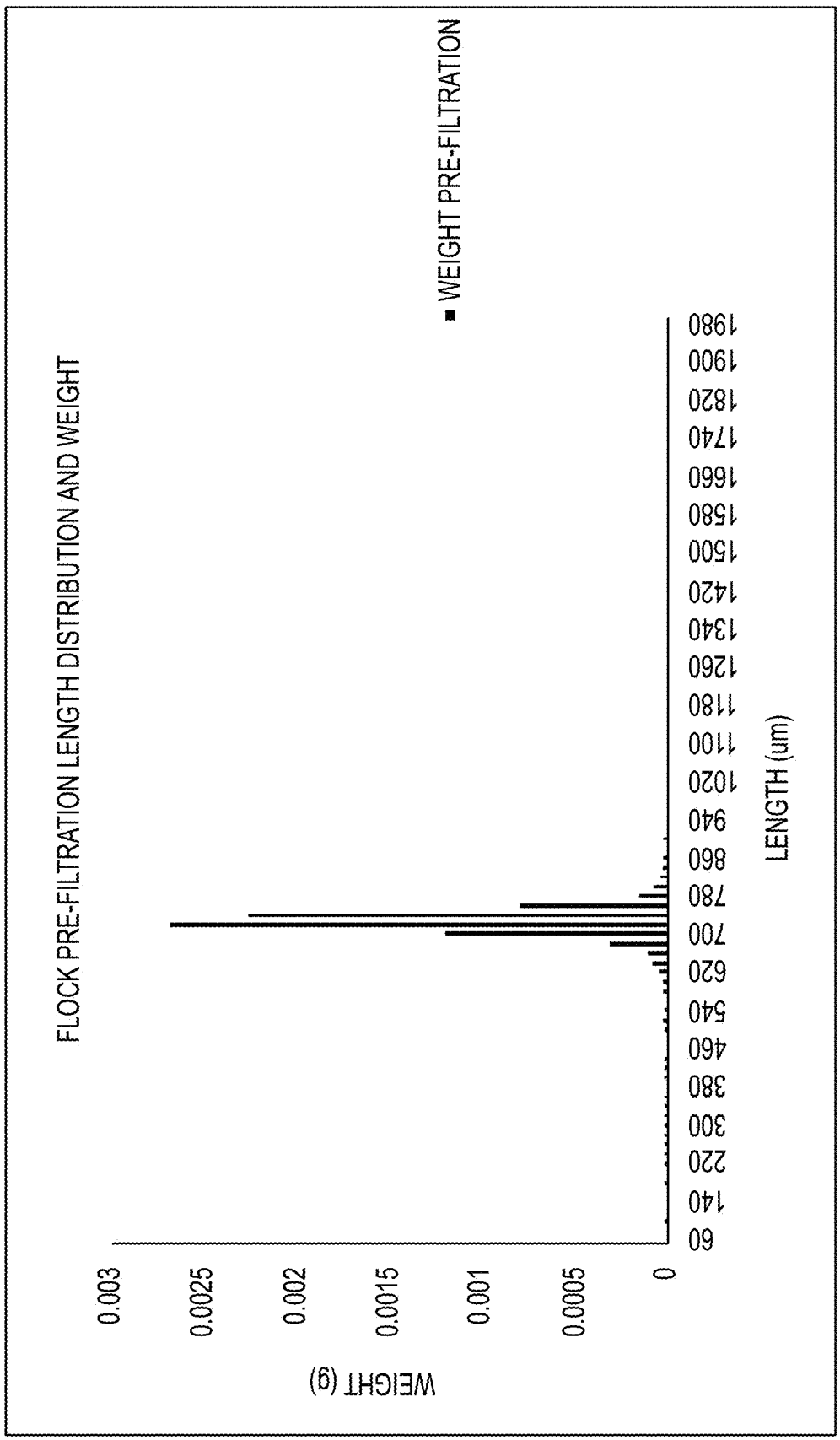
Figure 25D:
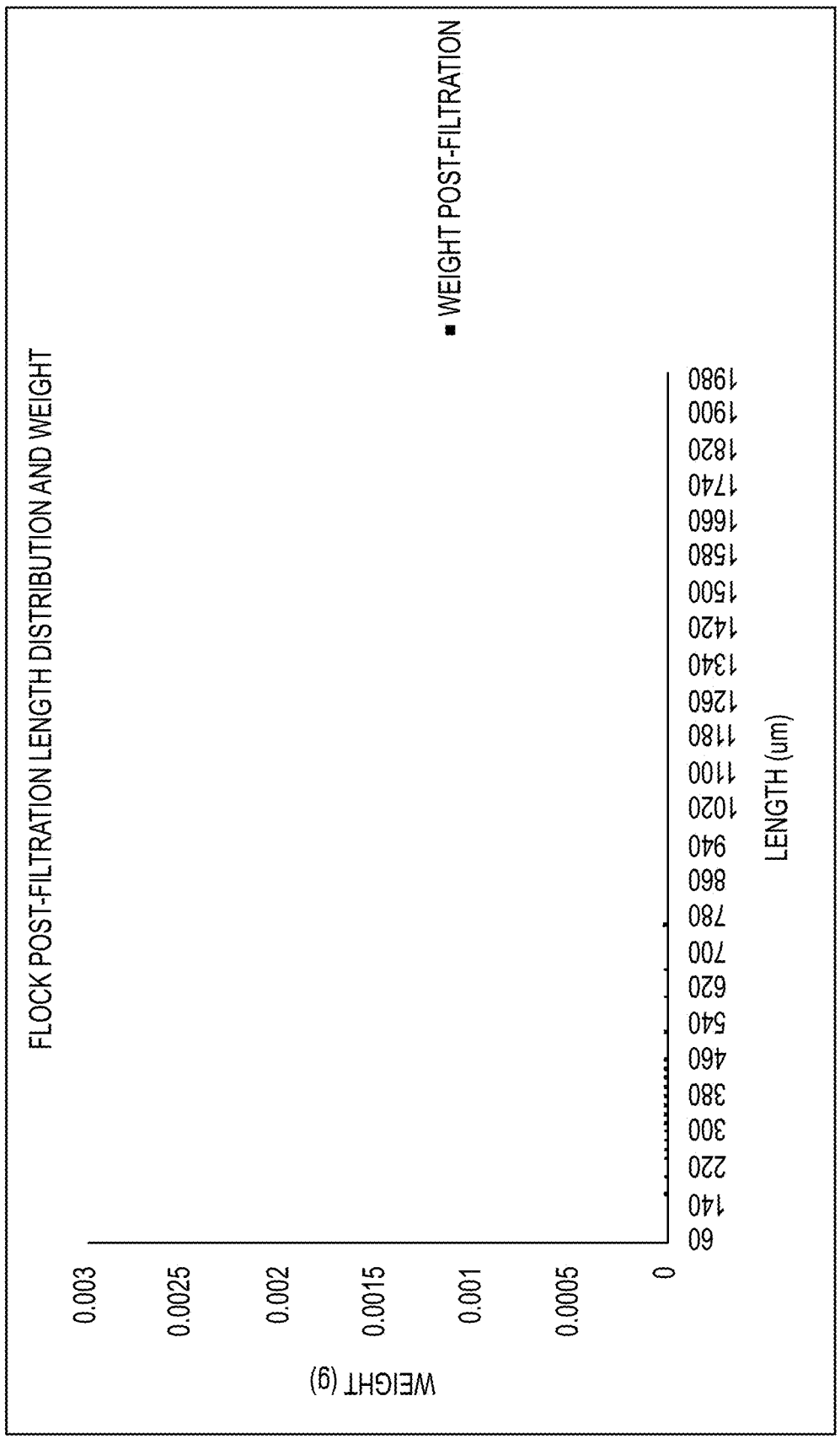

FIGS. 25A and 25B show results of efficiency testing on the inventive filter under test in Example 4 by determining the microplastic distribution changes (by number of flock particulates) between pre-filtered and post-filtered washing machine wastewater, respectively. FIGS. 25C and 25D show results of efficiency testing on the same inventive filter by determining the microplastic distribution changes (by weight of flock particulates) between pre-filtered and post filtered washing machine wastewater, respectively.

Consistent with the results for Experimental Filter 1 in Example 1, these data show a measured microplastics filtration efficiency that is significantly better than the 78% microplastics filtration efficiency of the highest-rated microplastics filter described in the Napper paper. The Experimental Filter in Example 4 has a measured microplastics filtration efficiency at least 12% greater than the most-efficient prior known microplastics filter.

Thus, unlike the prior filters, the filters described herein have significantly improved filtering efficiency and performance, capable of meeting the stringent requirements of microplastics legislation, including a filtering greater than 90% of microplastics by mass.

Apparatus, systems, and methods of the disclosure may be beneficially utilized in filtering applications in which the substance being filtered results in a "cake" (e.g., a build-up of particles) on the filter media that resulting in an increasing pressure drop across the filter media. A filtration system of some embodiments of the disclosure may reduce the pressure drop, allowing for reduced filter cleaning and higher filter flow rates with low risk of problems such as flooding or equipment damage. Applications include microplastic filtering, whole house filters, gray water filters, boat filters, chemical process filtration, water filters, plastic resin filtration for recycling purposes, etc.

As used herein, unless specifically stated otherwise, the term "or" encompasses all possible combinations of elements, except where infeasible. For example, if it is stated that a component includes X or Y, then, unless specifically stated otherwise or infeasible, the component may include X, or Y, or X and Y. As a second example, if it is stated that a component includes X, Y, or Z, then, unless specifically stated otherwise or infeasible, the component may include X, or Y, or Z, or X and Y, or X and Z, or Y and Z, or X and Y and Z. Furthermore, the phrase "one of X and Y" or "one of X or Y" shall each be interpreted in the broadest sense to include one of X, or one of Y, or one of X and one of Y.

The block diagrams in the figures illustrate the architecture, functionality, and operation of possible implementations of systems, methods, and computer hardware/software products according to various exemplary embodiments of the present disclosure. In this regard, each block in a schematic diagram may represent certain arithmetical or logical operation processing that may be implemented using hardware such as an electronic circuit or an electronic control unit. Blocks may also represent a module, a segment, or a portion of code that comprises one or more executable instructions for implementing the specified logical functions. Controllers may be programmed to execute such instructions. It should be understood that in some implementations, functions indicated in a block may occur out of the order noted in the figures. For example, two blocks shown in succession may be executed or implemented substantially concurrently, or two blocks may sometimes be executed in reverse order, depending upon the functionality involved. Some blocks may also be omitted.

It should also be understood that each block of the block diagrams, and combination of the blocks, may be implemented by special purpose hardware-based systems that perform the specified functions or acts, or by combinations of special purpose hardware and computer instructions. It will be appreciated that the embodiments of the present disclosure are not limited to the exact construction that has been described above and illustrated in the accompanying drawings, and that various modifications and changes can be made without departing from the scope thereof. For example, while examples have been discussed in the context of microplastic filtration, embodiments of the disclosure may be applicable to other forms of mass transport.

What is claimed is:

1. A filtration device comprising:
   a first opening and a second opening that is smaller than the first opening; and a vortical filter for receiving a fluid extending away from the first opening towards the second opening, the vortical filter comprising a helical coil having at least one rib extending continuously from the first opening to the second opening, wherein the at least one rib has a width that comprises 30% to 60% of the radius of the helical coil at the first opening,
   the vortical filter being configured to generate vortices in the received fluid entering the vortical filter via the first opening and being configured such that filtered fluid exits the side of the vortical filter through a filter media surrounding at least a portion of the circumference of the vortical filter between the first opening and the second opening, wherein filtered materials substantially exit the vortical filter at the second opening.

2. The filtration device of claim 1, wherein the at least one rib forms a flow path configured to guide filtered particles suspended in the vortices along a flow path to the second opening.

3. The filtration device of claim 2, wherein the flow path is substantially continuous from the first opening to the second opening and configured so as to not inhibit the flow of the filtered materials along the flow path towards the second opening.

4. The filtration device of claim 1, wherein the at least one rib spirals from the first opening to the second opening with a decreasing radius such that the first opening has a cross-sectional area greater than the cross-sectional area of the second opening.

5. The filtration device of claim 1, further comprising a collection unit arranged at the second opening, the collection unit configured to collect solids filtered from the fluid, wherein the collection unit comprises a removeable collection unit configured to be sealed to the filtration device via a fastening mechanism.

6. The filtration device of claim 5, wherein the collection unit is a second-stage filtration device.

7. The filtration device of claim 1, wherein the vortical filter has a raker reduction ratio $\beta/\alpha$ in a range between about 1.0 and 10.0 including the end points of the range.

8. The filtration device of claim 1, wherein the vortical filter has a raker reduction ratio $\beta/\alpha$ in a range between about 3.0 and 6.0 including the end points of the range.

9. The filtration device of claim 1, wherein the vortical filter is configured to provide a cross-flow filtration area across the filter media.

10. The filtration device of claim 1, wherein the fluid comprises water, a washing machine discharge fluid, or a biological fluid.

11. The filtration device of claim 10, wherein the biological fluid comprises blood.

12. The filtration device of claim 1, further comprising a housing configured to contain the vortical filter, wherein the filter media is sealed between the housing and the vortical filter, wherein the filter media is integrated into the housing.

13. The filtration device of claim 1, further comprising a gasket configured to seal the vortical filter against the filter media.

14. The filtration device of claim 1, further comprising:
   an enclosure including an inlet opening configured to guide the fluid to the first opening, and an outlet opening configured to guide filtered fluid out of the enclosure; and
   a particle collection member configured to collect particles filtered from the fluid, the particle collection member being removable from the enclosure.

15. The filtration device of claim 1, wherein the filtration device is configured to filter fluid and to filter particulate materials from the fluid.

16. The filtration device of claim 1, wherein the device is configured to filter microplastics and configured to filter greater than 90% of microplastics by mass when post-filtered to 10 microns.

17. A filtration device comprising:
   a first opening and a second opening that is smaller than the first opening; and
   a vortical filter for receiving a fluid extending away from the first opening towards the second opening, the vortical filter comprising a helical coil having at least one rib extending continuously from the first opening to the second opening, wherein the at least one rib has a width that comprises 30% to 60% of the radius of the helical coil at the first opening,
   the vortical filter being configured to generate vortices in the received fluid entering the vortical filter via the first opening and being configured such that filtered fluid exits the side of the vortical filter through a filter media surrounding at least a portion of the circumference of the vortical filter between the first opening and the second opening, wherein filtered materials substantially exit the vortical filter at the second opening,
   wherein the filtration device is configured to filter discharge fluid from a washing machine and to filter microplastics from the discharge fluid.

18. The filtration device of claim 17, wherein a flow path is substantially continuous from the first opening to the second opening and configured so as to not inhibit the flow of the filtered materials along the flow path towards the second opening.

19. The filtration device of claim 17, further comprising a collection unit arranged at the second opening, the collection unit configured to collect solids filtered from the fluid, wherein the collection unit comprises a removeable collection unit configured to be sealed to the filtration device via a fastening mechanism.

20. The filtration device of claim 19, wherein the collection unit is a second-stage filtration device.

21. The filtration device of claim 17, wherein the vortical filter has a raker reduction ratio β/in a range between about 3.0 and 6.0 including the end points of the range.

22. The filtration device of claim 17, wherein the device is configured to filter microplastics and configured to filter greater than 90% of microplastics by mass when post-filtered to 10 microns.

23. A filtration device comprising:
a first opening and a second opening that is smaller than the first opening; and a vortical filter for receiving a fluid extending away from the first opening towards the second opening, the vortical filter comprising a helical coil having at least one rib extending continuously from the first opening to the second opening, wherein the at least one rib has a width that comprises 30% to 60% of the radius of the helical coil at the first opening,
the vortical filter being configured to generate vortices in the received fluid entering the vortical filter via the first opening and being configured such that filtered fluid exits the side of the vortical filter through a filter media surrounding at least a portion of the circumference of the vortical filter between the first opening and the second opening, wherein filtered materials substantially exit the vortical filter at the second opening,
wherein the filtration device is configured to filter discharge fluid from a washing machine and to filter microplastics from the discharge fluid, and
wherein the filtration device is configured to filter at least 75% by mass of said microplastics from the discharge fluid when post-filtered to 10 microns after the washing machine completes 4 or more loads of laundry.

24. The filtration device of claim 23, wherein a flow path is substantially continuous from the first opening to the second opening and configured so as to not inhibit the flow of the filtered materials along the flow path towards the second opening.

25. The filtration device of claim 23, further comprising a collection unit arranged at the second opening, the collection unit configured to collect solids filtered from the fluid, wherein the collection unit comprises a removeable collection unit configured to be sealed to the filtration device via a fastening mechanism.

26. The filtration device of claim 25, wherein the collection unit is a second-stage filtration device.

27. The filtration device of claim 23, wherein the vortical filter has a raker reduction ratio β/α in a range between about 3.0 and 6.0 including the end points of the range.

28. A filtration device comprising:
a vortical filter comprising a tapered helical coil comprising a first opening, a second opening, a rib, and a cross-flow filtration region between the first opening and the second opening;
the tapered helical coil having an interior raker reduction ratio β/α in a range between 1.0 and 10.0 including the end points of the range,
wherein the vortical filter is configured to generate vortices in a fluid entering the vortical filter via the first opening and being configured such that the filtered fluid exits through a filter media of the cross-flow filtration region, and
wherein the vortical filter is configured such that filtered particles substantially exit the vortical filter at the second opening.

29. The filtration device of claim 28, wherein the vortical filter has a raker reduction ratio β/α in a range between about 3.0 and 6.0 including the end points of the range.

30. The filtration device of claim 28, wherein the device is configured to filter microplastics and configured to filter greater than 90% of microplastics by mass when post-filtered to 10 microns.

* * * * *